(12) United States Patent
Murphey et al.

(10) Patent No.: US 12,351,346 B2
(45) Date of Patent: *Jul. 8, 2025

(54) COLLAPSIBLE TUBULAR MAST (CTM) WITH SURFACE MATERIAL BETWEEN TRUSSES

(71) Applicant: Opterus Research and Development, Inc., Fort Collins, CO (US)

(72) Inventors: Thomas W. Murphey, Fort Collins, CO (US); Levi Nicholson, Wellington, CO (US); Michael Folkers, Fort Collins, CO (US); Erik Pranckh, Fort Collins, CO (US); Kyle Egan, Fort Collins, CO (US)

(73) Assignee: Opterus Research and Development, Inc., Fort Collins, CO (US)

( * ) Notice: Subject to any disclaimer, the term of this patent is extended or adjusted under 35 U.S.C. 154(b) by 280 days.

This patent is subject to a terminal disclaimer.

(21) Appl. No.: 18/086,189

(22) Filed: Dec. 21, 2022

(65) Prior Publication Data

US 2023/0126288 A1    Apr. 27, 2023

Related U.S. Application Data

(63) Continuation of application No. 17/305,740, filed on Jul. 14, 2021, now Pat. No. 11,542,043, which is a
(Continued)

(51) Int. Cl.
*E04C 3/00* (2006.01)
*B64G 1/22* (2006.01)
(Continued)

(52) U.S. Cl.
CPC .......... *B64G 99/00* (2022.08); *B64G 1/2225* (2023.08); *B64G 1/407* (2013.01); *B64G 1/443* (2013.01);
(Continued)

(58) Field of Classification Search
CPC ... E04C 3/005; E04C 3/09; E04C 3/28; B64G 99/00; B64G 1/222; B64G 1/407; B64G 1/443
See application file for complete search history.

(56) References Cited

U.S. PATENT DOCUMENTS 3,696,568 A * 10/1972 Berry ................. E04C 3/005
52/108
3,811,633 A * 5/1974 Cummings ............ B29C 53/20
226/173
(Continued)

*Primary Examiner* — Beth A Stephan
(74) *Attorney, Agent, or Firm* — Harris Beach Murtha Cullina PLLC

(57) ABSTRACT

A deformable support apparatus includes a deformable body configured to transition between at least an extended state and a contracted state where a stiffness of the deformable body in the extended state is greater than a corresponding stiffness of the deformable body in the contracted state. The deformable body includes a first member and a second member coupled to and in opposition to the first member, and arranged about a longitudinal axis. In the extended state, the first member has at least a first curved portion and the second member has at least a second curved portion. The at least a first curved portion is a positive curved portion with respect to the longitudinal axis and the at least a second curved portion is a negative curved portion with respect to the longitudinal axis.

19 Claims, 57 Drawing Sheets

Related U.S. Application Data continuation-in-part of application No. 17/171,184, filed on Feb. 9, 2021, now Pat. No. 11,390,399, which is a continuation of application No. 16/724,806, filed on Dec. 23, 2019, now Pat. No. 11,034,467, which is a continuation-in-part of application No. 15/959,815, filed on Apr. 23, 2018, now Pat. No. 10,526,785.

(60) Provisional application No. 62/490,289, filed on Apr. 26, 2017.

(51) Int. Cl.
  *B64G 1/40* (2006.01)
  *B64G 1/44* (2006.01)
  *B64G 99/00* (2009.01)
  *E04C 3/09* (2006.01)
  *E04C 3/28* (2006.01)

(52) U.S. Cl.
  CPC ............ *E04C 3/005* (2013.01); *B64G 1/2222* (2023.08); *E04C 3/09* (2013.01); *E04C 3/28* (2013.01)

(56) References Cited

U.S. PATENT DOCUMENTS

| | | | | |
|---|---|---|---|---|
| 4,047,339 A * | 9/1977 | Smith | | H01Q 1/087 52/856 |
| 4,818,055 A * | 4/1989 | Patterson | | G02B 6/3636 385/98 |
| 5,154,965 A * | 10/1992 | Rouhling | | D03D 11/00 442/205 |
| 5,238,728 A * | 8/1993 | Aucagne | | D03D 25/005 428/109 |
| 6,217,975 B1 * | 4/2001 | Daton-Lovett | | B65G 15/08 428/36.1 |
| 6,256,938 B1 * | 7/2001 | Daton-Lovett | | H01Q 1/087 138/119 |
| 7,062,862 B2 * | 6/2006 | Wheaton | | G01B 3/1003 33/771 |
| 7,354,033 B1 * | 4/2008 | Murphey | | B64G 1/222 52/653.2 |
| 7,617,639 B1 * | 11/2009 | Pollard | | B64G 1/2222 343/915 |
| 7,694,465 B2 * | 4/2010 | Pryor | | B64G 1/2225 138/119 |
| 7,895,795 B1 * | 3/2011 | Murphey | | B64G 1/222 52/121 |
| 8,434,196 B1 * | 5/2013 | Murphey | | H01Q 15/161 16/225 |
| 9,352,528 B1 * | 5/2016 | Brooks | | B32B 27/08 |
| 9,528,264 B2 * | 12/2016 | Freebury | | E04C 3/28 |
| 9,863,148 B2 * | 1/2018 | Fernandez | | B29C 65/48 |
| 10,059,471 B2 * | 8/2018 | Steele | | B64G 1/222 |
| 10,071,823 B2 * | 9/2018 | Turse | | B64G 1/222 |
| 10,773,833 B1 * | 9/2020 | Harvey | | B64G 1/2224 |
| 11,390,399 B2 * | 7/2022 | Murphey | | E04C 3/005 |
| 11,542,043 B2 * | 1/2023 | Murphey | | B64G 99/00 |
| 2004/0197519 A1 * | 10/2004 | Elzey | | B32B 33/00 428/116 |
| 2010/0241165 A1 * | 9/2010 | Konieczynski | | A61B 17/7059 606/301 |
| 2012/0065723 A1 * | 3/2012 | Drasler | | A61F 2/915 623/1.15 |
| 2012/0297717 A1 * | 11/2012 | Keller | | B64G 1/443 52/645 |
| 2013/0289707 A1 * | 10/2013 | Shanley | | A61F 2/88 623/1.16 |
| 2014/0180396 A1 * | 6/2014 | Pike | | A61F 2/82 623/1.16 |

* cited by examiner

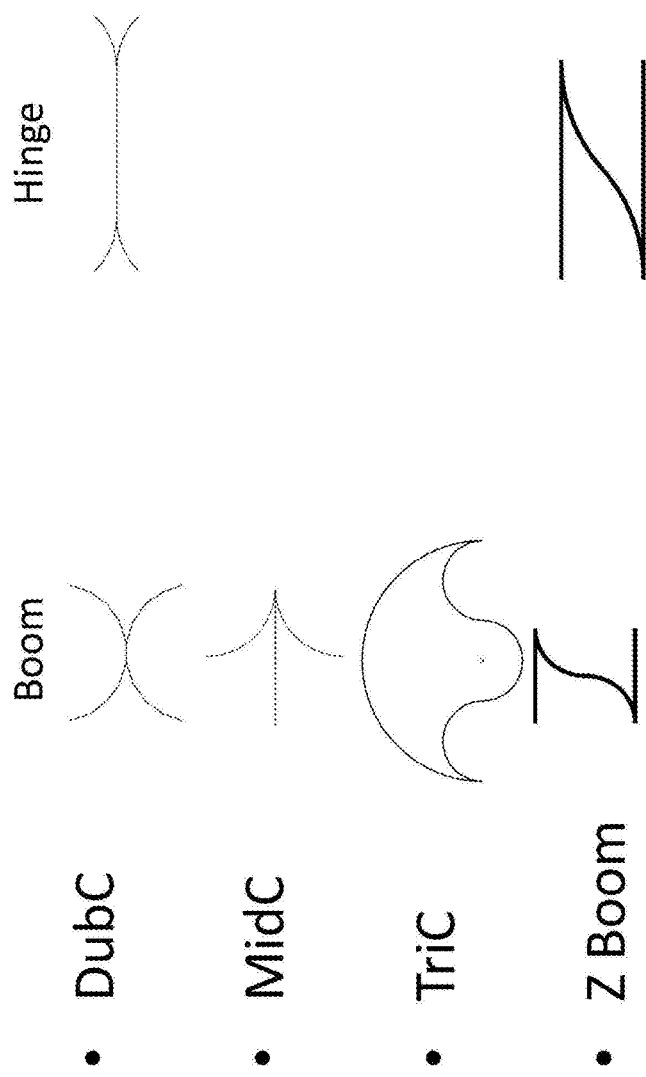

DubC Boom

Isometric View

Rolled

Cross Section

Flattened

DubC Hinge

Cross Section

Isometric View

Flattened

Rolled

MidC

Cross Section

Isometric View

Flattened

Rolled

TriC Hinge

Isometric View
Rolled

Cross Section

Flattened

TriC Flat Boom

Cross Section

Isometric View

Flattened

Rolled

Z Boom
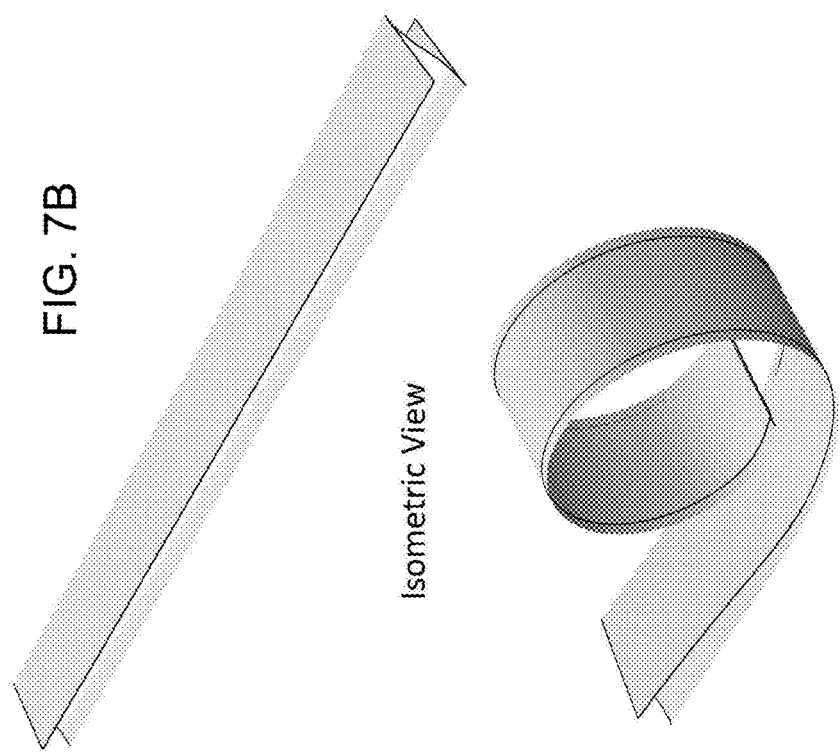
FIG. 7A
Cross Section
FIG. 7B
Isometric View
FIG. 7C
Flattened
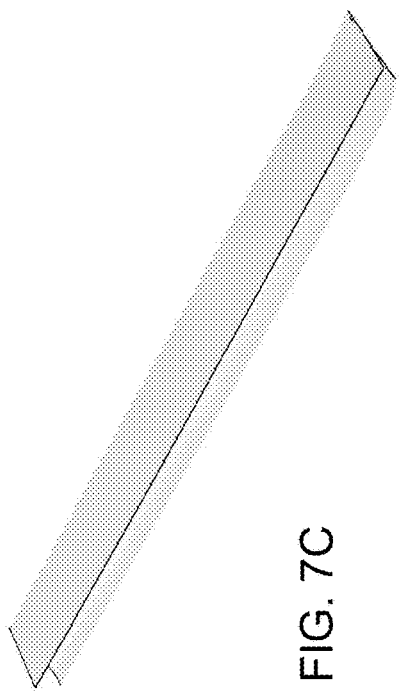
FIG. 7D
Rolled

Z Hinge

Cross Section

Isometric View

Flattened

Rolled

TriC End Modifications

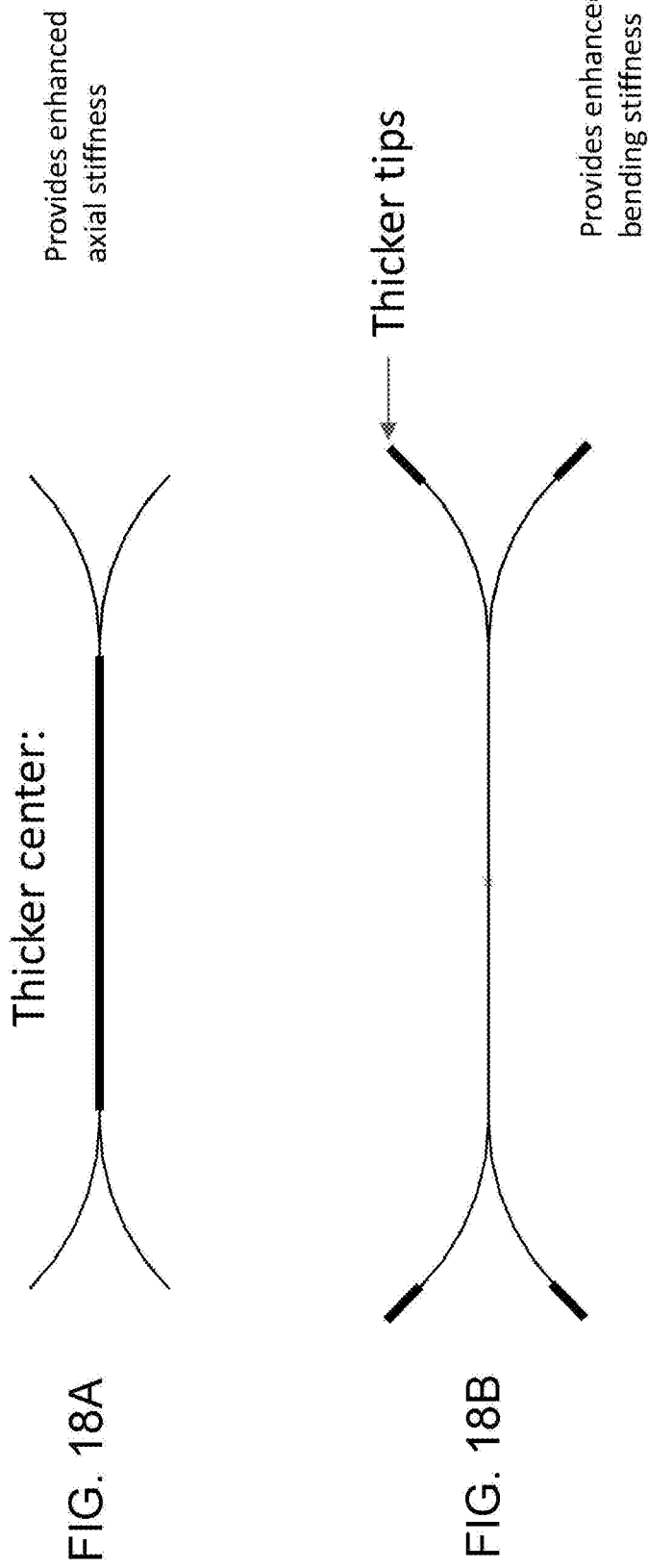

DubC Fiber Orientation

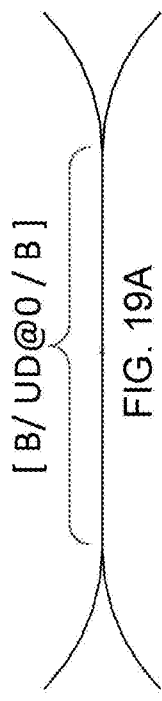

[ B ] unless otherwise noted

Provides enhanced axial stiffness

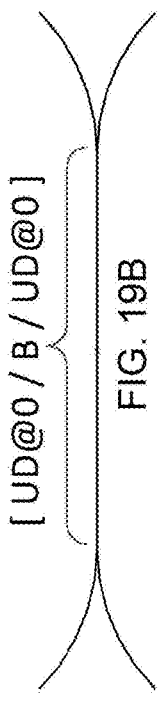

[ B ] unless otherwise noted

Provides enhanced bending stiffness

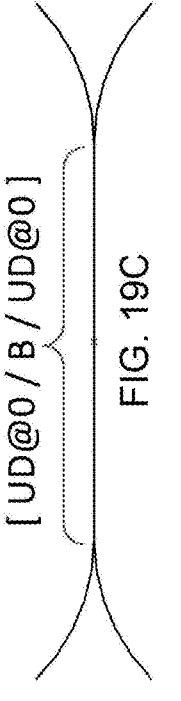

[ B / UD@0 ] unless otherwise noted

Provides enhanced axial and bending stiffness

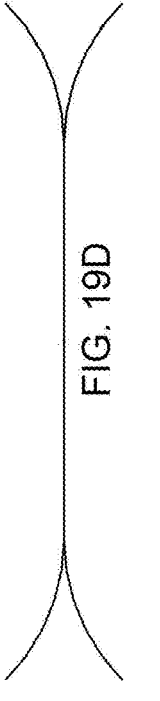

FIG. 19D

[ B / UD@0 / B ] unless otherwise noted

Provides enhanced torsional stiffness

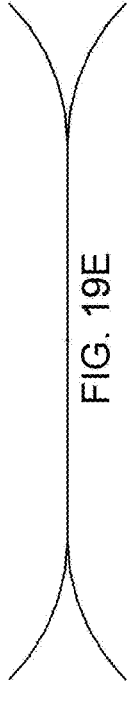

FIG. 19E

[ UD@0 / B / UD@0 ] unless otherwise noted

Provides enhanced axial stiffness

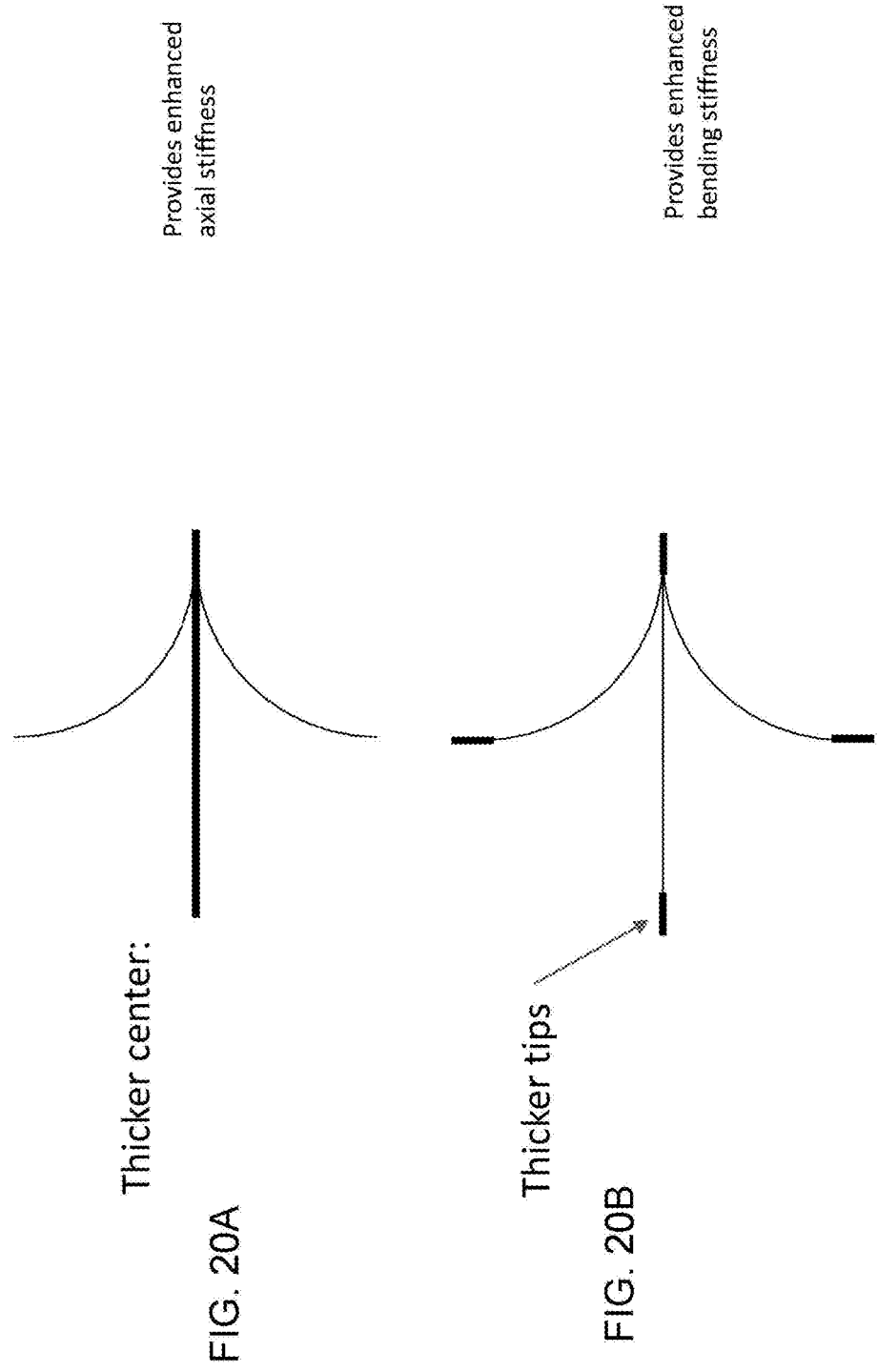

MidC Fiber Orientation

[ B / UD@0 / B ]

[ B ] unless otherwise noted

[ B / UD@0 / B ] unless otherwise noted

[ UD@0 / B ]

[ B / UD@0 / B ]

[ UD@0 / B ]

TriC Laminate Thickness Variation

Thicker main circle:

Thicker regions

TriC Fiber Orientation

[ B / UD@0 / B ]

[ B ] unless otherwise noted

[ B ]

[ B / UD@0 ] unless otherwise noted

[ B / UD@0 ]

[ B ] unless otherwise noted

Z Boom Laminate Thickness Variation

Thicker flats:

Thicker regions

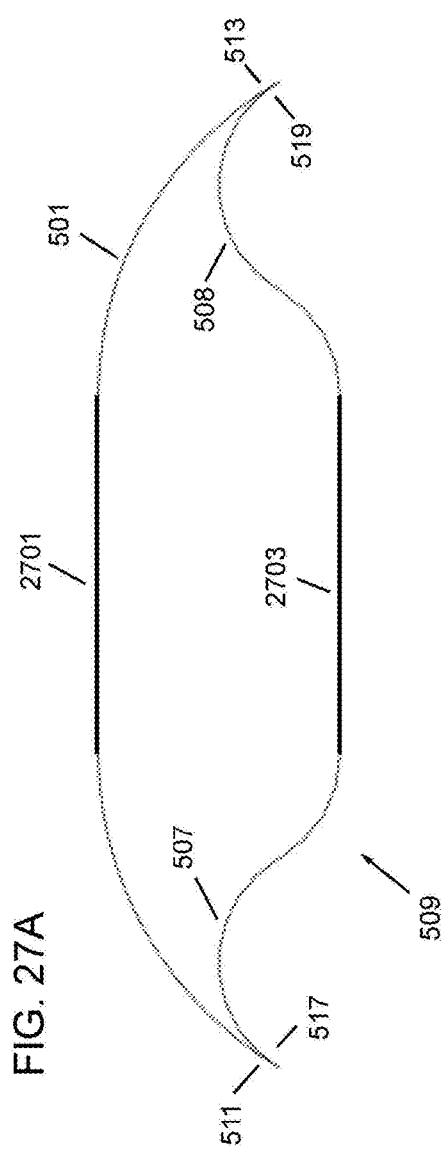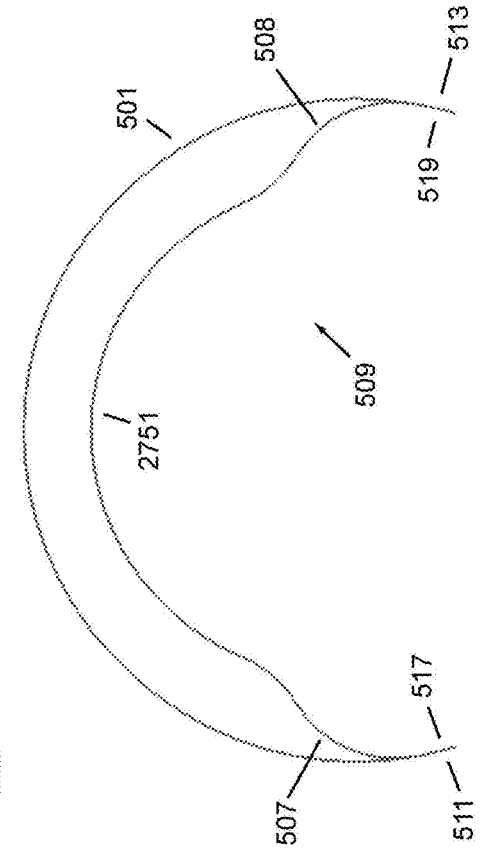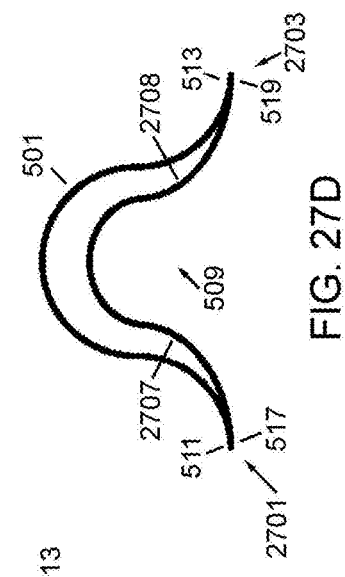

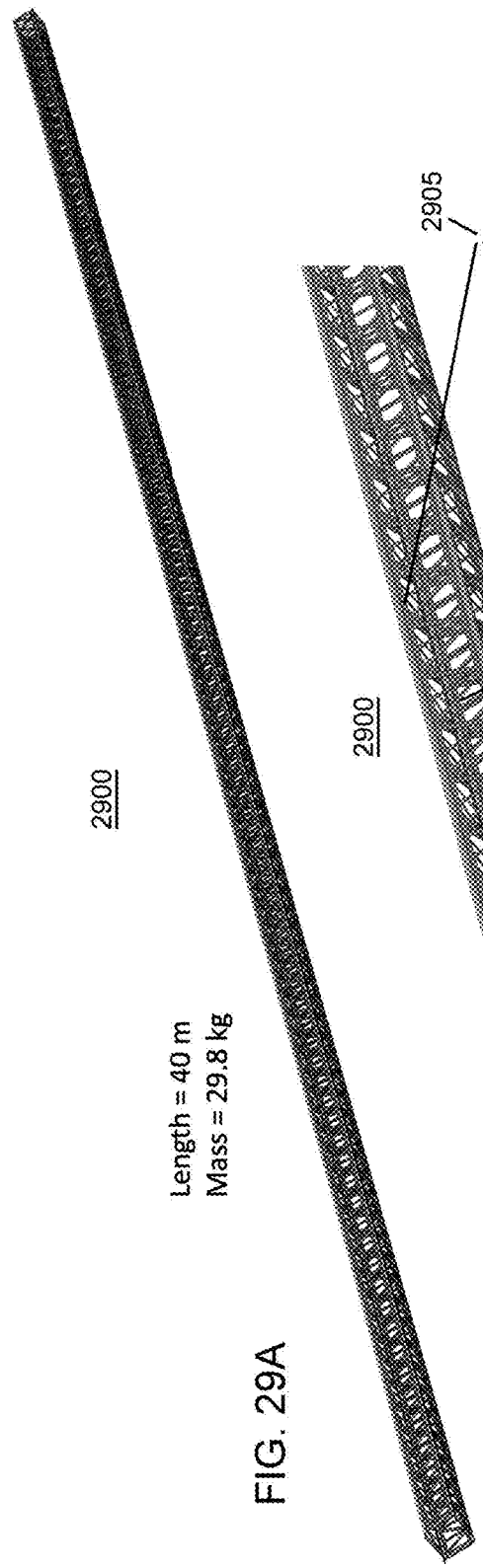
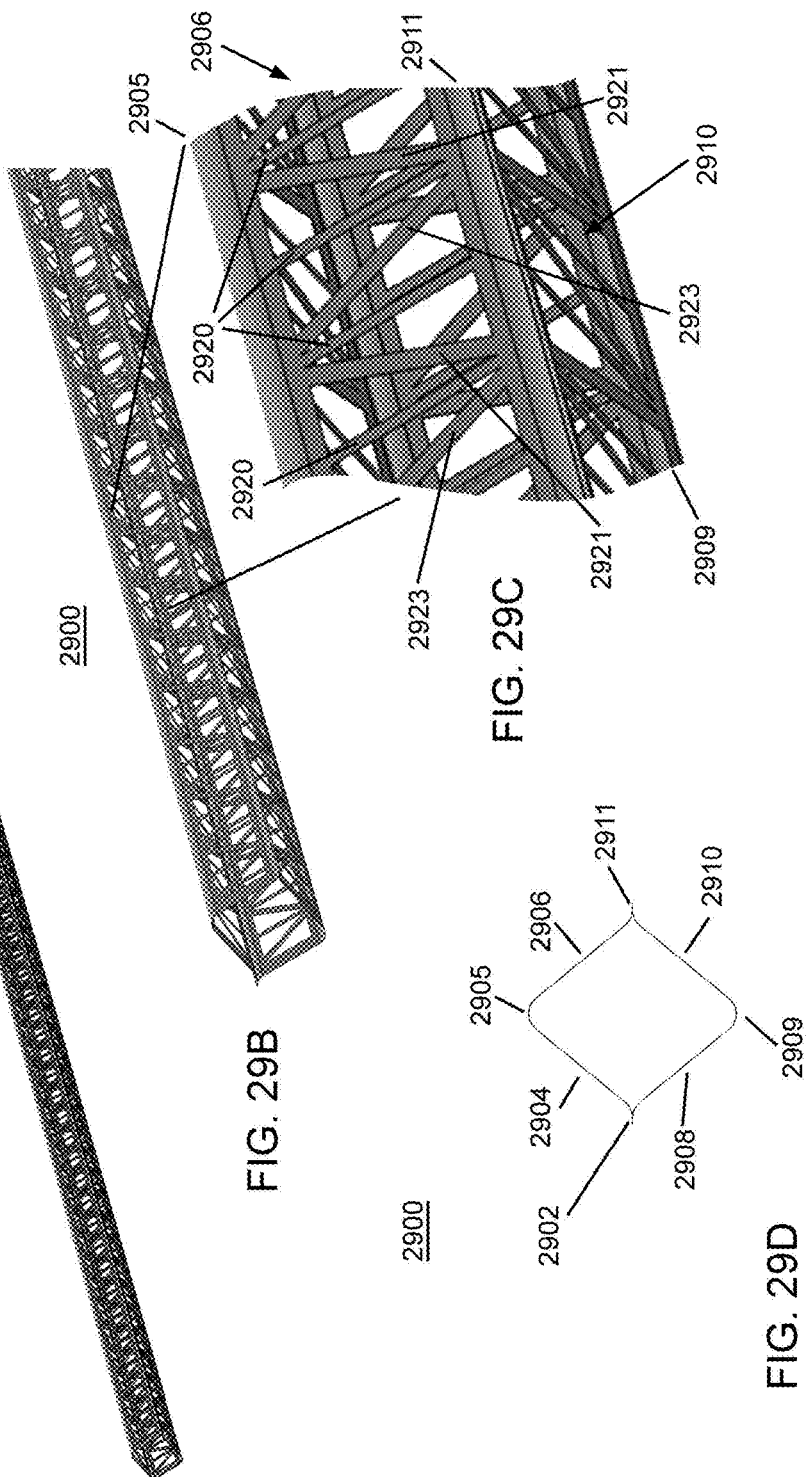
FIG. 29A
FIG. 29B
FIG. 29C
FIG. 29D

Radial 4 Architecture

4100

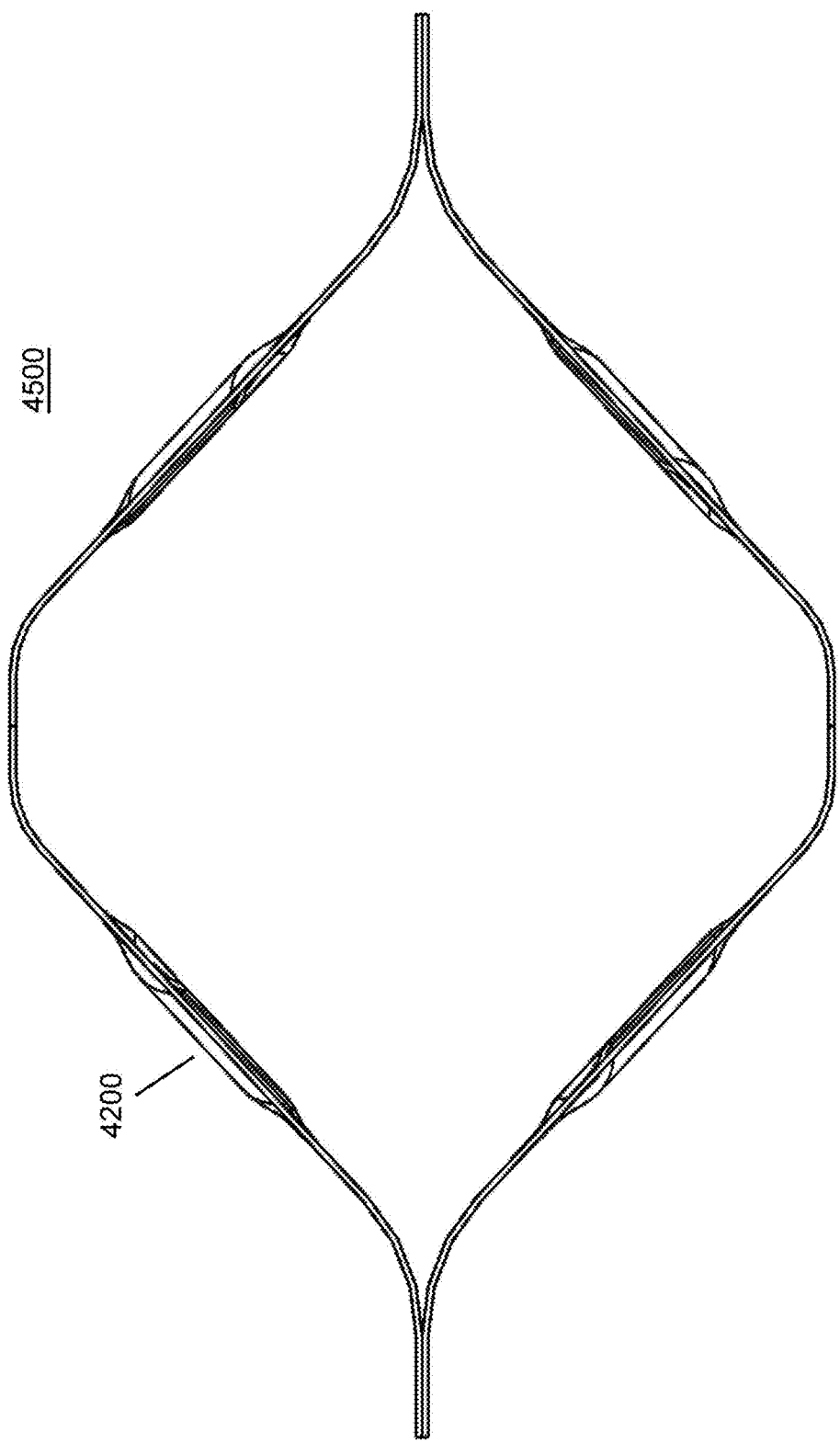

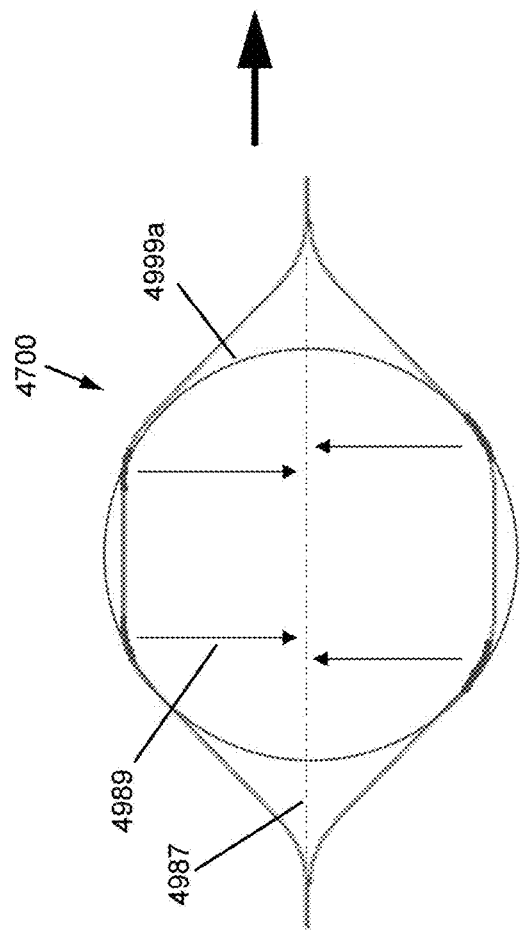
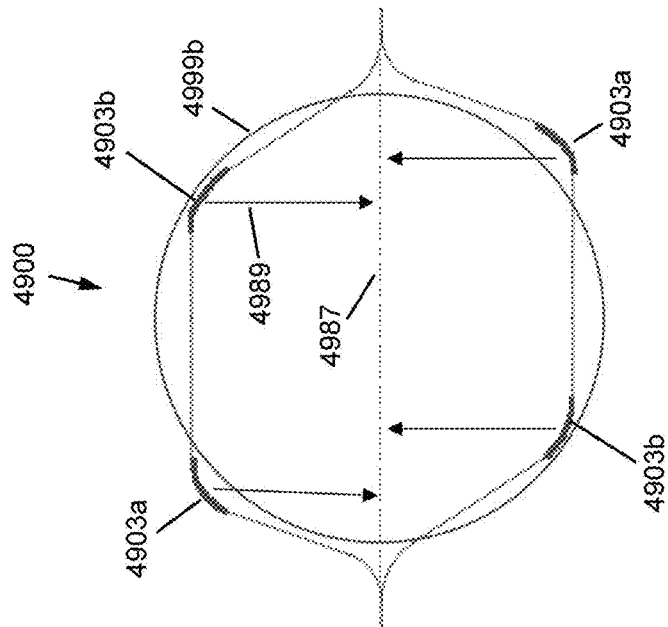
Solves the problem of placing longerons fully on radii without the need for unique molds for each shell (anti-symmetric)
Increases effective diameter of boom by moving longerons further from center
FIG. 49

COLLAPSIBLE TUBULAR MAST (CTM) WITH SURFACE MATERIAL BETWEEN TRUSSES

CROSS-REFERENCE TO RELATED APPLICATIONS

This application is a continuation of U.S. patent application Ser. No. 17/305,740, DEFORMABLE STRUCTURES COLLAPSIBLE TUBULAR MAST filed on Jul. 14, 2021, which is a continuation-in-part of U.S. patent application Ser. No. 17/171,184, DEFORMABLE STRUCTURES COLLAPSIBLE TUBULAR MAST filed on Feb. 9, 2021, now U.S. Pat. No. 11,390,399, which application is a continuation U.S. patent application Ser. No. 16/724,806, DEFORMABLE STRUCTURES COLLAPSIBLE TUBULAR MAST, filed on Dec. 23, 2019, now U.S. Pat. No. 11,034,467, which application is a continuation-in-part of U.S. patent application Ser. No. 15/959,815, filed on Apr. 23, 2018, DEFORMABLE STRUCTURES, now U.S. Pat. No. 10,526,785 and claims priority to and the benefit of U.S. provisional patent application Ser. No. 62/490,289, DEFORMABLE STRUCTURES, and PCT Application No. PCT/US2018/029348, filed Apr. 25, 2018, DEFORMABLE STRUCTURES published as WO2018200667 A1, all of which applications are incorporated herein by reference in their entireties.

STATEMENT REGARDING FEDERALLY FUNDED RESEARCH OR DEVELOPMENT

This invention was made with government support under Contract Number 80NSSC20C0125 awarded by NASA. The government has certain rights in the invention.

FIELD OF THE APPLICATION

The application relates to deformable structures and particularly to deformable beams and deformable hinges.

BACKGROUND

Deformable structures are structures that can dramatically change shape.

SUMMARY

In illustrative embodiments, a deformable support apparatus comprises a deformable body configured to transition between at least an extended state and a contracted state where a stiffness of the deformable body in the extended state is greater than a corresponding stiffness of the deformable body in the contracted state. The deformable body includes a first member and a second member coupled to and in opposition to the first member, and arranged about a longitudinal axis. In the extended state, the first member has at least a first curved portion and the second member has at least a second curved portion. The at least a first curved portion is a positive curved portion with respect to the longitudinal axis and the at least a second curved portion is a negative curved portion with respect to the longitudinal axis.

In embodiments, the deformable body is further configured to transition to a rolled state. The stiffness of the deformable body in the extended state may be greater than a corresponding stiffness of the deformable body in the rolled state.

In other embodiments, the at least a first curved portion includes a first circular portion and the at least a second curved portion includes a second circular portion where the first and second circular portions are joined to each other. The first and second circular portions may be substantially identical. The first and second circular portions may be joined at respective center portions of the first and second circular portions. The first and second circular portions each define an approximate semicircle.

In certain embodiments, the first and second circular portions define substantially the same arc length.

In embodiments, the first member and the second member each define respective center portions and respective curved end portions in the extended state. The center portion of at least one of the first and second members defines a cross-sectional thickness greater than a cross-sectional thickness of the end portions of the at least one of the first and second members.

In other embodiments, the end portions of at least one of the first and second members each define a cross-sectional thickness greater than a cross-sectional thickness of the center portion of the at least one of the first and second members.

In certain embodiments, the first and second members comprise fibrous laminate. The first and second members each comprise a fibre structure selected from the group consisting of [B], [B/UD/B], [UD/B/UD], and any combination thereof. In embodiments, the first and second members each comprise a [B/UD@0/B] fibre structure or a [B/UD@0] or a [B] fibre structure.

In another illustrative embodiment, a deformable support apparatus comprises a deformable body configured to transition between at least an extended state and a contracted state. The deformable body includes a first member and a second member coupled to and inverted relative to the first member. A stiffness of the deformable body in the extended state is greater than a corresponding stiffness of the deformable body in the contracted state. In the extended state, the first member has at least a first partial circular portion and the second member has at least a second partial circular portion.

In embodiments, the first member and the second member are coupled to each other at respective centers of the at least a first partial circular portion and the at least a second partial circular portion. The deformable body may be further configured to transition to a rolled state wherein the stiffness of the deformable body in the extended state is greater than a corresponding stiffness of the deformable body in the rolled state.

In another illustrative embodiment, a deformable support apparatus comprises a deformable body configured to transition between at least an extended state and a contracted state where a stiffness of the deformable body in the extended state is greater than a corresponding stiffness of the deformable body in the contracted state. The deformable body includes a first member and a second member coupled in opposition to the first member. In the extended state, the first member has first curved end portions separated by a first central portion and the second member has second curved portions separated by a second central portion.

In embodiments, the deformable body is further configured to transition to a rolled state and wherein the stiffness of the deformable body in the extended state is greater than a corresponding stiffness of the deformable body in the rolled state.

In certain embodiments, the first curved end portions and the second curved end portions have greater rigidity than a corresponding rigidity of the first center portion and the second center portion of the first and second members. Alternatively, the first center portion and the second center portion have greater rigidity than a corresponding rigidity of the first curved end portions and the second curved end portions of the first and second members.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 1 shows a drawing showing basic end view cross section classes of exemplary deformable structures;

FIG. 7A shows a cross section view of a Z Boom;

FIG. 7B shows an isometric view of an opened Z Boom;

FIG. 7C shows an isometric view of a flattened Z Boom;

FIG. 7D shows an isometric view of a rolled Z Boom;

FIG. 18A shows end view of a DubC deformable structure having a thicker center relative to the tips;

FIG. 18B shows end view of a DubC deformable structure having thicker tips relative to the center portion;

FIG. 19A shows an end view of a DubC deformable structure with a [B/UD@O/B] central portion and [B] ends;

FIG. 19B shows an end view of a DubC deformable structure with a [UD@O/B/UD@O] central portion and [B] ends;

FIG. 19C shows an end view of a DubC deformable structure with a [UD@O/B/UD@O] central portion and [B/UD@O] ends;

FIG. 19D shows an end view of a DubC deformable structure of substantially all [B/UD@O/B];

FIG. 19E shows an end view of a DubC deformable structure of substantially all [UD@O/B/UD@O];

FIG. 20A shows a drawing of MidC deformable structure with a thicker center relative to the tips;

FIG. 20B shows a drawing of MidC deformable structure with thicker tips relative to the center;

FIG. 27A shows a drawing of yet another exemplary TriC deformable structure with about flat sections;

FIG. 27B shows a drawing of yet another exemplary TriC deformable structure with about circular sections;

FIG. 27D shows a drawing of yet another exemplary TriC deformable structure with an outward facing jointed member ends;

FIG. 29A is a drawing showing an exemplary CTM boom;

FIG. 29B is a drawing showing a magnified view of an end of the CTM boom of FIG. 29B;

FIG. 29C is a drawing showing a magnified view of a portion of the CTM boom of FIG. 29B which shows one exemplary flat wall;

FIG. 29D is a drawing showing an end section view of the CTM boom of FIG. 29A;

FIG. 46 is a drawing showing a cross section view of the CTM boom of FIG. 45;

FIG. 49 is a drawing showing a cross section view of a parallelogram CTM PCTM (right) next to a CTM (left).

DETAILED DESCRIPTION

Figure 2B:
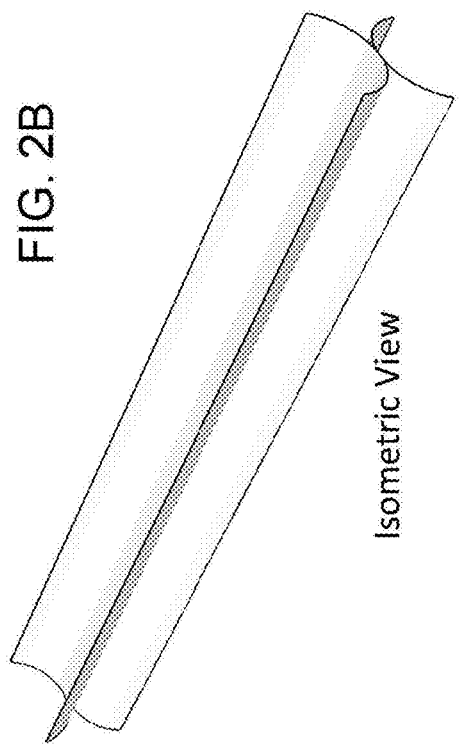
FIG. 2B shows an isometric view of an opened DubC Boom.

DEFINITIONS: The phrase "end modification" as used herein, describes modifications of the physical end of a structure.

Axial stiffness refers to a stiffness along the structure long axis. In general, extended states are stiffer with respect to multiple axes (axes include torsion, two bending axes, two sheer, and axial).

Truss member—A truss member mechanically couples at two end points, hereinbelow generally between a vertex structure and a joining portion of a beam, mast, and/or boom, where the truss member includes an element about perpendicular to the long axis of a beam or hinge as a batten truss member, or as a diagonal truss member. Truss members can be about flat, or rounded, such as analogous to the curved metal tape of a tape measure or tape spring.

Plurality—common meaning, more than one, or at least two.

Deformable structures can dramatically change shape. While all structures are deformable to some extent, structures of this Application, change shape so dramatically that the original form of the structure can be difficult to recognize in the deformed shape. The shape change is designed to allow the structure to meet one set of desired requirements in one shape, and another set of desired requirements in another shape. A common example of a prior art deformable structure is an elastic tape-spring hinge that allows a structure to fold and compactly package for mobility and subsequent unfolding and locking into a stiff and strong structure.

Applications requiring structures that can change shape are vast and include, for example, sunshades, airfoils, awnings, retractable roofs, deployable space structures, etc. The present invention relates to reconfigurable hinges and beams. They can form elements of more complex reconfigurable structures, such as a truss.

Structural members which can be flattened and rolled are described in detail hereinbelow. In lengths from about equal to the flattened width to 10 times the flattened width, the structural member can be used as a self-locking hinge (a deformable hinge). In lengths from about 4 times the flattened width to 1,000 times the flattened width, the structural member can be used as a furlable beam (a deformable beam). The furlable beam can be flattened in one or more directions, reducing the stiffness and strength of the member. The furlable beam can then be rolled to compactly package it.

A deformable beam having an extended state, a flattened state, and a rolled state. An axial stiffness of the deformable beam in the extended state is greater than an axial stiffness in the flattened state. A deformable hinge has two states including an extended state, and a folded state. An axial stiffness of the deformable hinge in the extended state is greater than an axial stiffness in the folded state.

New shapes of deformable structures, new deformable structures, and new applications for the deformable structures are described in this Application.

In some embodiments, the structural member is beam-like and has a longitudinal axis extending the length of the beam.

In one exemplary embodiment, the beam cross section is primarily prismatic, primarily tapered, or any combination thereof.

FIG. 1 shows a drawing showing exemplary basic end view cross section classes of a DubC Boom, a DubC Hinge, a MidC, TriC Boom, a TriC Hinge, a Z Boom, and a Z Hinge.

The DubC end face structure (cross section) includes two about circular members joined back to back at about a center portion of the two circular portions. Each of the two about circular members typically include between about a quarter about circle to about a half about circle shape. In other words, the curved portions are joined back to back at about a center portion of a curve.

The MidC end face (cross section) structure includes two curved members, each of the two curved members are joined at about the ends of the curves, and at the end of a substantially center substantially flat or straight member. In other words, the end face cross section structure includes a plurality of curved members having a curve end and an opposite curve end, each of the curve ends are joined together, and each of the opposite curved ends are non-joined tips.

The TriC end face (cross section) structure includes an about "C" shape as an about circular member ranging from about a quarter about circle to nearly or about a full circle joined to at both ends of the about circular portion to a curve member which extends between both ends of the about circular member. The curve which extends between both ends of the about circular member can include a desired curve shape with about two or more about "C" shapes. For example, the curve which extends between both ends of the about circular member can include an about sine curve shape (the "sine shape" to convey a sense of a repeating or periodic waveform, however, typically, more "C" shaped), such as including an about sine curve shape (e.g., successive "C" shapes of alternating orientation) of, for example, one and one-half cycles of a sine curve (e.g., from sine 0° to sine 540°). Each of the curved portions are joined at about a curve end.

TriC deformable structures, and C booms or hinges more generally, are one example of typically "closed" curves. In a closed curve deformable structure, the cross section or end view presents at least one continuous line which closes on itself. In order to properly transition to a flattened state or rolled state, curves which run substantially parallel to each other in the longitudinal direction (e.g., along a beam) should have the same arc length between joined curve ends. With substantially the same arc length between joined curve ends, when the deformable structure flattens, there should be substantially no wrinkles or distortion of the surfaces of either of the curved sections. If the arc lengths are significantly different, one or both of the structures will wrinkle or otherwise be damaged, probably irreversibly damaged, such as at the joints, when the structure is made flat.

In more detail, an end face cross section of the deformable beam TriC type deformable structure, includes a main C curved member 501 which defines an about circular shape of an arc ranging between about a quarter arc and a substantially full circle. The main C curved member has a first main C curved member end 511 and a second main C curved member end 513. A periodic C curved member 509 defines at least two about C shaped curves (507, 508). The periodic C curved member 509 has a first periodic C curved member end 517 mechanically coupled to the first main C curved member end 511, and a second periodic C curved member end 519 mechanically coupled to the second main C curved member end 513.

In typical embodiments, while parts of the periodic C curved member 509 can extend outside of the main C curved member 501, at least one of the first periodic C curved member end 517 is joined to the first main C curved member end 511 inside of the main C curved member 501 or the second main C curved member end 513 is joined to the second periodic C curved member end 519 inside of the main C curved member 501. In typical embodiments, the main C curved member 501 and the periodic C curved member 509 include about a same arc length. In some embodiments, the periodic C curved member includes about two and a half cycles of alternating C shapes (507, 508). In some embodiments, there can be more than two C shapes on the periodic C curved member 509. For example, the TriC type or TriC related structure of FIG. 10 periodic C curved member 509 includes C shaped members 1111, 1112, 1113, 1121, and 1121. In some embodiments, the periodic C curved member 509 includes about two and a half cycles of an about sinusoidal shaped curve.

In some embodiments, at least one of the main C curved member or the periodic C curved member include an additional different shape. For example, the additional different shape includes a substantially straight line.

Figure 27C:
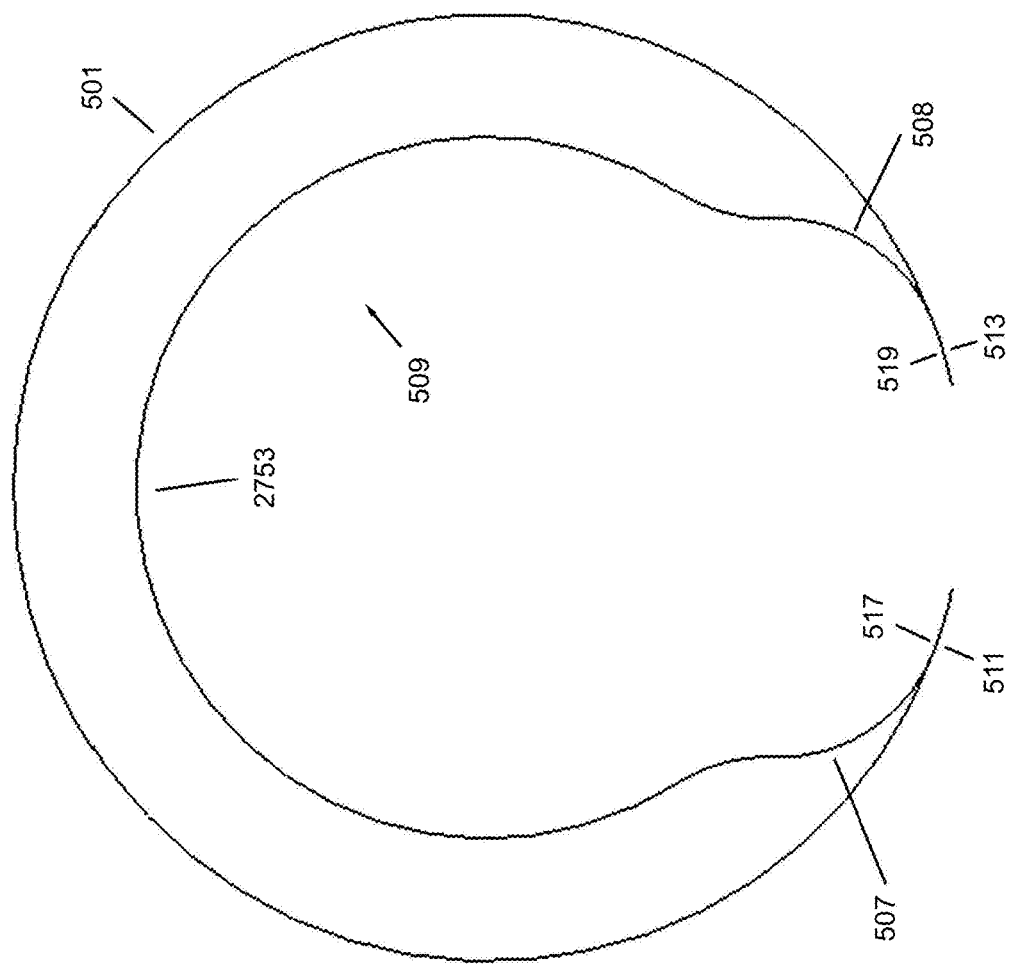
FIG. 27C shows a drawing of yet another exemplary TriC deformable structure with near or about circular sections.

In some embodiments, the periodic C curved member 509 includes at least one C shape 2751 which is larger in comparison to either of two smaller C shapes 507, 508 on either end of the at least one C shape. In some embodiments, at least one C shape 2751 larger than either of two smaller C shapes 507, 508 follows a path about parallel to the main C curved member. In some embodiments, the main C curved member 501 includes an arc length 501 of up to about 350 degrees arc of a full circle with periodic C curved member 509 within including at least one C shape 2753 larger than either of two smaller C shapes 507, 508 (FIG. 27C).

The Z Boom end face (cross section) structure includes two opposite substantially flat members joined from opposite sides by about an S curve member. The curve member is joined at both ends, here each curve end joined to a different flat member.

A deformable beam typically has three characteristic shapes that it can be deformed into.

In a first configuration, the deformable beam has substantial width and height in directions transverse to the longitudinal axis with an aspect ratio typically ranging from about 0.1 to 1. The width and height give the beam substantial bending stiffness and strength by providing substantial cross section moment of inertia. The configuration may also have substantial axial, shear and torsional stiffness and strength compared to the flattened state, the extended state typically has 10 to 10,000 times greater bending stiffness and strength, 10 to 1,000 times greater torsional stiffness and strength, and 10 to 10,000 greater axial strength.

In a second configuration, the deformable beam dimensions in one or more of the transverse directions are reduced to the material thickness which is typically 10 to 1000 times less than the extended transverse dimension. This reduction in transverse dimension reduces the stiffness and buckling strength of the deformable beam. The deformable beam cross section at the ends of the beam may flatten or remain un-deformed. The beam cross section near the ends of the beam can be modified (non prismatically to allow the transition from the beam end to a location within the beam such that stress concentrations and material failure are avoided. Example modifications are changes in material thickness, tapering the cross section, cutting away parts of the cross section, and adding material to the cross section.

In a third configuration, the shape of the second configuration is typically bent or rolled into the final alternate configuration of the structure. An elastic beam in bending should have surface tensile and compressive strains about equal to the ratio of the beam transverse direction perpendicular to the roll axis to the rolling diameter. Flattening the cross section reduces the material strain so that the material does not fail. The cross section dimension is typically reduced by 10 to 1000 so that the desired material strength is reduced by the same ratio.

Figure 2D:
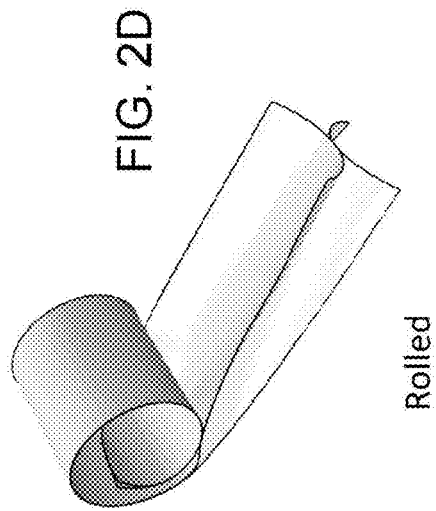
FIG. 2D shows an isometric view of a rolled DubC Boom.
Figure 2A:
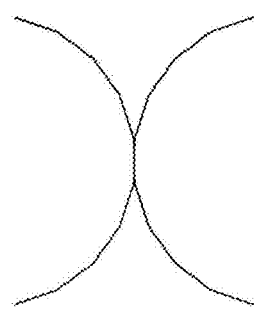
FIG. 2A shows a cross section view of a DubC Boom.
Figure 2C:
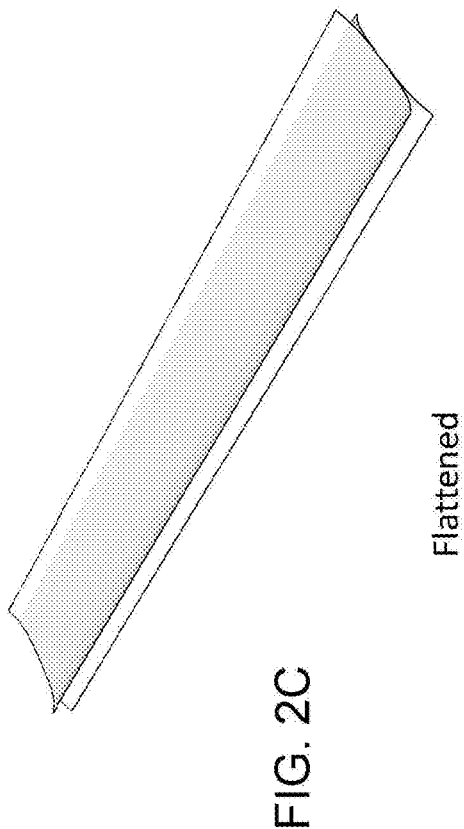
FIG. 2C shows an isometric view of a flattened DubC Boom.

FIG. 2A shows a cross section view of a DubC Boom. FIG. 2B shows an isometric view of an opened DubC Boom. FIG. 2C shows an isometric view of a nearly flattened DubC Boom. FIG. 2D shows an isometric view of a rolled DubC Boom.

Figure 3A:
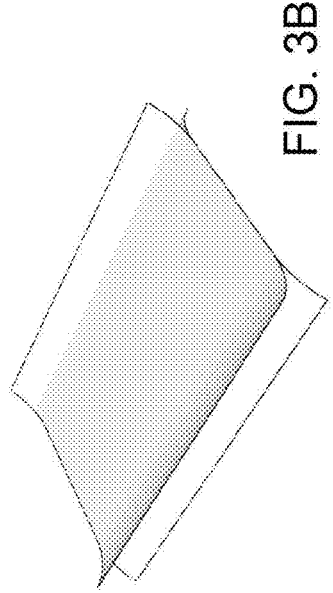
FIG. 3A shows a cross section view of a DubC Hinge.
Figure 3B:
FIG. 3B shows an isometric view of an opened DubC Hinge.
Figure 3C:
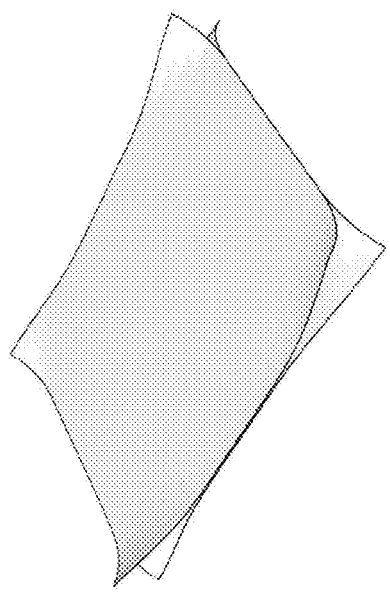
FIG. 3C shows an isometric view of a flattened DubC Hinge.
Figure 3D:
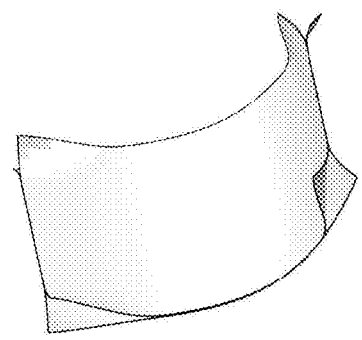
FIG. 3D shows an isometric view of a rolled DubC Hinge.

FIG. 3A shows a cross section view of a DubC Hinge. FIG. 3B shows an isometric view of an opened DubC Hinge. FIG. 3C shows an isometric view of a flattened DubC Hinge. FIG. 3D shows an isometric view of a rolled DubC Hinge.

Figure 4A:
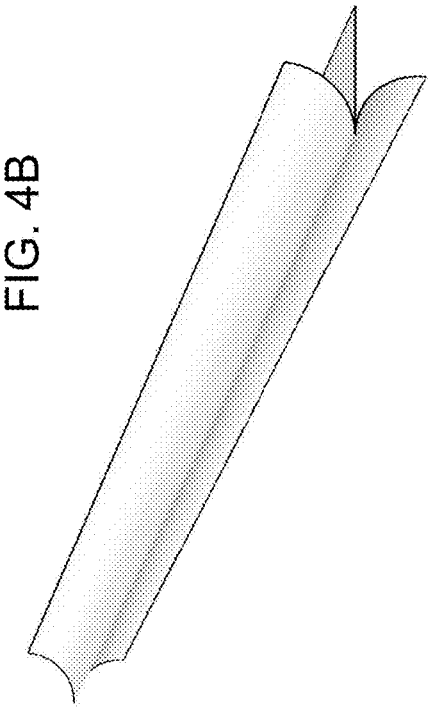
FIG. 4A shows a cross section view of a MidC Hinge.
Figure 4B:
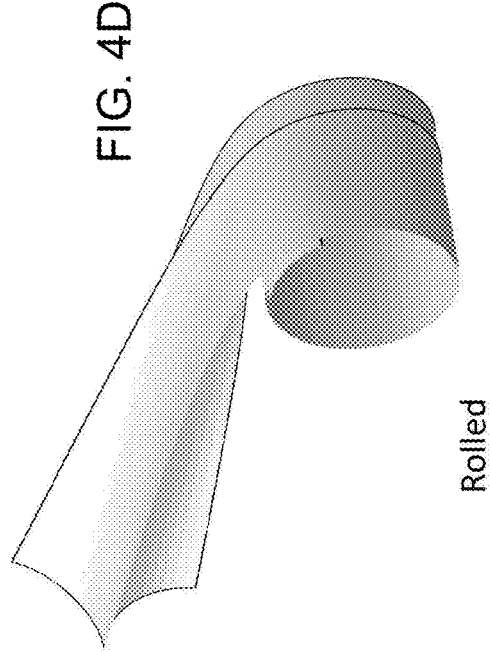
FIG. 4B shows an isometric view of an opened MidC Hinge.
Figure 4C:
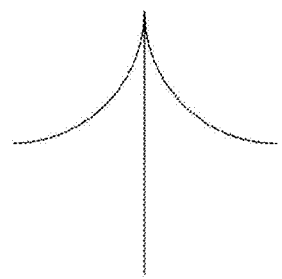
FIG. 4C shows an isometric view of a flattened MidC Hinge.
Figure 4D:
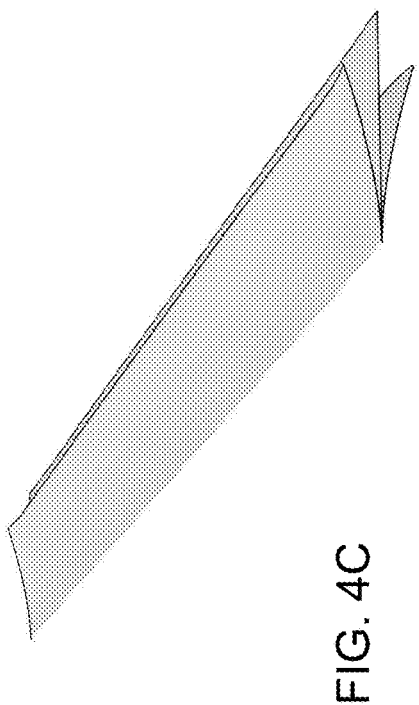
FIG. 4D shows an isometric view of a rolled MidC Hinge.

FIG. 4A shows a cross section view of a MidC Hinge or Beam. FIG. 4B shows an isometric view of an opened MidC Hinge. FIG. 4C shows an isometric view of a nearly flattened MidC Hinge. FIG. 4D shows an isometric view of a rolled MidC Hinge.

Figure 5B:
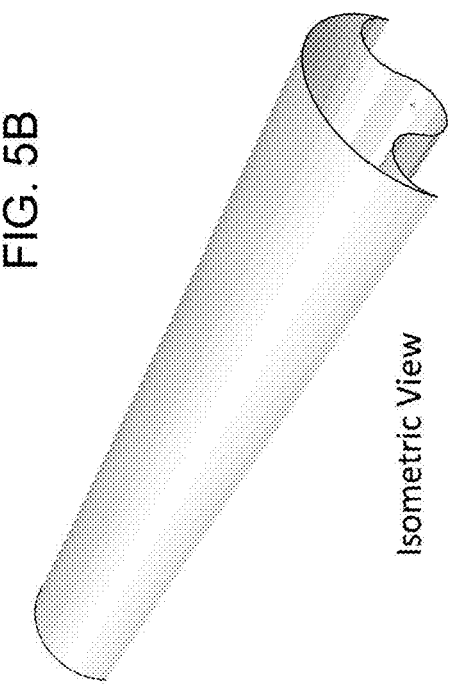
FIG. 5B shows an isometric view of an opened TriC Hinge.
Figure 5D:
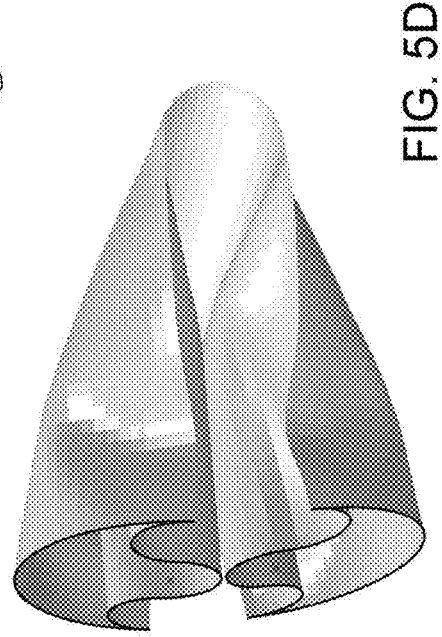
FIG. 5D shows an isometric view of a rolled TriC Hinge.
Figure 5A:
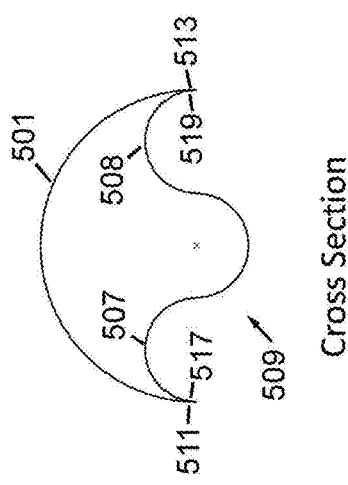
FIG. 5A shows a cross section view of a TriC Hinge.
Figure 5C:
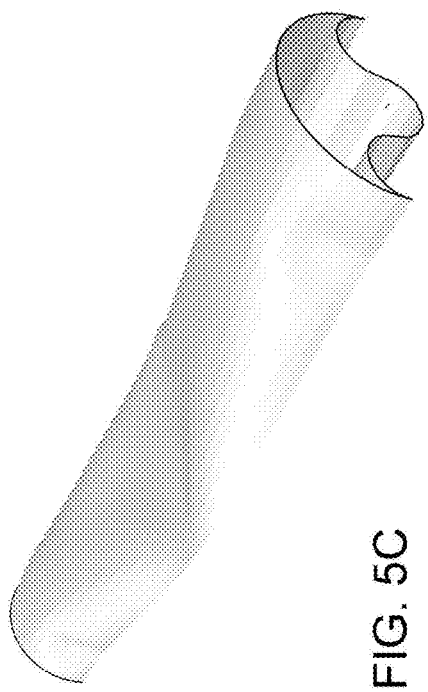
FIG. 5C shows an isometric view of a flattened TriC Hinge.

FIG. 5A shows a cross section view of a TriC Hinge. FIG. 5B shows an isometric view of an opened TriC Hinge. FIG. 5C shows an isometric view of a flattened TriC Hinge. FIG. 5D shows an isometric view of a rolled TriC Hinge.

Figure 6A:
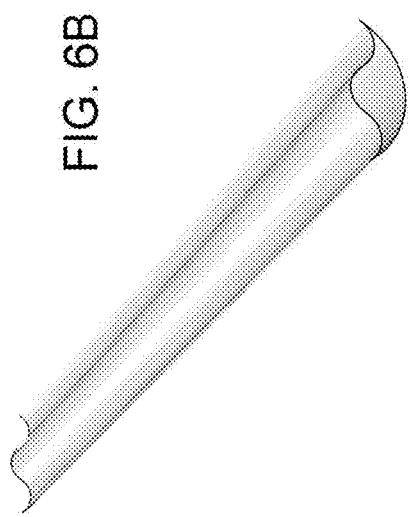
FIG. 6A shows a cross section view of a TriC Flat Boom.
Figure 6B:
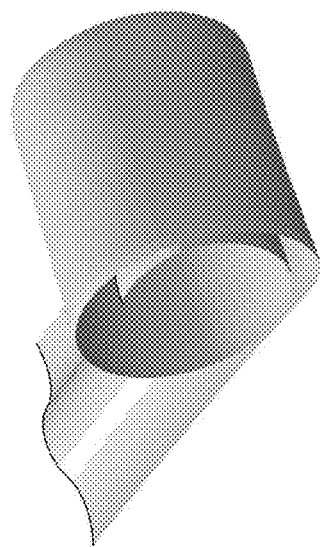
FIG. 6B shows an isometric view of an opened TriC Flat Boom.
Figure 6C:
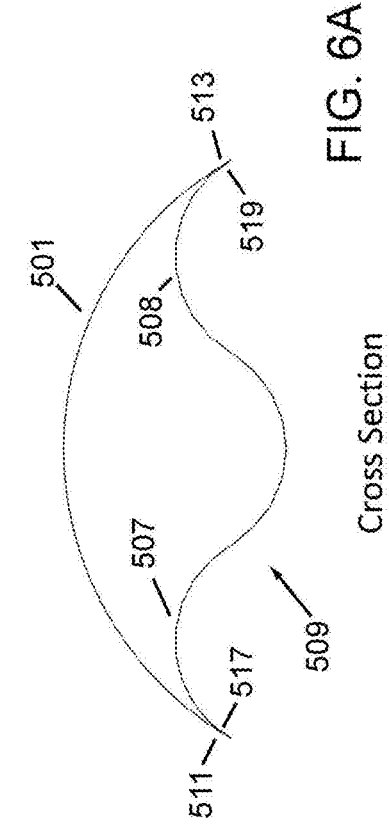
FIG. 6C shows an isometric view of a flattened TriC Flat Boom.
Figure 6D:
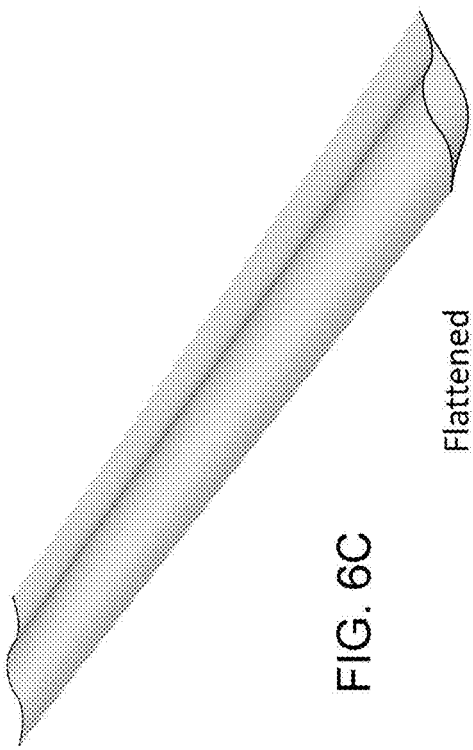
FIG. 6D shows an isometric view of a rolled TriC Flat Boom.

FIG. 6A shows a cross section view of a TriC Flat Boom. FIG. 6B shows an isometric view of an opened TriC Flat Boom. FIG. 6C shows an isometric view of a flattened TriC Flat Boom. FIG. 6D shows an isometric view of a rolled TriC Flat Boom.

FIG. 7A shows a cross section view of a Z Boom. FIG. 7B shows an isometric view of an opened Z Boom. FIG. 7C shows an isometric view of a flattened Z Boom. FIG. 7D shows an isometric view of a rolled Z Boom.

Figure 8A:
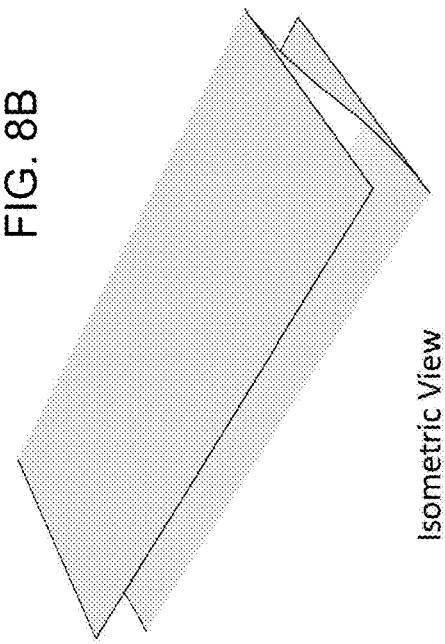
FIG. 8A shows a cross section view of a Z Hinge.
Figure 8B:
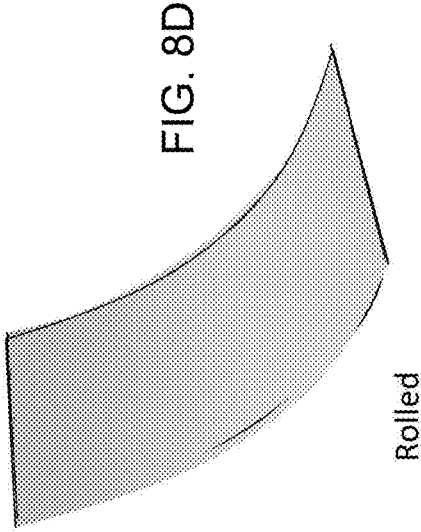
FIG. 8B shows an isometric view of an opened Z Hinge.
Figure 8C:
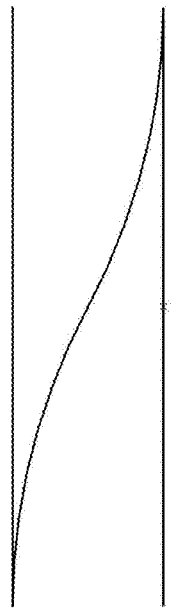
FIG. 8C shows an isometric view of a flattened Z Hinge.
Figure 8D:
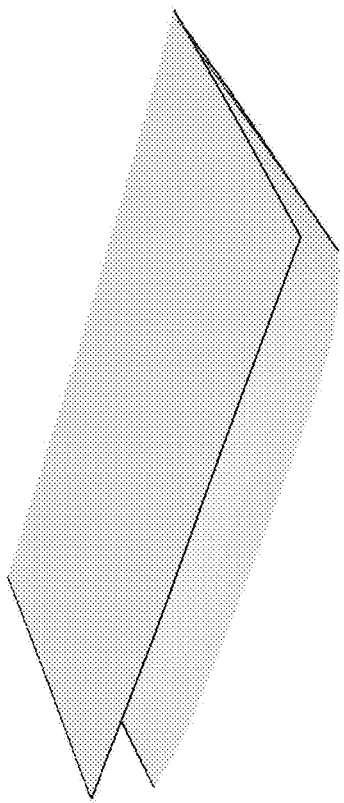
FIG. 8D shows an isometric view of a rolled Z Hinge.

FIG. 8A shows a cross section view of a Z Hinge. FIG. 8B shows an isometric view of an opened Z Hinge. FIG. 8C shows an isometric view of a flattened Z Hinge. FIG. 8D shows an isometric view of a rolled Z Hinge.

Figure 9:
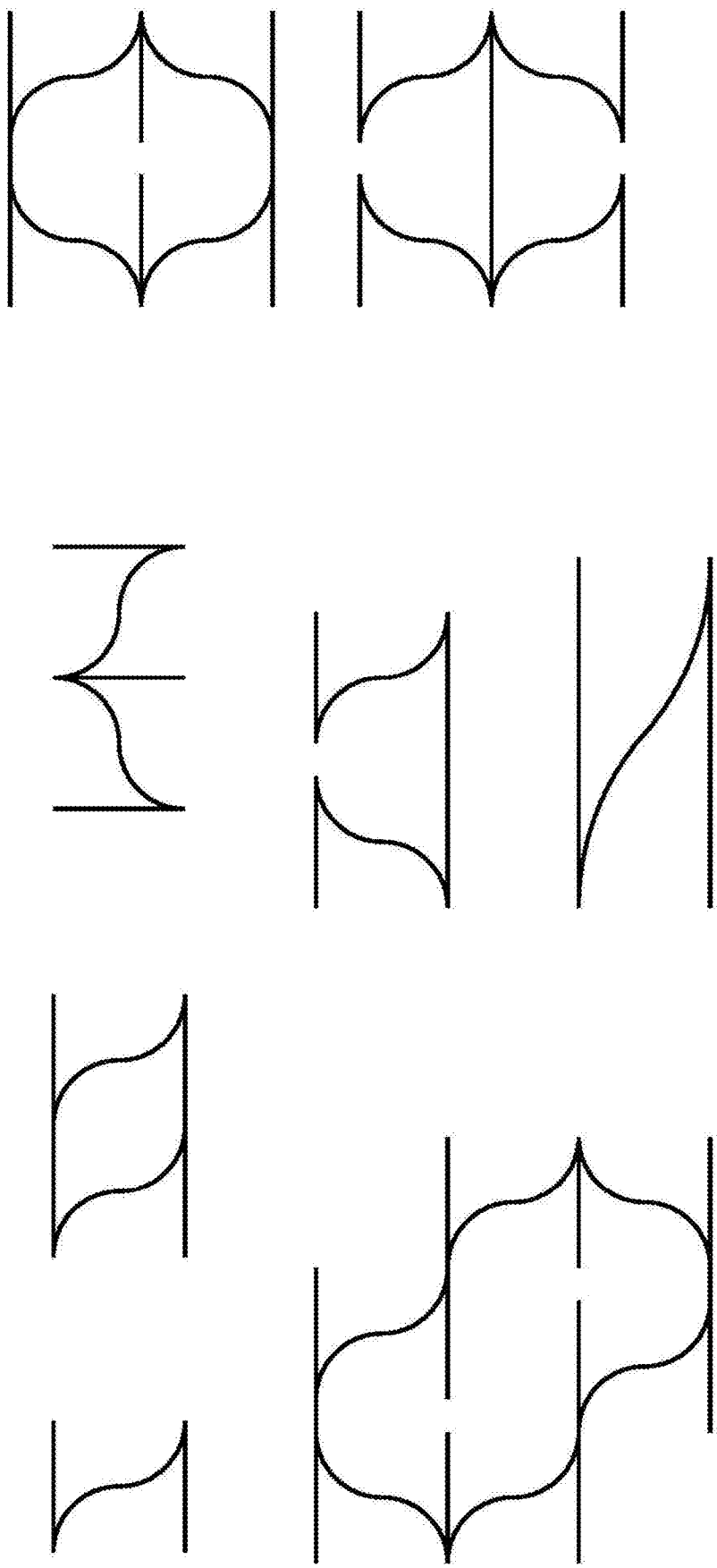
FIG. 9 shows another drawing showing end view cross section classes of exemplary Z Boom deformable structures.

FIG. 9 shows another drawing showing end view cross section classes of exemplary Z Boom deformable structures.

Figure 10:
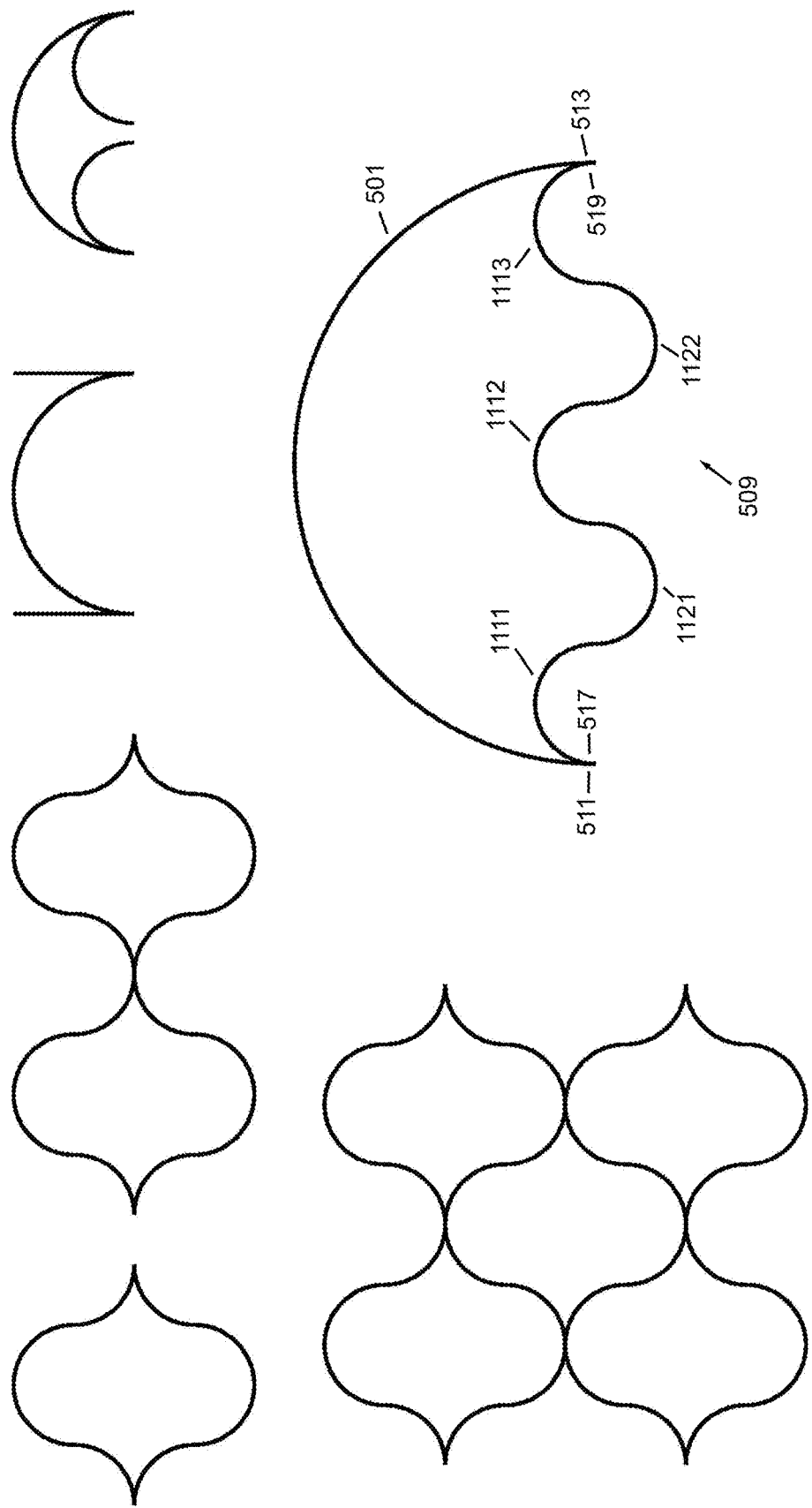
FIG. 10 shows another drawing showing end view cross section classes of exemplary C Boom deformable structures.

FIG. 10 shows another drawing showing end view cross section classes of exemplary C Boom deformable structures.

Figure 11:
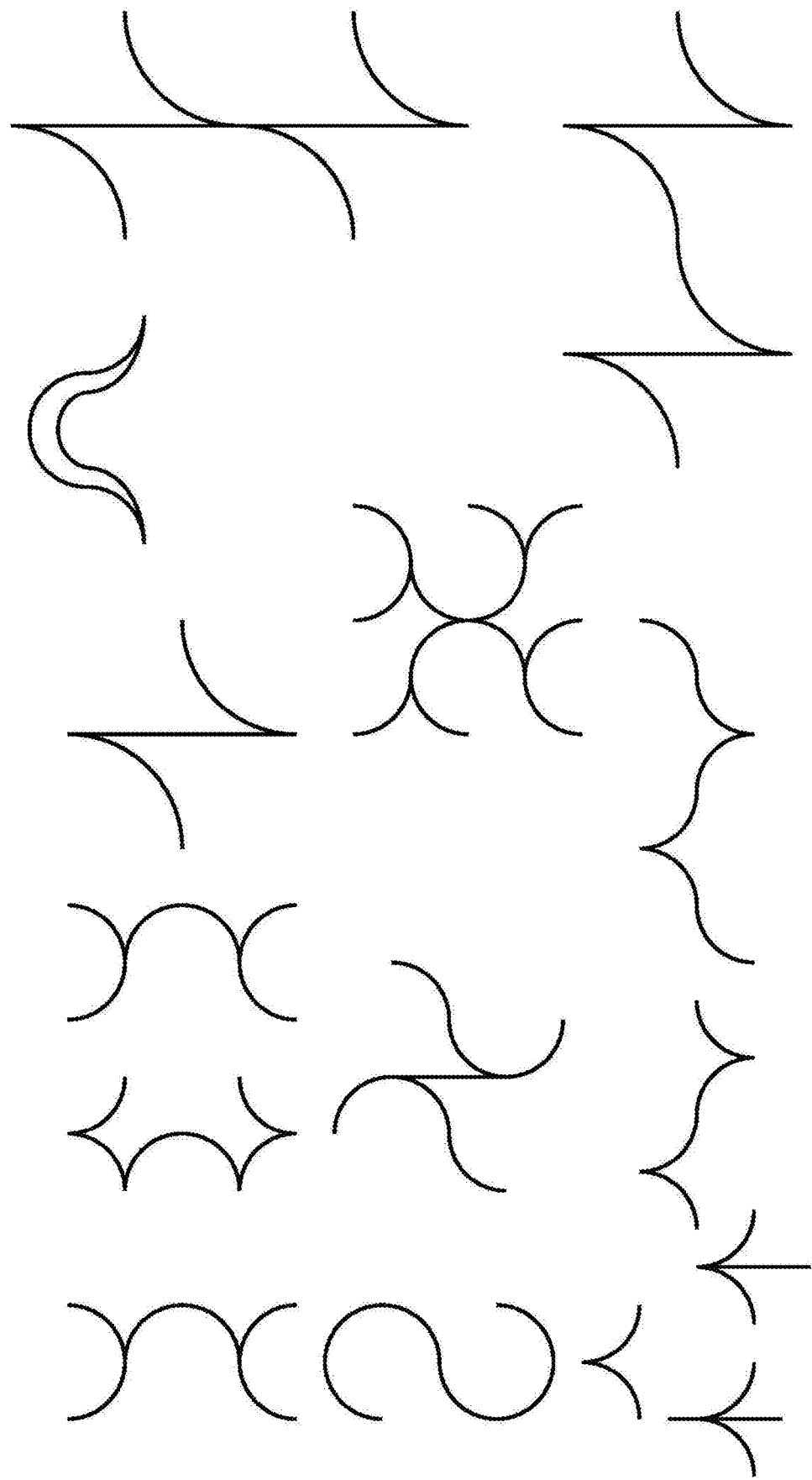
FIG. 11 shows yet another drawing showing end view cross section classes of exemplary C Boom deformable structures.

FIG. 11 shows yet another drawing showing end view cross section classes of exemplary C Boom deformable structures.

Figure 12:
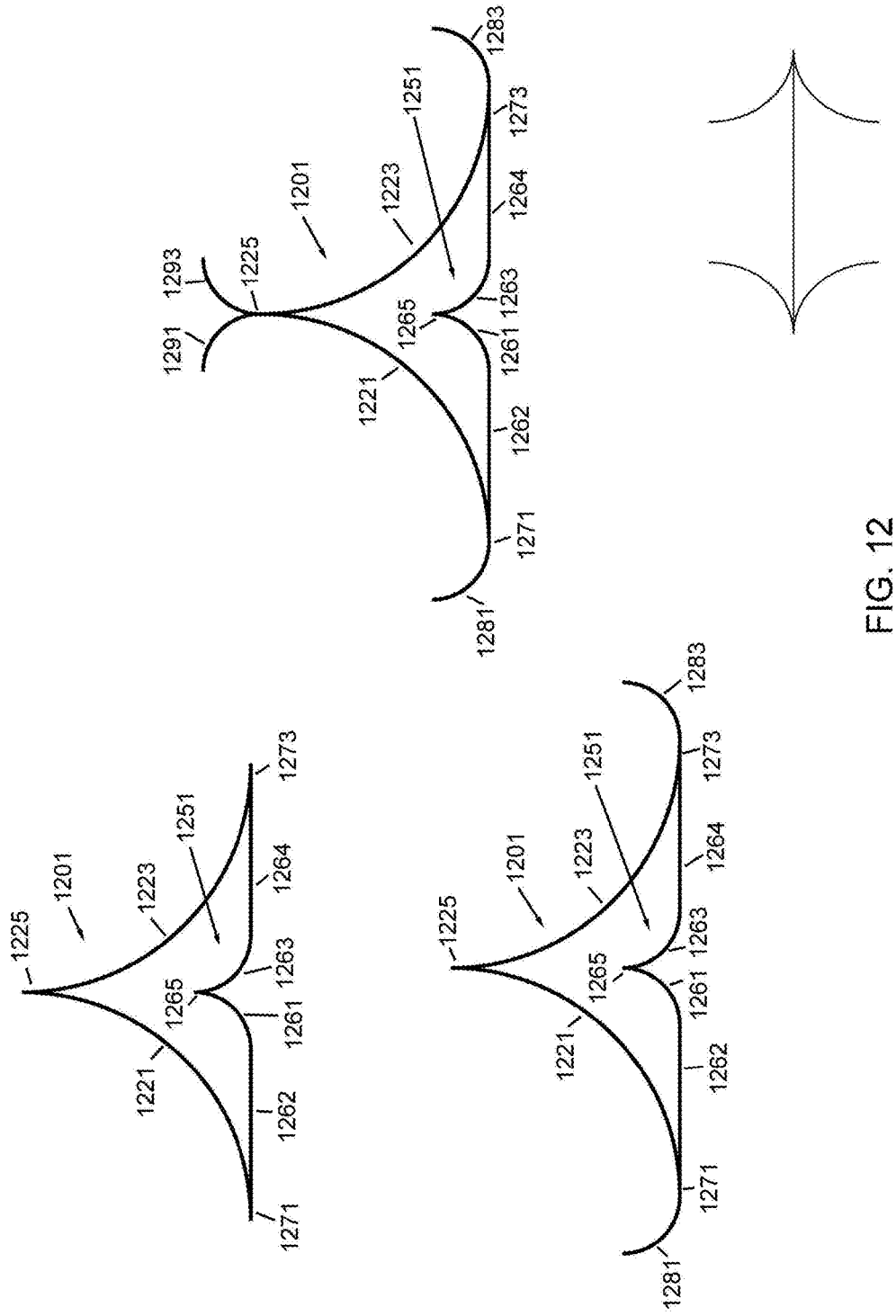
FIG. 12 shows yet another drawing showing end view cross section classes of exemplary C Boom deformable structures.

FIG. 12 shows yet another drawing showing end view cross section classes of exemplary C Boom deformable structures. In the top left and bottom two cross section drawings (end view) of FIG. 12, an end face cross section of the deformable beam or hinge includes a first about V shaped member 1201 defined by a pair of first member arcs 1221, 1223 joined at a first end of each first member arc to form a first vertex 1225. A second about V shaped member 1251 is defined by a pair of second member arcs 1261, 1263 joined at a first end of each second member arc to form a second vertex 1265. A pair of substantially flat trailing sections 1262, 1264 on either side of an opposite end of each second member arc 1261, 1263, and an opposite end of each first member arc is joined to an end of each of the pair of substantially flat trailing sections at joints 1271, 1273.

In the lower two cross sections of FIG. 12, at least one of the pair of substantially flat trailing sections on either side of an opposite end of each second member arc 1281, 1283 continues past a joined section 1271, 1273 and curves towards a direction about perpendicular to an axis of the pair of substantially flat trailing sections 1262, 1264.

In the lower right side cross sections of FIG. 12, at least one of the pair of first member arcs 1221, 1223 continues past 1291, 1293 a joined section at the first vertex 1225 and curves outward towards a direction about parallel to an axis of the pair of substantially flat trailing sections.

Another way to view or conceptualize the lower cross sections of FIG. 12 is as, two angled about C shaped members joined at a vertex with the ends of the about C shaped members disposed in two about flattened C shaped members sitting side by side. In the lower right side cross sections of FIG. 12, the two angled about C shaped members can also be viewed as joined at their shoulders.

Figure 13:
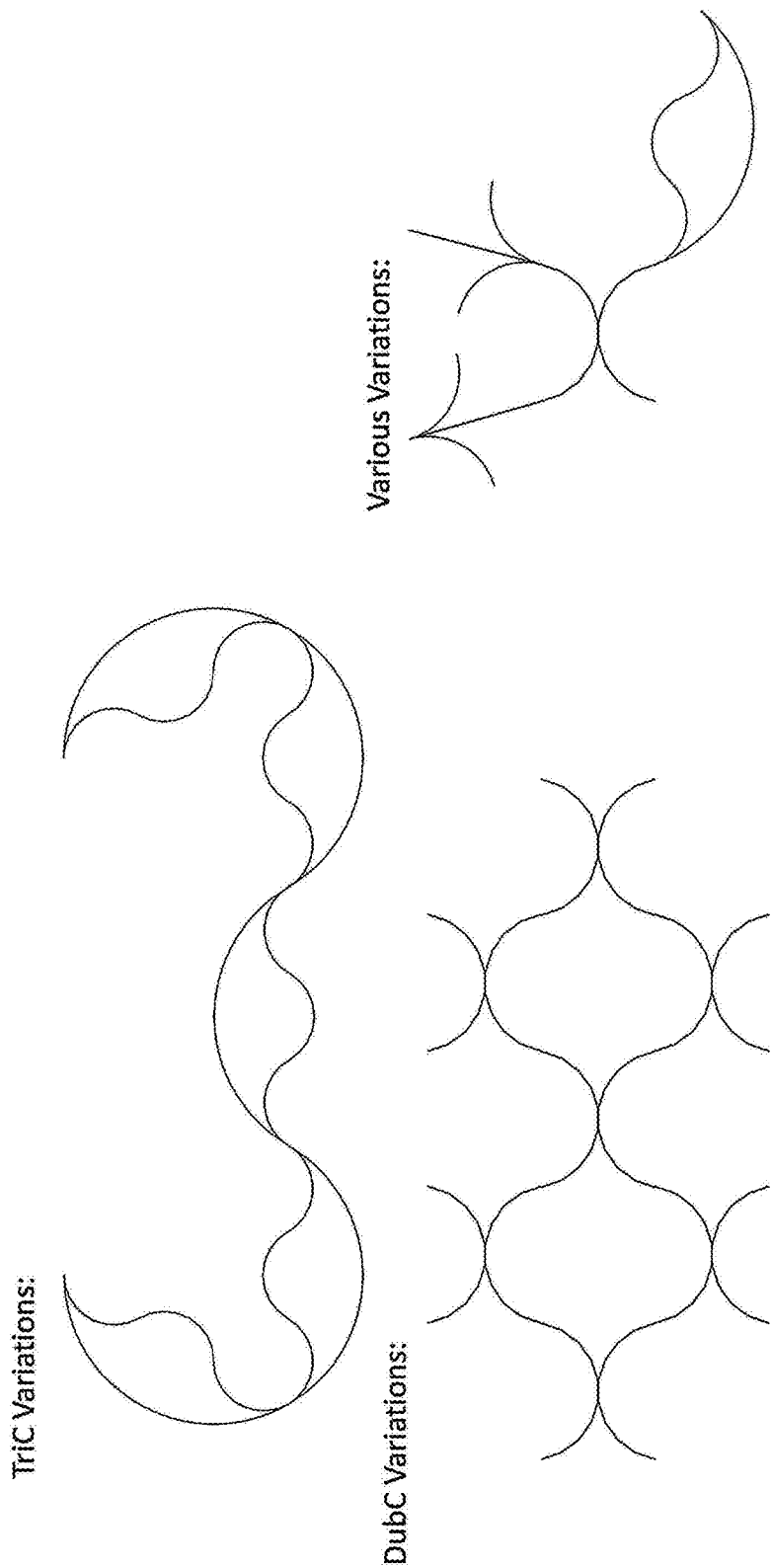
FIG. 13 shows yet another drawing showing end view cross section classes of exemplary TriC variation, DubC Variation, and other variation deformable structures.

FIG. 13 shows yet another drawing showing end view cross section classes of exemplary TriC variation, DubC Variation, and other variation deformable structures.

End Modifications

In most embodiments, the strongest and the stiffest structure is obtained by mounting a deformable structure such that one or both ends of the structure do not deform, i.e., the deformable structures are mounted by any suitable mounting means (e.g., bonded, clamped, bolted, etc.) to an effectively rigid structure.

However, the transition from the deformed flattened state to an un-deformed end can result in stress and strains that are much higher than those generally occurring in the main rolled section. These stress and strain concentrations can be alleviated by tailoring the geometry of the structure at the ends and also by tailoring the geometry of the un-deformed part of the hinge (the mount region).

Examples of such end modifications are shown in the drawings of FIG. 14-FIG. 17. The modifications include 1) Cut-outs (end geometry modification, cutout lines); 2) Mount modifications (changes to the effectively rigid mounting region, rigid lines); Structures may be mounted only by the solid rigid line or over the region encompassed by the dashed rigid line; and 3) Any suitable combinations of the two modifications.

Figure 14:
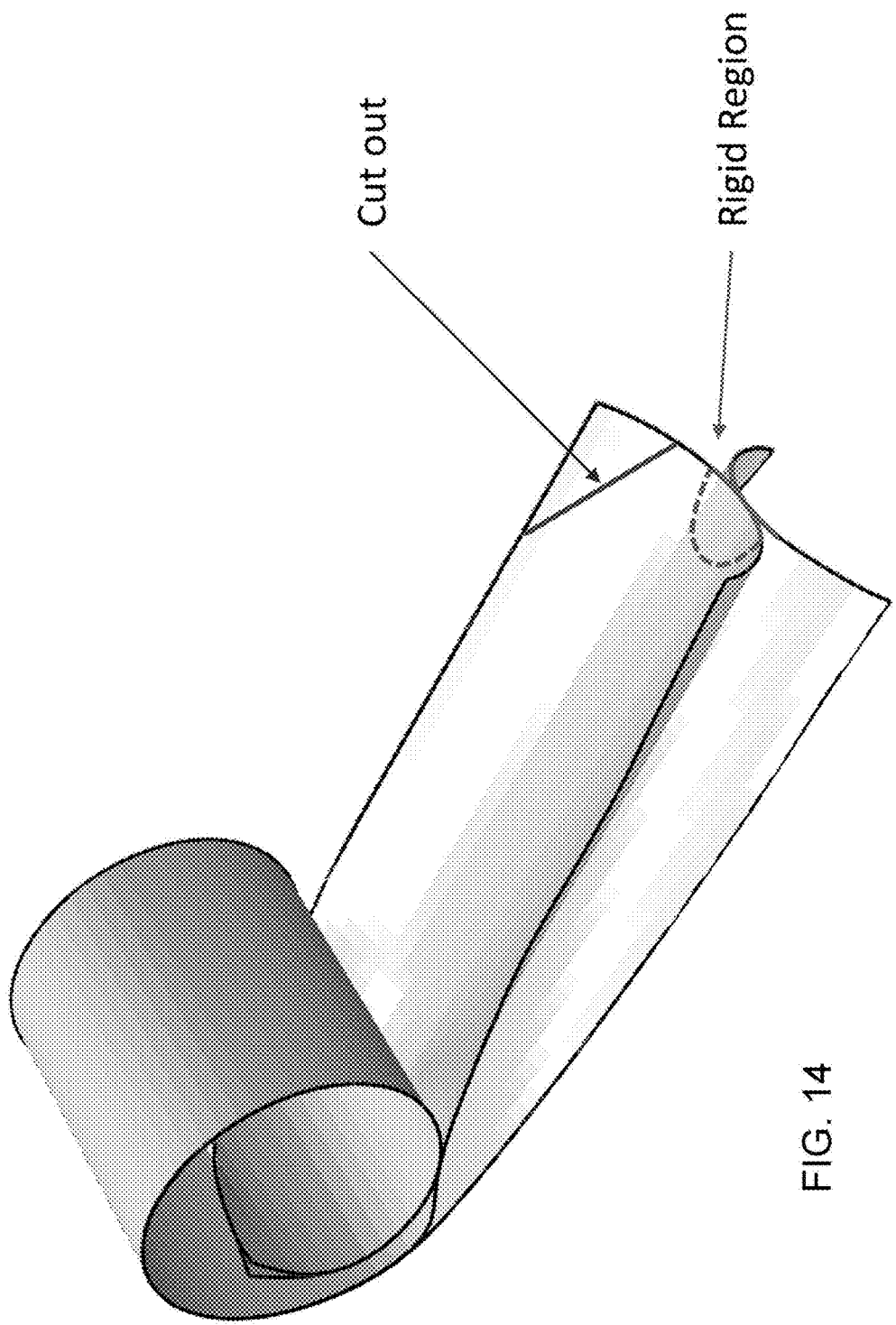
FIG. 14 shows exemplary DubC end modifications.
Figure 15:
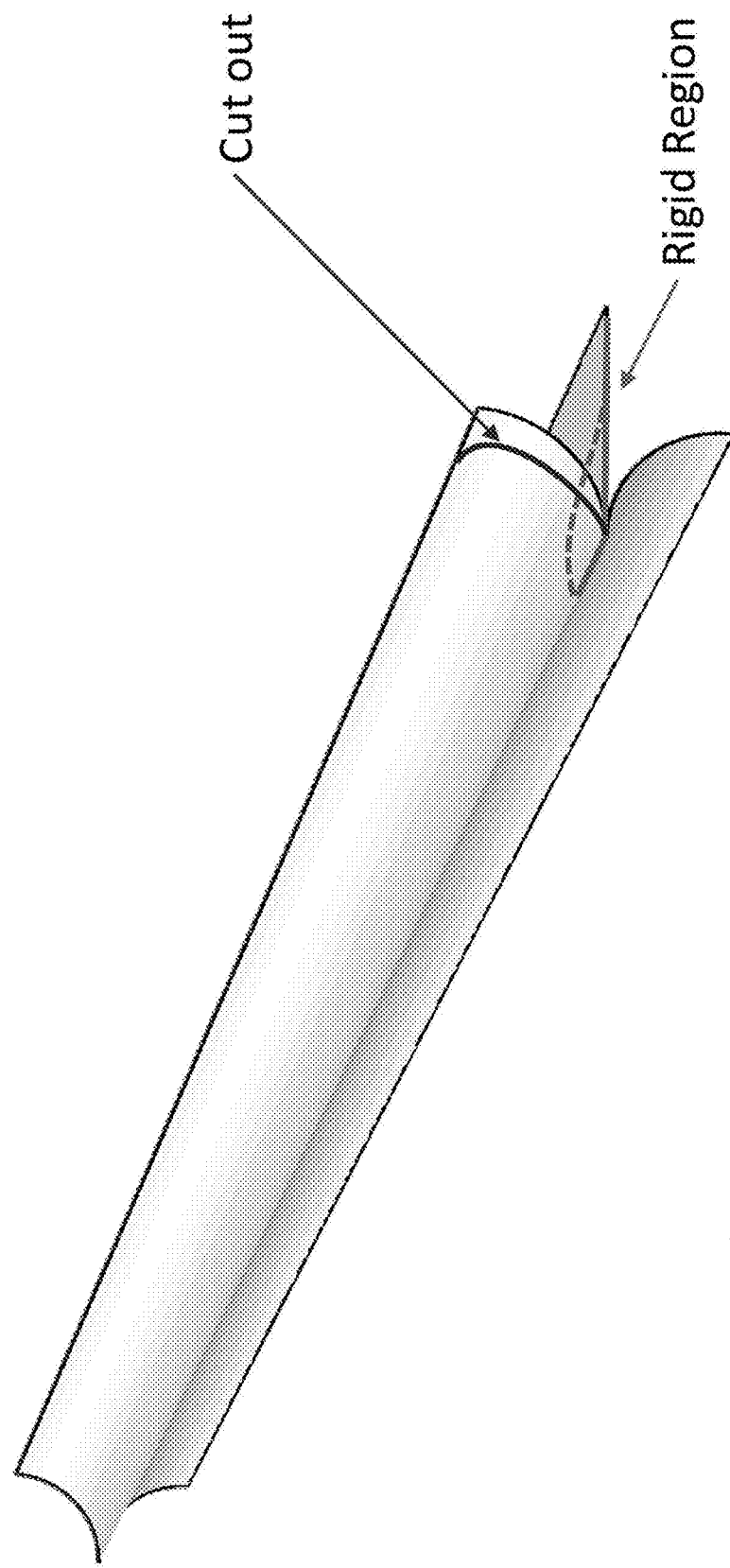
FIG. 15 shows exemplary MidC end modifications.
Figure 16:
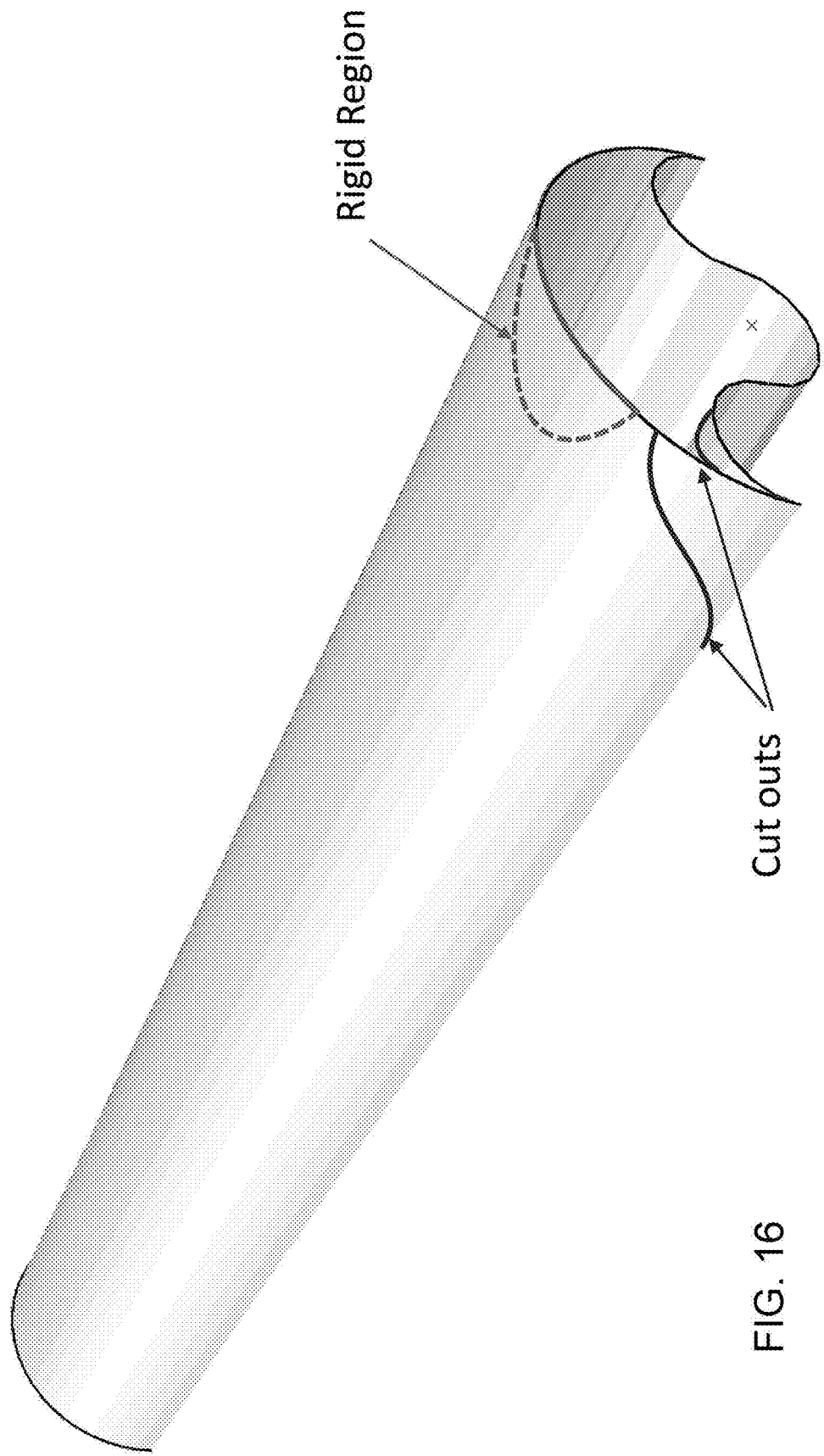
FIG. 16 shows exemplary TriC end modifications.
Figure 17:
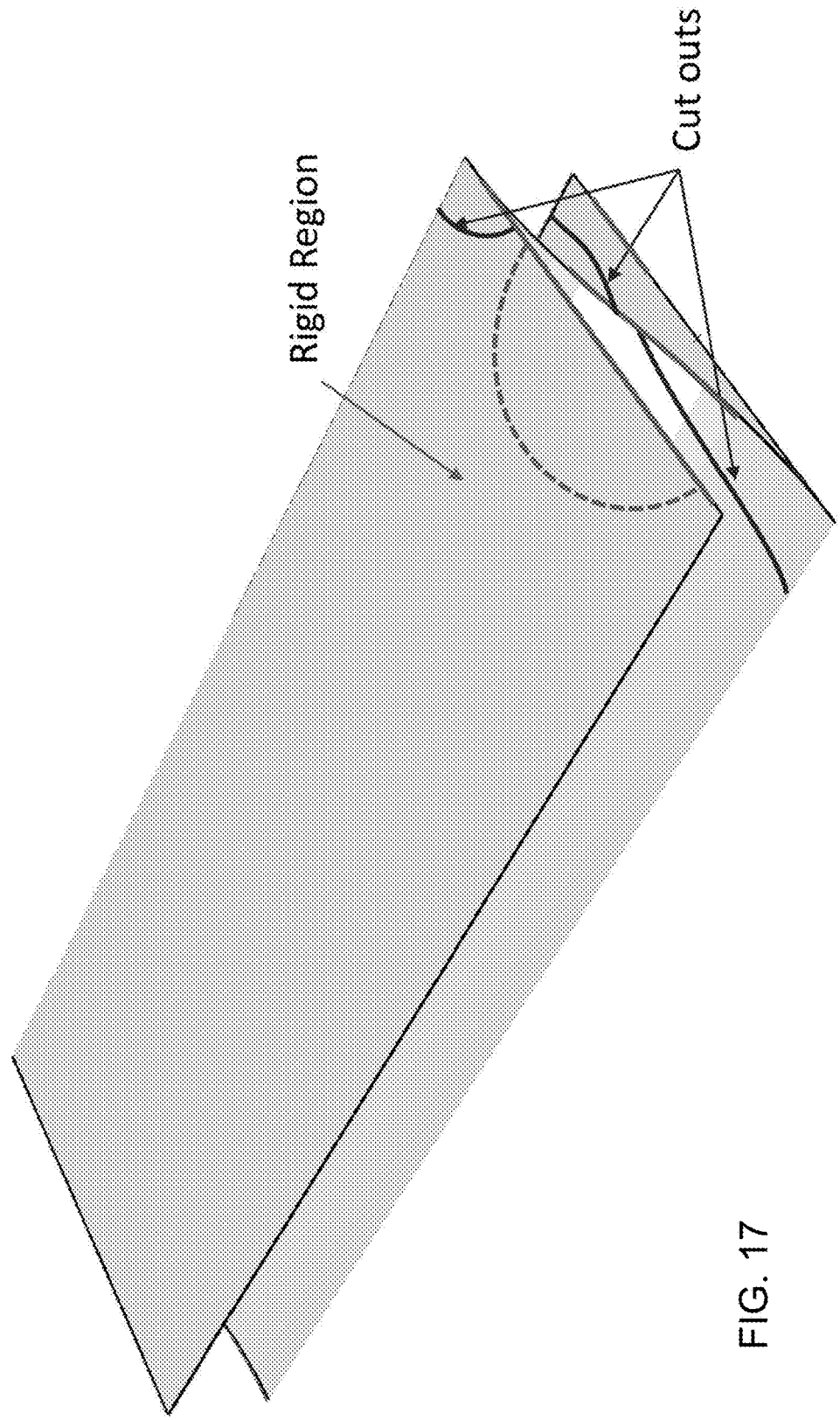
FIG. 17 shows exemplary Z Boom end modifications.

FIG. 14 shows exemplary DubC end modifications. FIG. 15 shows exemplary MidC end modifications. FIG. 16 shows exemplary TriC end modifications. FIG. 17 shows exemplary Z Boom end modifications.

Composite Laminates

Composite laminates are an example of a suitable material from which to make the deformable structures described in this Application. When fabricated from laminated fibrous (continuous or short fibers) composite materials, the fiber orientation within a ply can be tailored to achieve a better structure (stronger, stiffer, more deformable, increased dimensional stability, etc.). Also, the lamina and laminate thicknesses can be non-uniformly varied with the structure cross section to place more material where it is needed and less where it is not needed. The laminate can be modified to reduce mass, increased stiffness and strength in the extended state, reduce material stress and to enable more compact packaging in the rolled state, or to reduce stress concentrations in the ends.

Where thickness is added, the material could be a unidirectional (UD) type or balanced (B) type. The thickness variation is applicable to any material used in fabrication of the structure (e.g., metals and plastics).

The drawings of FIG. 18A to FIG. 25 show exemplary laminate configurations designed to achieve specific benefits. The 0° direction is parallel to the prismatic (long) axis on the structure (perpendicular to the plane of the cross section). The 90° direction lines with the plane of the cross section and is parallel to the laminate. Off axis directions (e.g., 45°) lie between 0° and 900 and are also parallel to the laminate.

Laminate plies are either Uni Directional (UD, all fibers in one direction) or Balanced (B, an equal number of fibers in the +0 and −9 directions). Balanced plies are readily achieved with weaves (e.g. plain weave with fibers at +45° and −45°) or with several plies of Uni Directional materials, e.g. Ø[+0−0], [+0−0+0−0], and [+0−0−0+0].

Laminates are described as: [ply 1/ply 2/ply 3/etc.] where "ply n" is either UD or B. UD is followed by the fiber direction (e.g., UD@0° to indicate a uni directional ply with fibers parallel to the long axis). "B" alone is understood to include any suitable type of balanced ply. It shall also include [0/90] woven and UD laminates and variations. Where the laminate is not symmetric, e.g. [UD@0/B], the reversed laminate is also claimed, as in [B/UD@0]. Some or all B plies may be replaced with "T" plies where T indicates the ply is continuous or short fiber textile made by braiding or weaving processes. T plies may have groups of fibers in 0, 90, +45, −45, theta, any combination of these orientations and relative quantities.

FIG. 18A and FIG. 18B show drawings of DubC structures with a laminate thickness variation across the structure. FIG. 18A shows end view of a DubC deformable structure having a thicker center relative to the tips, which provides an enhanced axial stiffness. FIG. 18B shows end view of a DubC deformable structure having thicker tips relative to the center portion, which provides an enhanced bending stiffness.

FIG. 19A-FIG. 19D show drawings of various DubC fiber orientations. FIG. 19A shows an end view of a DubC [B/UD@0/B] center, [B] ends deformable structure, which provides an enhanced axial stiffness. FIG. 19B shows an end view of a [DubC UD@O/B/UD@O] center B ends deformable structure, which provides an enhanced bending stiffness. FIG. 19C shows an end view of a DubC UD@0/B/UD@0 center [B/UD@0] ends deformable structure, which provides an enhanced bending stiffness. FIG. 19D shows an end view of a DubC of substantially all [B/UD@0/B] deformable structure, which provides an enhanced torsional stiffness. FIG. 19E shows an end view of a DubC deformable structure of substantially all [UD@0/B/UD@0]. These variations show the benefits of 1) modification of the laminate stacking sequence and 2) modification of relative lamina thicknesses. Laminate stacking sequence is more uniform and easier to fabricate while modification of relative lamina thickness offers higher performance, but is more complex and difficult to fabricate.

FIG. 20A-FIG. 20B show drawings of various MidC laminate thickness variations. FIG. 20A shows a drawing of MidC deformable structure with a thicker center relative to the tips, which provides an enhanced axial stiffness. FIG. 20B shows a drawing of MidC deformable structure with thicker tips relative to the center, which provides an enhanced bending stiffness.

Figure 21A:
FIG. 21A shows an end view of a MidC center member [B/UD@O/B] and curved members of [B]
Figure 21B:
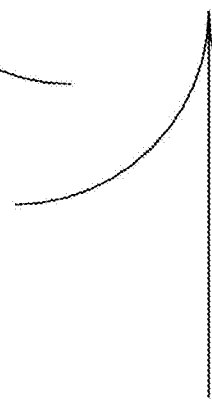
FIG. 21B shows an end view of a MidC deformable structure substantially all of [B/UD@O/B]
Figure 21C:
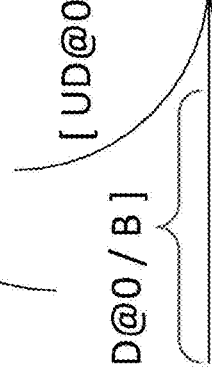
FIG. 21C shows an end view of a MidC deformable structure, with a [B/UD@O/B] central member and curved members of [B/UD@O/B]

FIG. 21A-FIG. 21C show drawings of various MidC fiber orientations. FIG. 21A shows an end view of a MidC center member [B/UD@0/B] and curved members of [B] deformable structure, which provides an enhanced axial stiffness. FIG. 21B shows an end view of a MidC deformable structure substantially all of [B/UD@0/B1], which provides an enhanced bending strength. FIG. 21C shows an end view of a MidC deformable structure, with a [B/UD@O/B1] central member and curved members of [B/UD@O/B1], which provides a low mass balance between stiffness and strength.

Figure 22A:
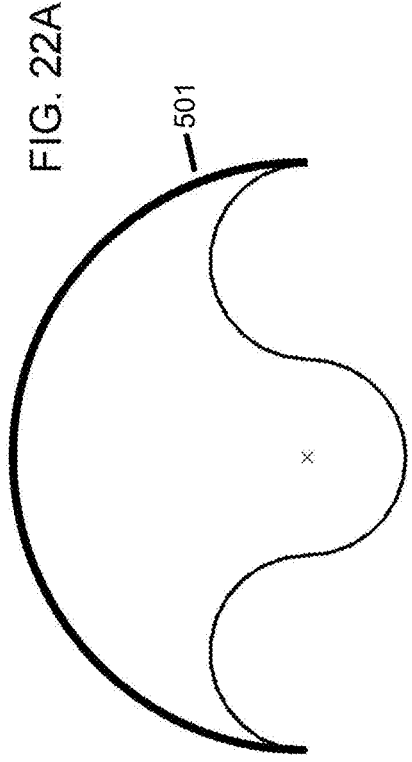
FIG. 22A shows an end view of a TriC deformable structure with a thicker main circle portion relative to the other portions of the TriC structure.
Figure 22C:
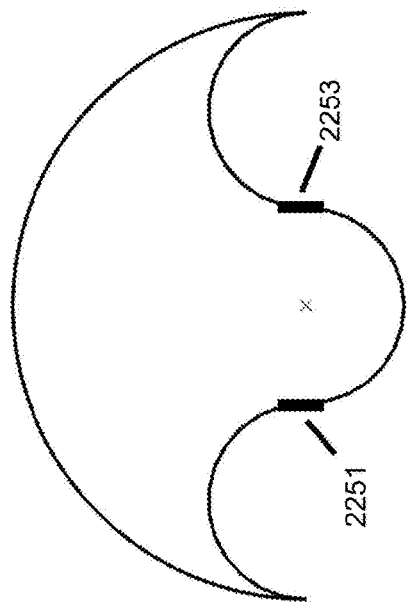
FIG. 22C shows an end view of a TriC deformable structure with different noted thicker regions relative to the other portions of the TriC structure.
Figure 22B:
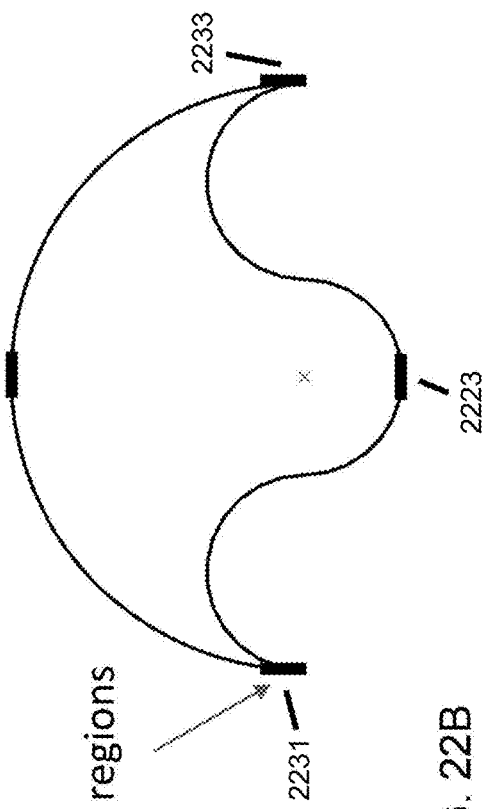
FIG. 22B shows an end view of a TriC deformable structure with noted thicker regions relative to the other portions of the TriC structure.

FIG. 22A-FIG. 22C show drawings of various TriC laminate thickness variations. FIG. 22A shows an end view of a TriC deformable structure with a thicker main circle portion relative to the other portions of the TriC structure. FIG. 22B shows an end view of a TriC deformable structure with noted thicker regions relative to the other portions of the TriC structure. FIG. 22C shows an end view of a TriC deformable structure with different noted thicker regions relative to the other portions of the TriC structure.

Figure 23A:
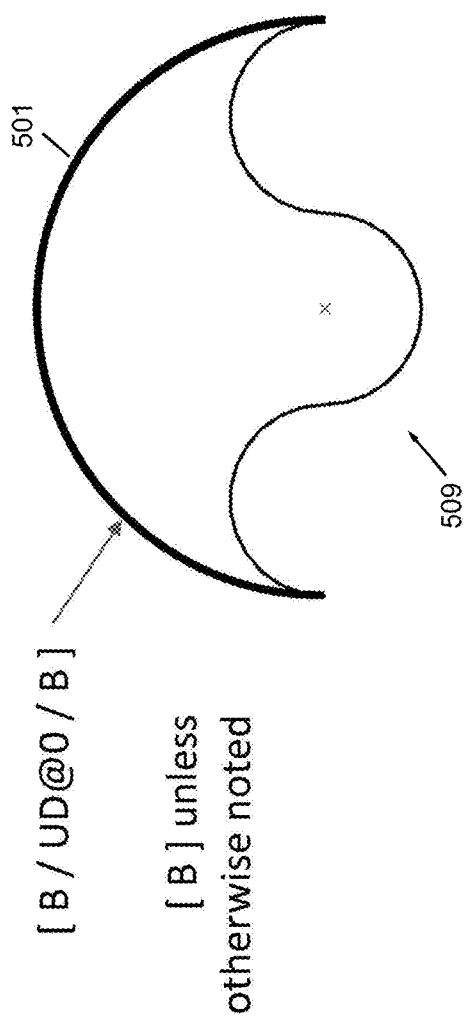
FIG. 23A shows an end view of a TriC deformable structure with a [B/UD@0/B] main circle portion, where the other portions are [B]
Figure 23C:
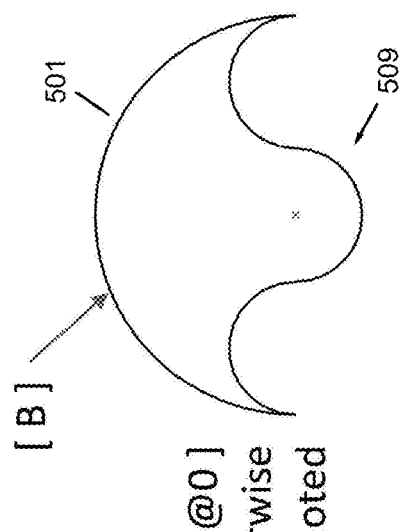
FIG. 23C shows an end view of a TriC deformable structure with al B main circle portion, where the other portions are [B/UD@O]
Figure 23B:
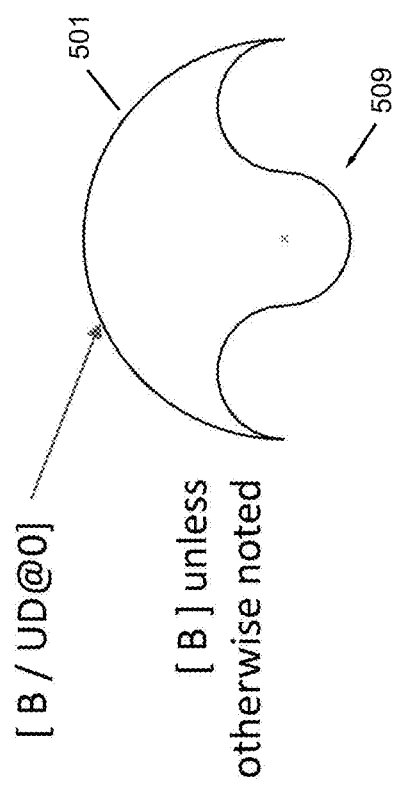
FIG. 23B shows an end view of al B type TriC deformable structure with a [B/UD@0/B] main circle portion, where the other portions are [B]

FIG. 23A-FIG. 23C show drawings of various TriC fiber orientations. FIG. 23A shows an end view of a TriC deformable structure with a [B/UD@0/B] main circle portion, where the other portions are B 1, which provides an enhanced axial stiffness. FIG. 23B shows an end view of al B type TriC deformable structure with a [B/UD@0] main circle portion, where the other portions are B 1, which provides an enhanced torsional stiffness. FIG. 23C shows an end view of a TriC deformable structure with al B main circle portion, where the other portions are [B/UD@O], which provides an enhanced thermal stability.

Figure 24A:
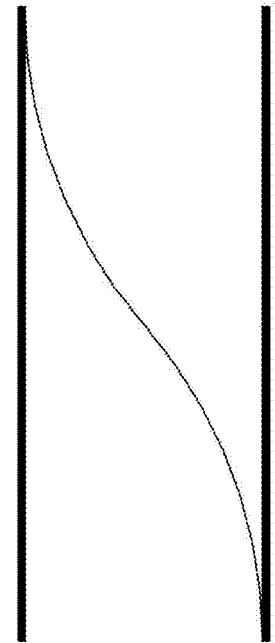
FIG. 24A shows a drawing of Z Boom deformable structure with thicker flats relative to the center curved portion.
Figure 24B:
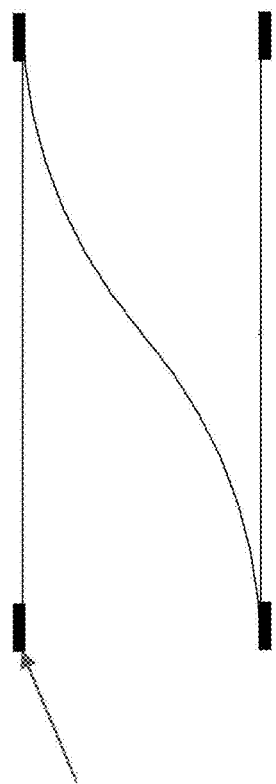
FIG. 24B shows a drawing of Z Boom deformable structure with noted thicker regions relative to the other portions.

FIG. 24A-FIG. 24B show drawings of various Z Boom laminate thickness variations. FIG. 24A shows a drawing of Z Boom deformable structure with thicker flats relative to the center curved portion, which provides an enhanced axial and bending stiffness. FIG. 24B shows a drawing of Z Boom deformable structure with noted thicker regions relative to the other portions, which provides an enhanced bending stiffness with low mass.

Figure 25:
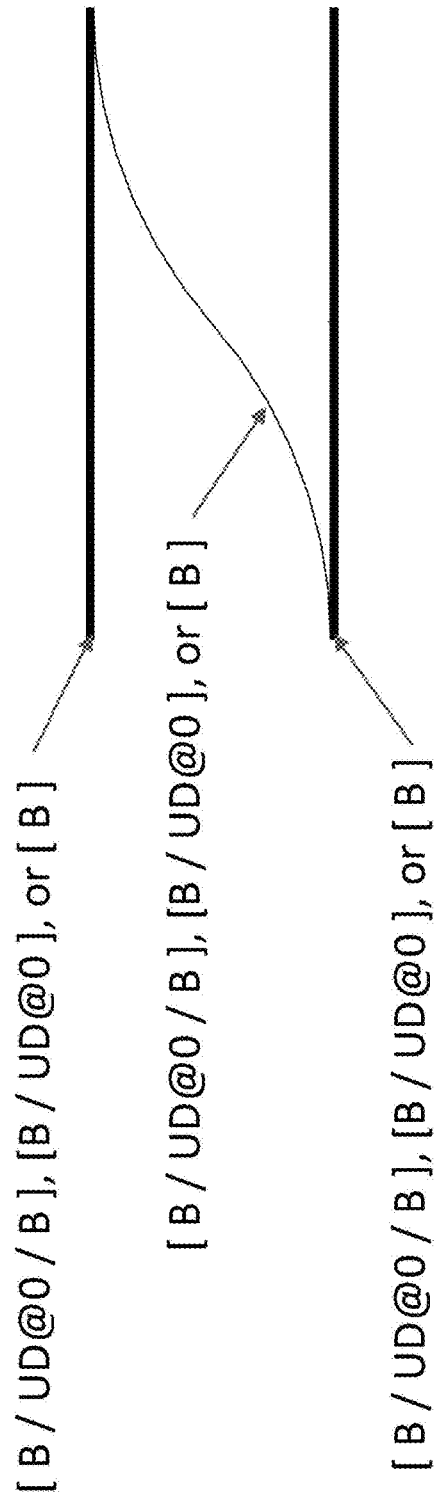
FIG. 25 shows drawings of various Z Boom fiber orientations.
Figure 26:
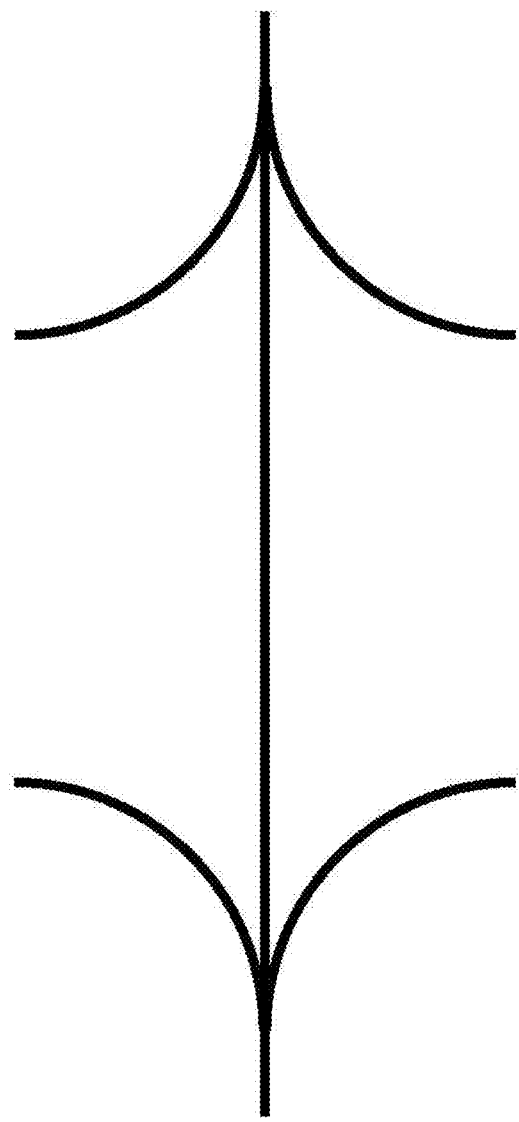
FIG. 26 shows a drawing of another exemplary MidC deformable structure with double opposing portions.

FIG. 25 show drawings of various Z Boom fiber orientations. As shown by FIG. 25, the either or both of the flats and/or the center curved portion can included any of the [B/UD@O/B], [B/UD@0], and/or [B] fiber orientations or any combinations thereof.

Deformable structures can be made from any suitable relatively thin material that can be shaped to the desire cross section. While composite materials often provide the highest performance, they may be expensive, difficult to acquire, difficult to fabricate, or not have appropriate physical properties (strength, conductivity, density, thermal expansion) for an application. Alternate materials are relatively thin metal sheets, for example spring tempered steal, brass, aluminum, copper, nickel, titanium, and alloys containing these metals. Deformable structures can also be formed from plastic sheets, for example, polyamide, polyimide, thermosets, and thermoplastics. Beam flattened widths are typically 10 to 1,000 times the material thickness.

FIG. 27A shows a drawing of yet another exemplary TriC deformable structure with about flat sections. FIG. 27B shows a drawing of yet another exemplary TriC deformable structure with about circular sections. FIG. 27C shows a drawing of yet another exemplary TriC deformable structure with near or about circular sections. FIG. 27D shows a drawing of yet another exemplary TriC deformable structure with near or about circular sections where the about circular sections including the C sections have a main curve which instead of closing as a circle (e.g. FIG. 27B, FIG. 27C), turns out or outwards, or flares out or outwards, at either end, such as into substantially flat or straight sections 2701, 2703 in an outward direction from a center of the main C curve. In the embodiment of FIG. 27D, the periodic C curved member 509 defines at least two about C shaped curves 2707, 2708.

Figure 28:
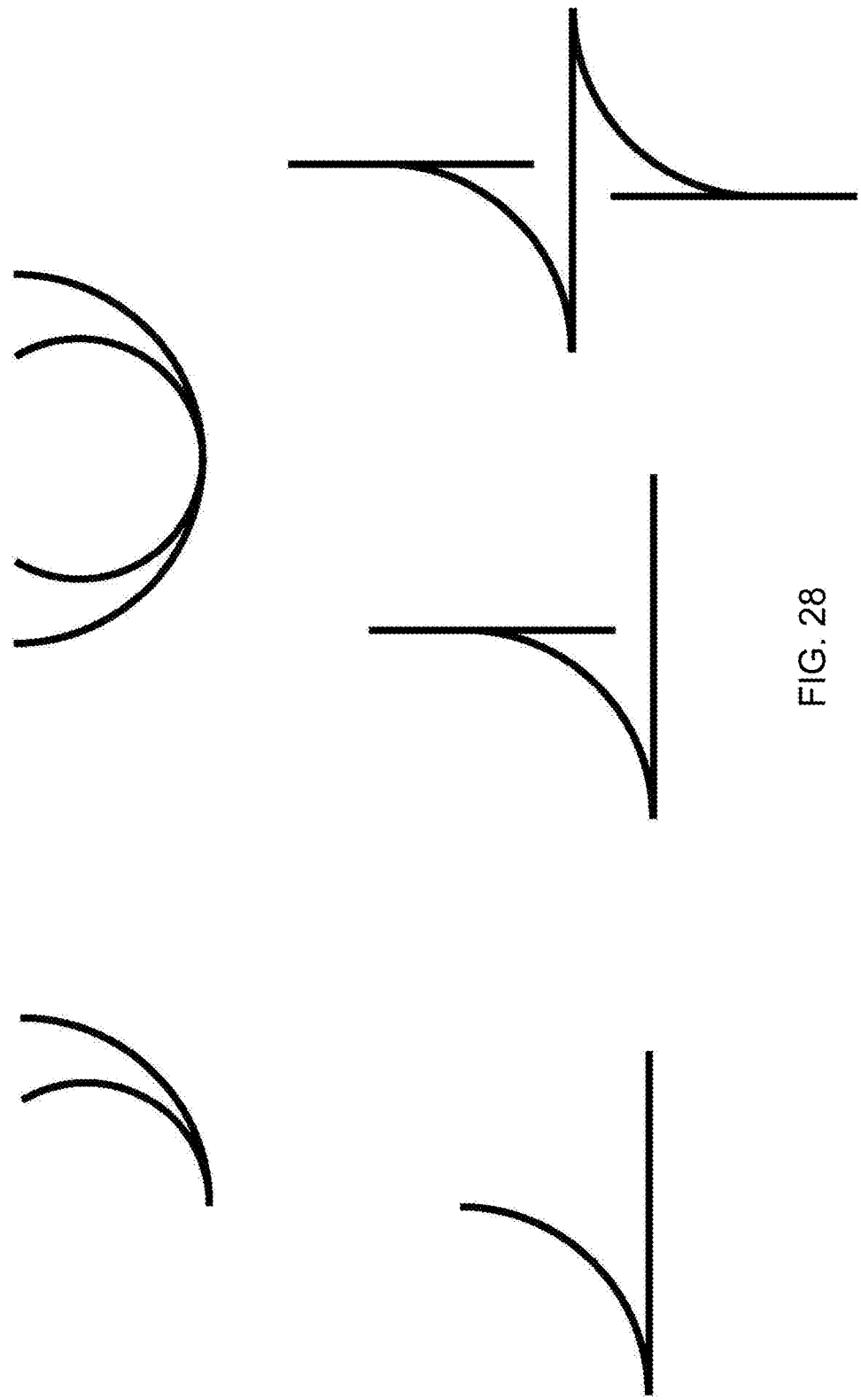
FIG. 28 shows yet another drawing showing end view cross section classes of exemplary TriC variation, DubC Variation, and other variation deformable structures.

FIG. 28 shows yet another drawing showing end view cross section classes of exemplary TriC variation, DubC Variation, and other variation deformable structures.

Collapsible Tubular Mast

Deformable beams can be used as mast booms which can be rolled into relatively compact forms for storage and transport. The main boom structural elements of CTM are typically roll deployed beams. Deformable hinges can also be used to fold mast booms for storage and transport.

Definitions

The various exemplary CTM which follow include perpendicular truss members called "battens" and diagonal truss members called "diagonals". These truss members can be substantially straight in cross section (CTM end view in the mast longitudinal direction) for substantially flat walls (e.g. FIG. 29D) or include one or more curves in cross section (CTM end view in the mast longitudinal direction) for curved walls or curved truss members forming substantially flat walls.

FIG. 29A is a drawing showing an exemplary C type CTM boom 2900. The cross section of FIG. 29D shows two opposing "V" sections (each with a C curve vertex, opposing C curves 2905, 2909) joined at two seams (2902, 2911). Each V half includes a C curve and two substantially flat walls ending in curves which form the seams. At the first end of each wall, the C curves 2905, 2909 transition into each of the two walls (C curve 2905 transitions into walls 2904, 2906, and C curve 2909 transitions into walls 2908, 2910). At the other end of each of the walls opposite the Curves, the wall curves for the seams 2902, 2911. Walls 2904, 2908 curve into seam 2902, and walls 2906, 2910 curve into seam 2911.

FIG. 29B is a drawing showing a magnified view of an end of the CTM boom of FIG. 29B.

FIG. 29C is a drawing showing a magnified view of a portion of the CTM boom of FIG. 29B. FIG. 29C shows one exemplary flat wall 2906. Flat wall 2906 (See also FIG. 29D) includes a cascaded series of a truss pattern including a perpendicular truss 2920, which is perpendicular to the longitudinal direction of the CTM 2900 boom, a diagonal truss 2921 at a first truss angle, another perpendicular truss 2920, followed by a diagonal truss 2923 at a second truss angle, and so on in a repeating pattern for about the length of the CTM 2900 boom.

Each of the perpendicular truss batten 2920 is disposed about 90° to the long axis of the seam 2911. Starting from the intersection of the perpendicular truss 2920 and the diagonal truss 2921, 2923, the diagonal truss can have a truss angle of about 45°+/−35° with respect to the batten 2920. As seen in FIG. 29C, there are typically intersections of perpendicular truss and diagonal truss at both the seam 2911 and at the C curves 2905, 2909. Other suitable truss patterns can be used.

FIG. 29D is a drawing showing an end section view of the CTM boom of FIG. 29A. In this new variation of a C type CTM boom 2900, the "C" portion is reduced to relatively smaller opposing C curves 2905, 2909. On a first longitudinal half of the CTM boom 2900, C curve 2905 joins substantially flat walls 2904, 2905, and C curve 2909 joins substantially flat walls 2908, 2910. To complete the CTM structure, flat walls 2904, 2905 are joined to flat walls 2908, 2910 respectively by corresponding seams 2902, 2911. Each of the walls, 2904, 2906, 2908, and 2910, curve outward for the respective seams 2902 and 2911.

About V shaped half, a V shaped portion with at least one curve (e.g. a curved ridge, a curved ridge including two or more curves, a C shaped vertex, or a flat back C vertex) in the vertex—About V shaped half includes structures which join two walls at some angle by a vertex having at least one curve. About V shaped is distinguished from "V shaped" in that typically the vertex is not a sharp right angled ridge (however, when the structure is deployed, for example, the walls of the about V shaped half can be any suitable angle with respect to each other, including 90°).

Vertex options—FIG. 29A to FIG. 29D show a CTM boom having a C curve which extends on either side to a wall. Generally, a CTM boom has a rounded vertex, typically a C shaped vertex, or a flat back C shape which includes a flat section with curves on either side of the flat (e.g. FIG. 30, FIG. 31). Any suitable curved vertex can be used.

Figure 30:
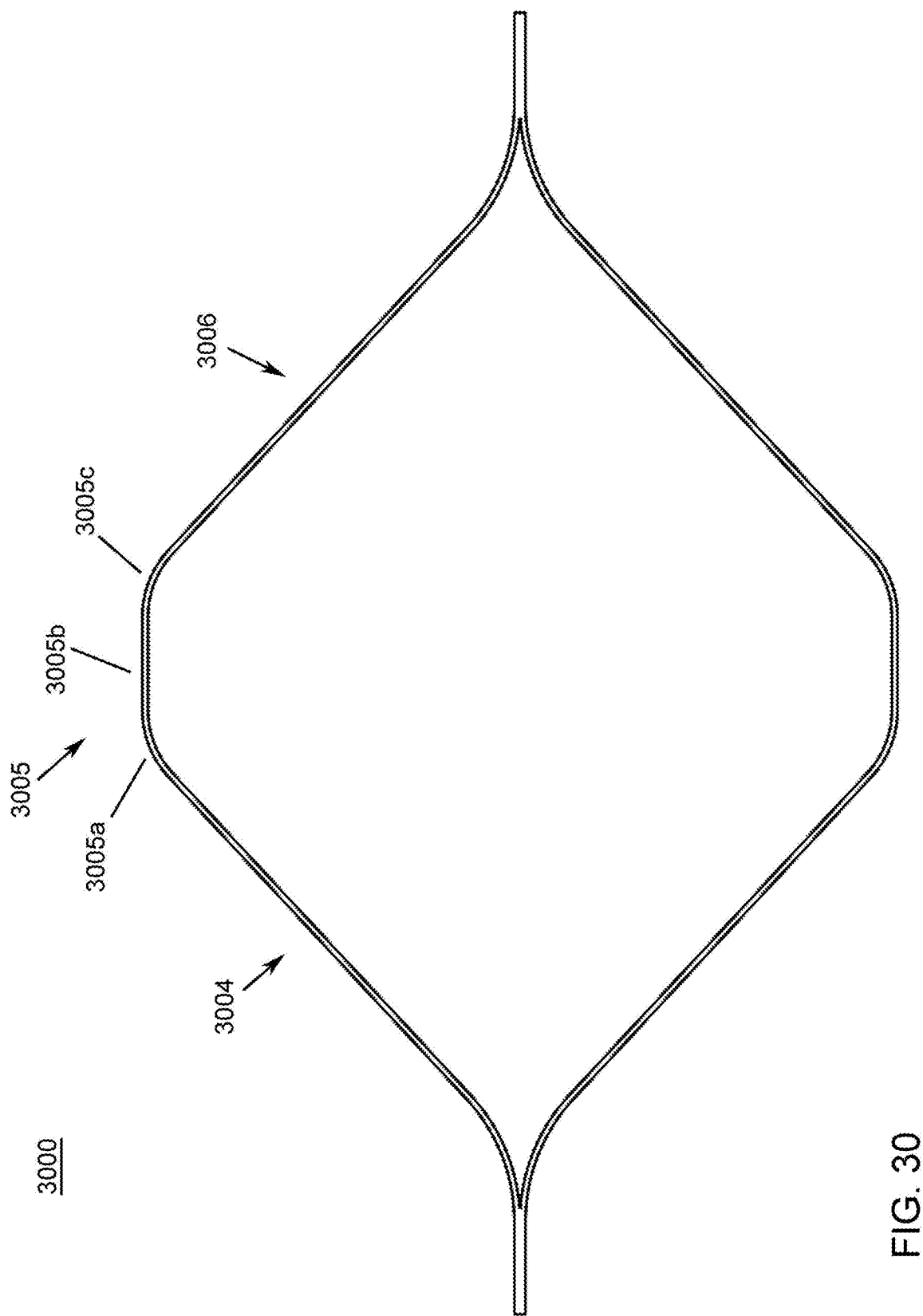
FIG. 30 shows a cross section of an exemplary CTM boom using a flat-back C curve.

Another suitable exemplary alternative vertex has a flatback C curve as the vertex. FIG. 30 shows a cross section of a CTM boom 3000 using a flat-back C curve 3005 having curves 3005a, 3005c and flat back 3005b, which extends into walls 3004, 3006.

Figure 31:
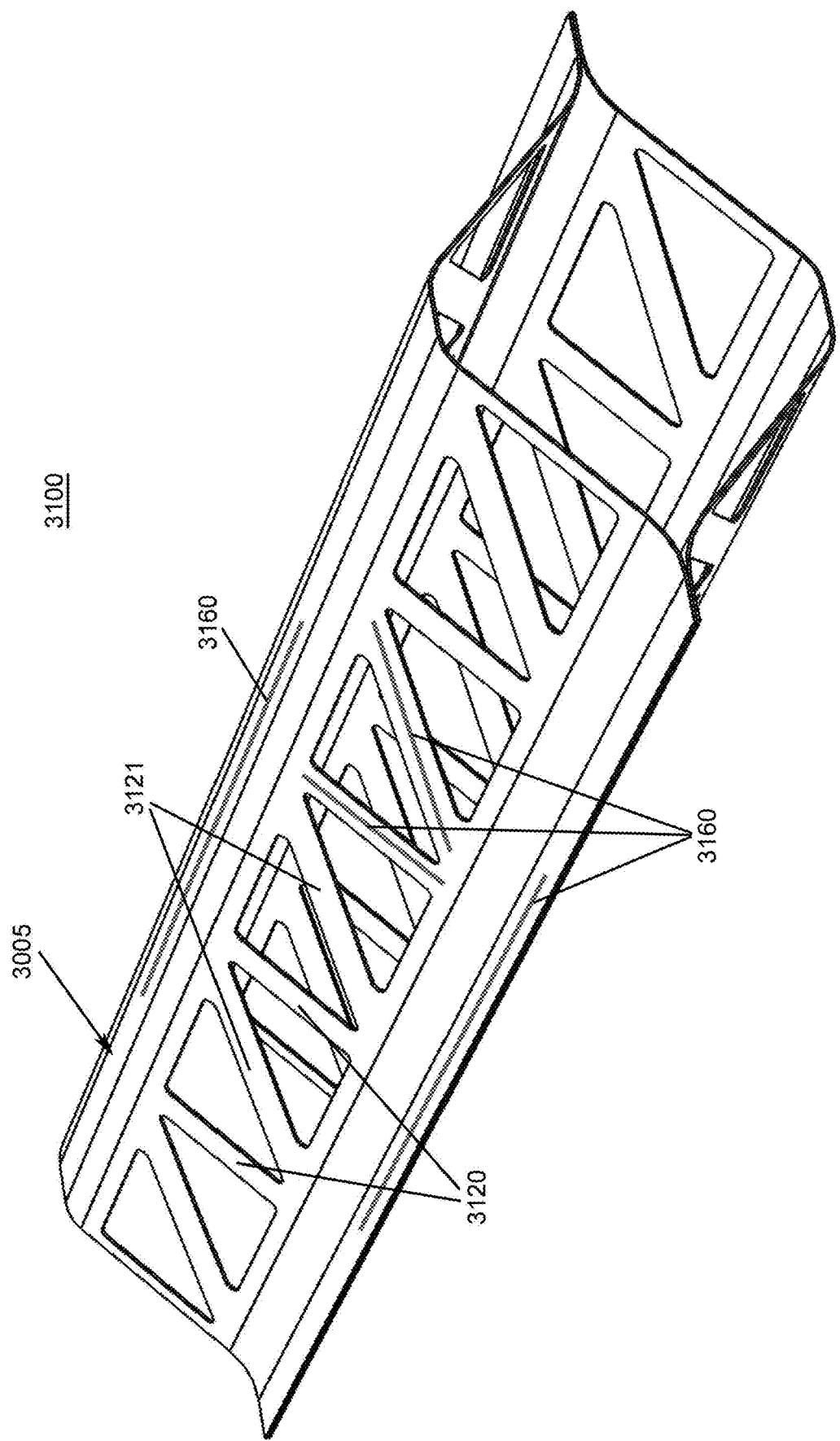
FIG. 31 shows an exemplary CTM boom using a flat-back C curve with an alternative truss pattern.

Truss patterns—FIG. 31 shows a CTM boom 3100 using a flat-back C curve 3005 with an alternative truss pattern to the trusses of FIG. 29A to FIG. 29D. The CTM boom 3100 includes successive patterns of batten 3120 and diagonal truss 3121 (similar to batten 2920 and diagonal truss 2921, FIG. 29C).

Figure 32:
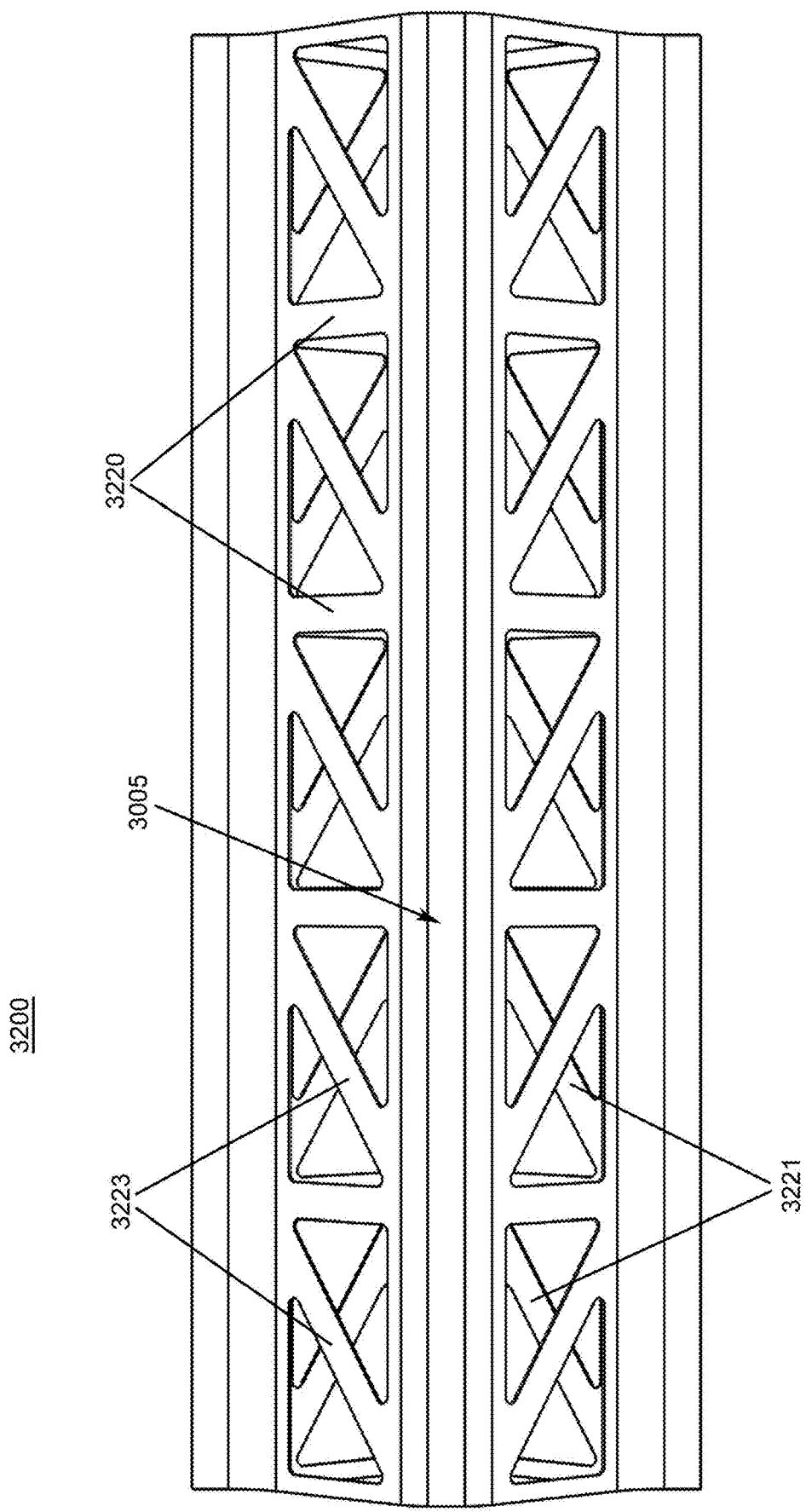
FIG. 32 shows another exemplary CTM boom using a flat-back C curve with a diagonal truss.

FIG. 32 shows a CTM boom 3200 using a flat-back C curve 3005 with diagonal truss 3223 on the first half "V" section (e.g. the upper section, FIG. 32) of two opposing V sections and different angles of diagonal truss 3221 on the second half V section (e.g. the lower section, FIG. 32) and perpendicular truss 3220. The different angles can be similar to the different diagonal trusses 2921, 2923 of FIG. 29C.

FIG. 31 and FIG. 32 have the same lacing pattern. In FIG. 31 and FIG. 32, the direction of the bottom diagonals is reversed relative to the top.

Figure 33:
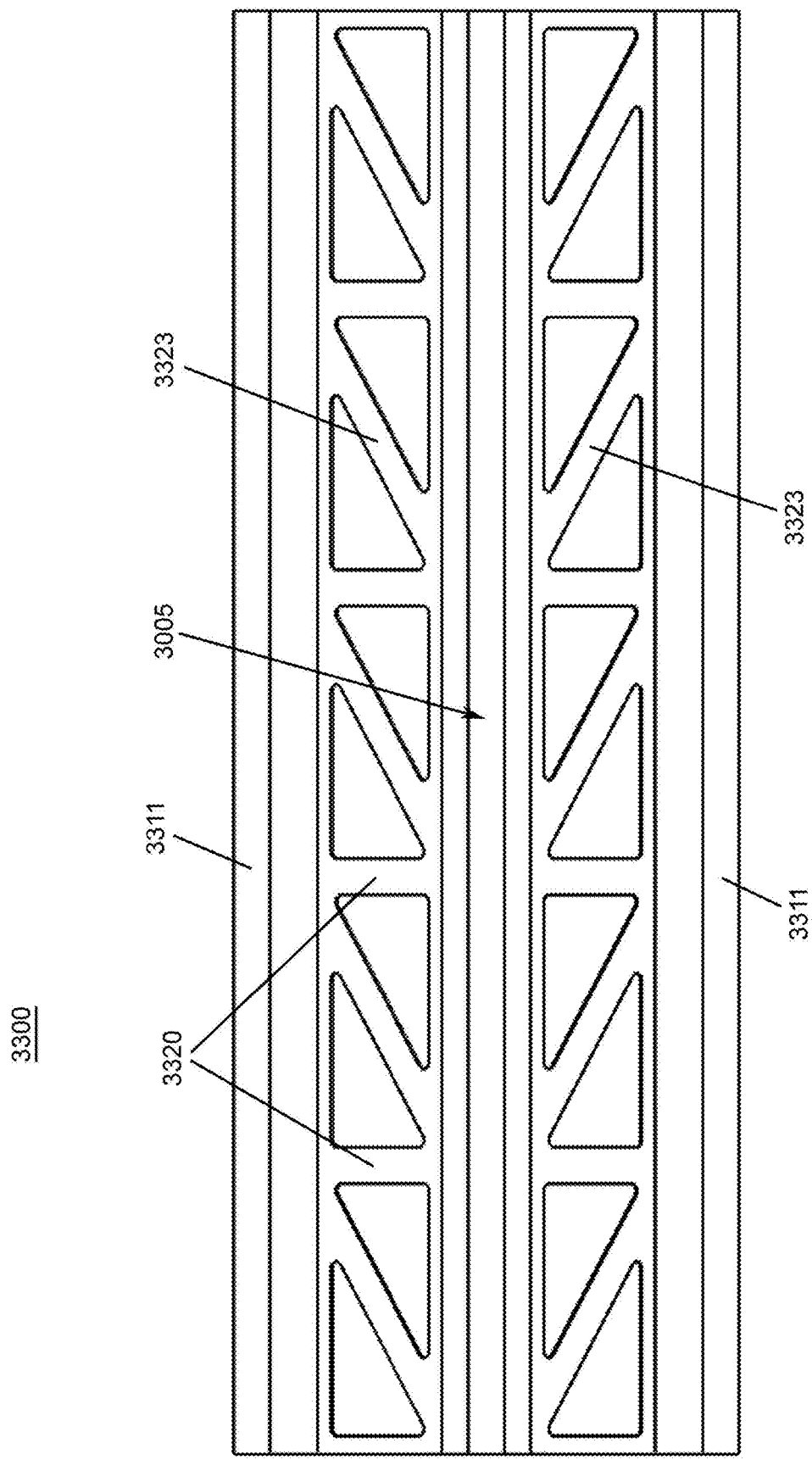
FIG. 33 shows yet another exemplary CTM boom using a flat-back C curve with truss pattern.

FIG. 33 shows a CTM boom 3300 using a flat-back C curve 3005 with diagonal truss 3323 with angles shallower compared with the previous exemplary diagonal trusses. Each of the perpendicular truss 3320 is disposed about 90° to the long axis of the seam 3311. Starting from the intersection of the batten 3320 and the diagonal truss 3323, the diagonal truss can have a truss angle of about 45°+/−35° with respect to the batten 3320. Similar to the CTM boom 2900 of FIG. 29C, there are typically intersections of perpendicular truss and diagonal truss at both the seam 3311 and at the flat back C curves 3005. Other suitable truss patterns can be used. Note that the exemplary FIG. 33 lacing is different from the exemplary CTM structures of FIG. 31 and FIG. 32. In FIG. 33, the top and bottom diagonals are in the same direction (parallel to each other).

Figure 34:
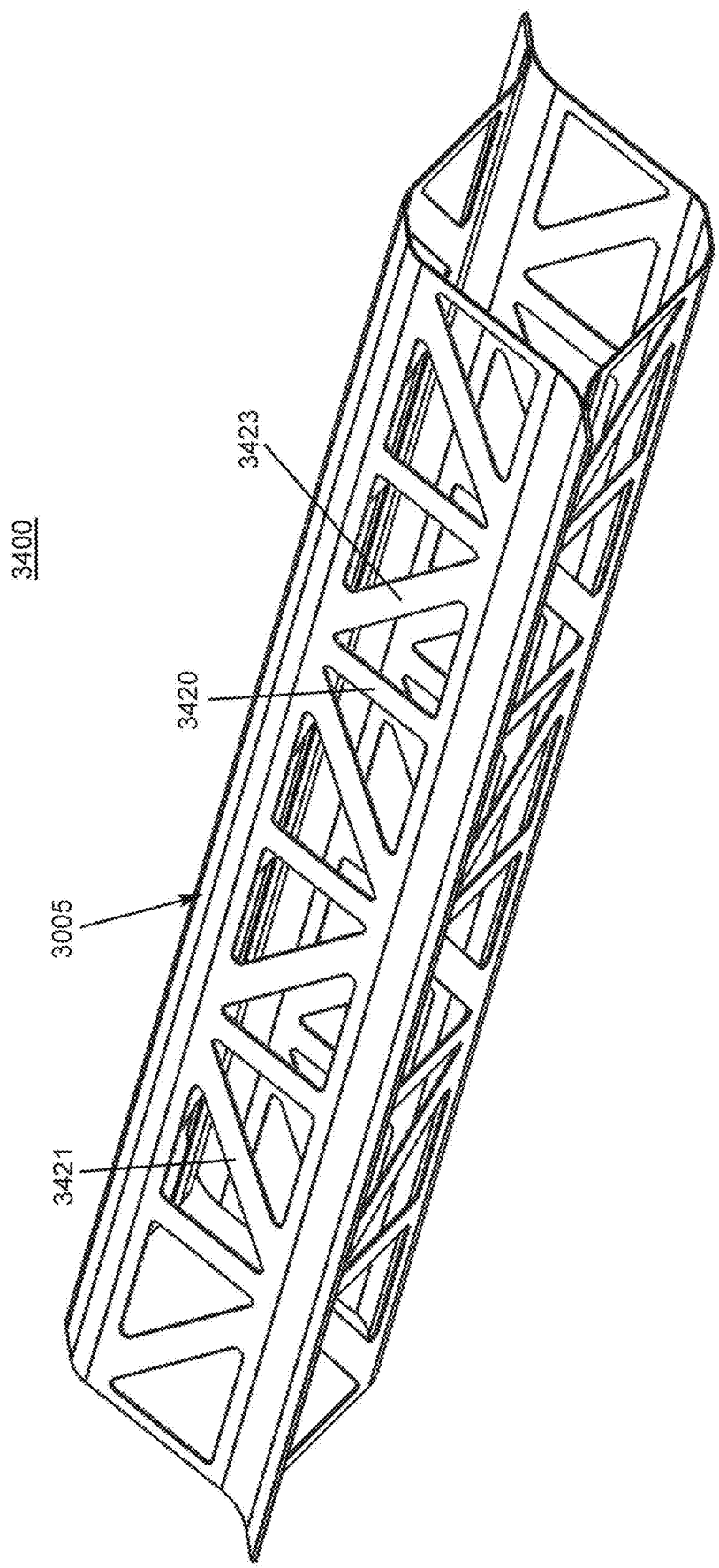
FIG. 34 shows yet another exemplary CTM boom using a flat-back C curve with truss pattern.

FIG. 34 shows a CTM boom 3400 using a flat-back C curve 3005 with diagonal truss similar to the CTM boom 2900 of FIG. 29A to FIG. 29D, however using shallower angle diagonal truss 3421, 3423 similar to diagonal truss 3221, 3223 of FIG. 32. Note that the exemplary CTM of FIG. 34 is different from previously described exemplary CTM structures. Here, the diagonal directions alternate in each cascading bay and are parallel on the top and bottom.

Figure 35:
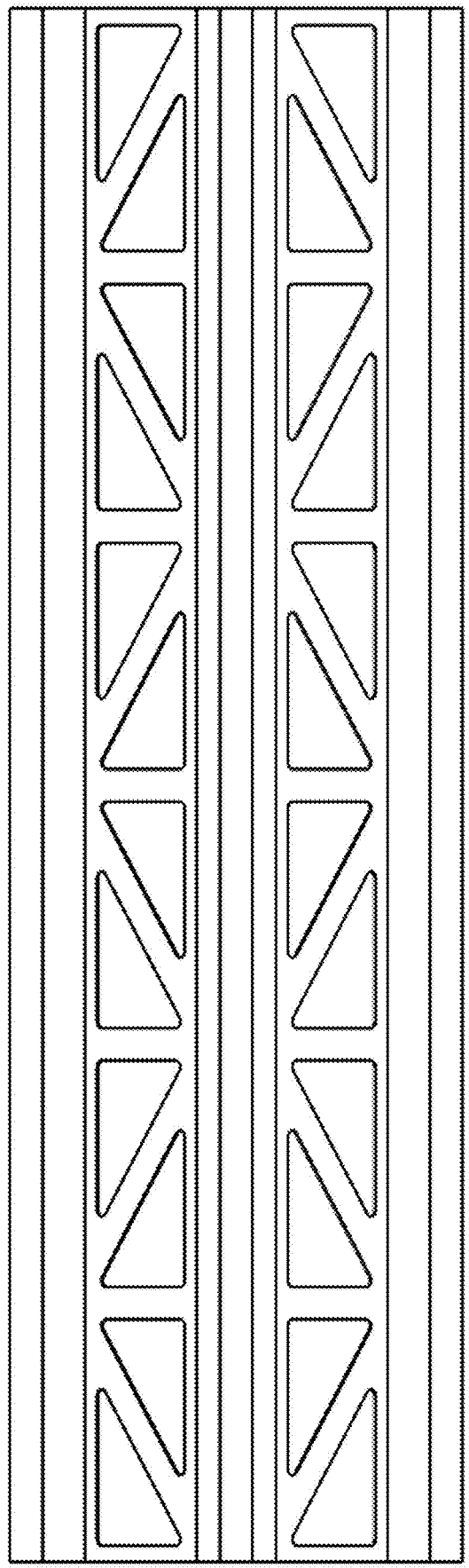
FIG. 35 shows a top view of the CTM boom 3400 of FIG. 34.

FIG. 35 shows a top view of the CTM boom 3400 of FIG. 34.

Fiber orientation—As described hereinabove, fiber orientation can be used to further strengthen a CTM boom. For example, the lines 3160 show fiber patterns parallel to each member axis in FIG. 31.

Yet another exemplary CTM includes a configuration is where the alternating diagonals of FIG. 34 are not parallel on the top and bottom, but they are reversed as shown in FIG. 31 and FIG. 32.

Battens and Diagonal Truss Members

In the exemplary CTM hereinabove, the walls are all show as flat. However, the walls can also have any suitable curve in cross section. For example, the walls can be curved with a C curve, or the individual truss members can be curved such as is used in a tape spring. For example, the cross sections of members 2920, 2923, 2921 can be curved like a tape spring, with relatively flat C shape.

Curved Truss Members (Battens and/or Diagonals)

Either or both of one or more battens, or diagonals, can be curved truss members of a substantially flat CTM boom wall.

Figure 42:
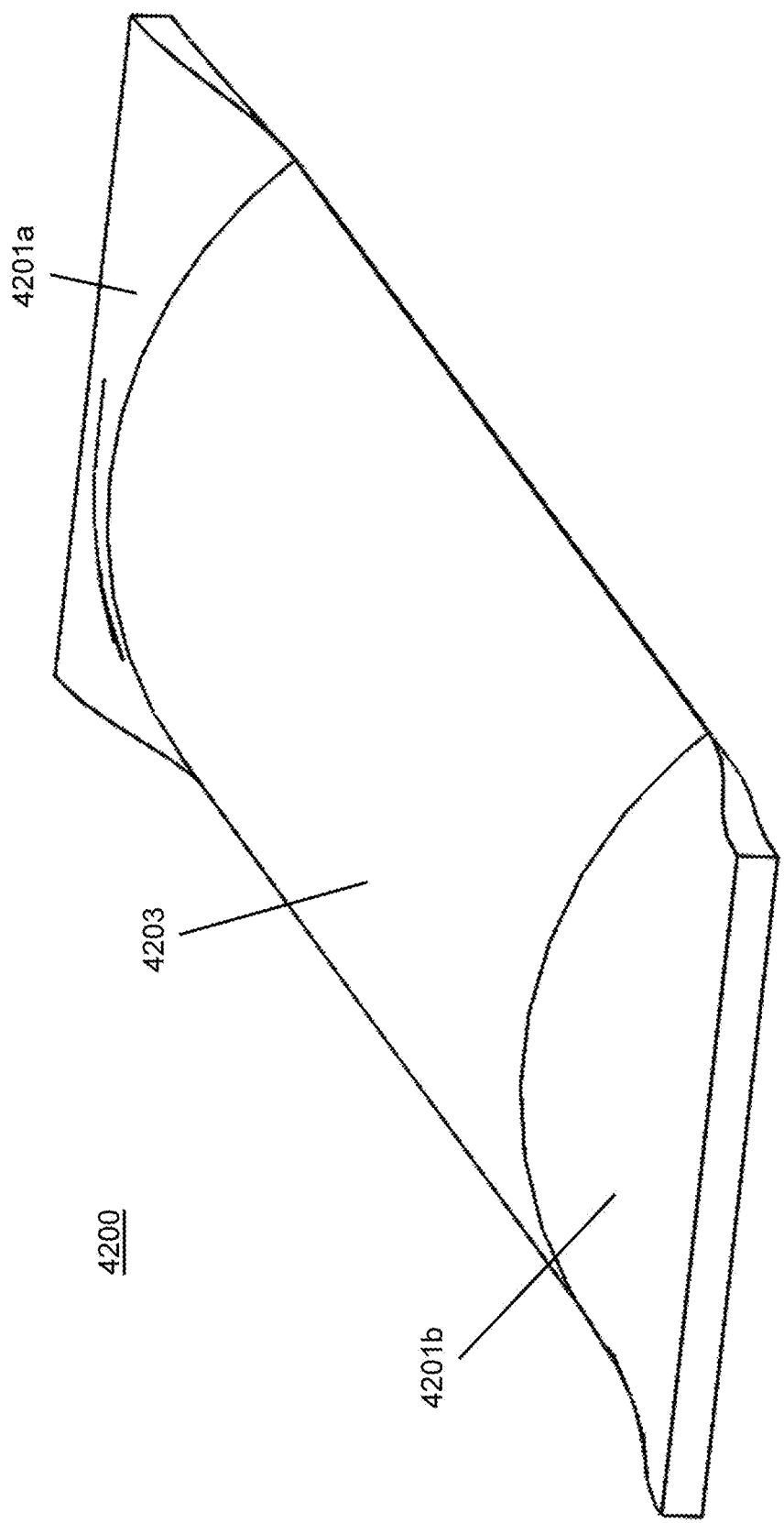
FIG. 42 is a drawing showing an exemplary curved truss member.
Figure 43:
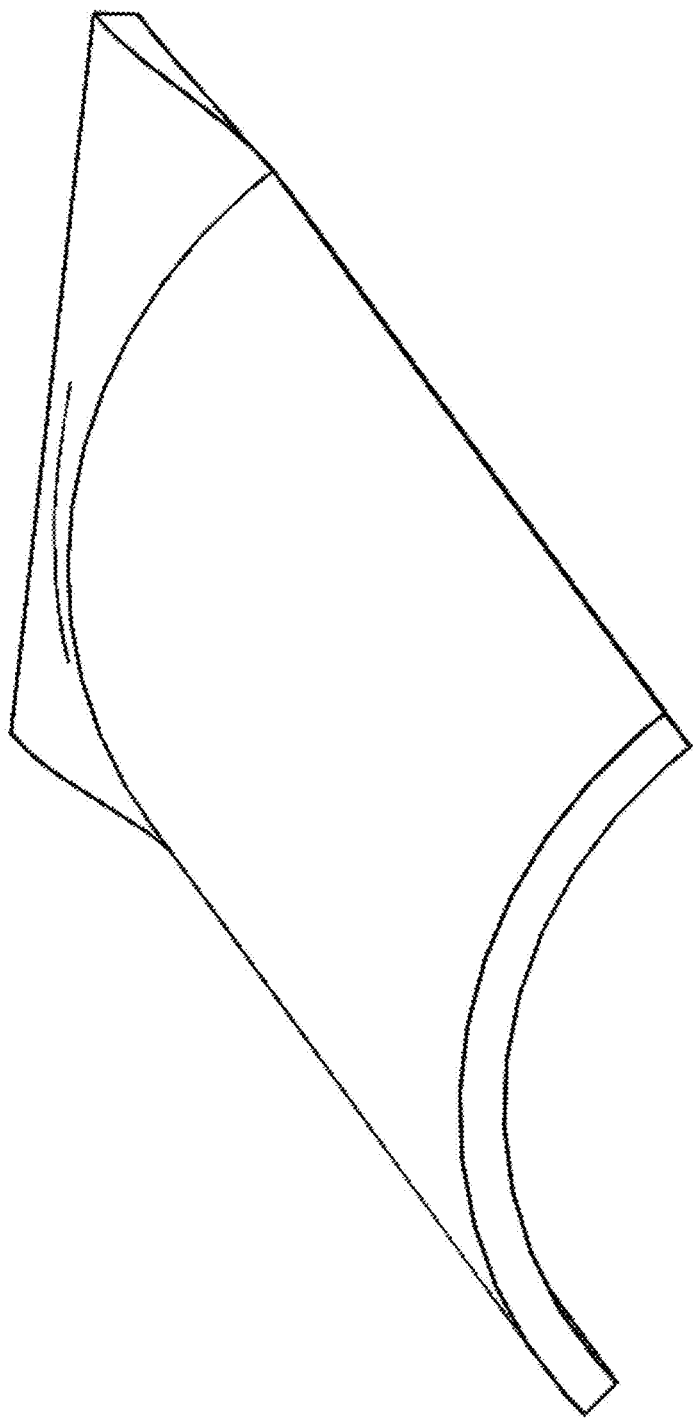
FIG. 43 is a drawing showing a mid-section cut-away of the curved truss member of FIG. 42.
Figure 44:
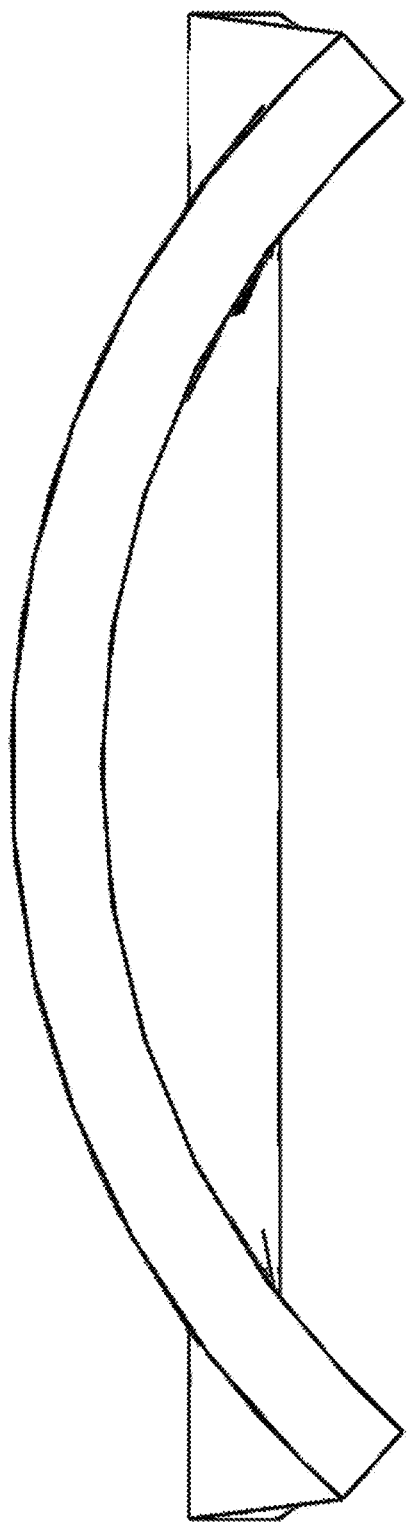
FIG. 44 is a drawing showing an end view of the sectional cut-away view of FIG. 43.

FIG. 42 is a drawing showing an exemplary curved truss member, curved in a way analogous to a tape spring or tape measure. However, the exemplary curved member of FIG. 42 transitions at either end to a flat portion 4201a, 4201b to mechanically couple to the vertex portion and the joined sections respectively. FIG. 43 is a drawing showing a midsection cut-away of the curved truss member of FIG. 42. FIG. 44 is a drawing showing an end view of the sectional cut-away of FIG. 43.

Figure 45:
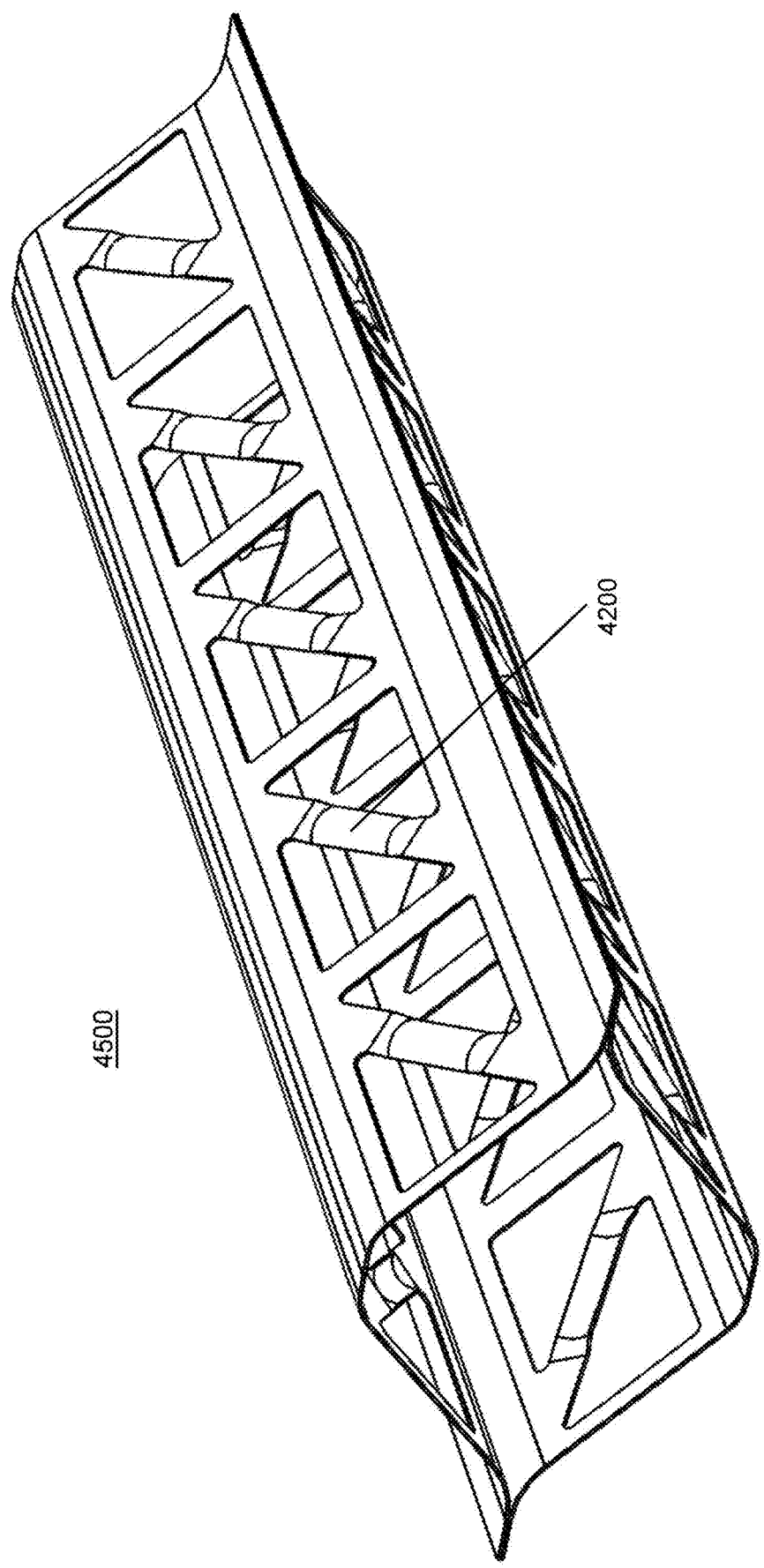
FIG. 45 is a drawing showing an exemplary CTM boom using curved diagonal truss members.

FIG. 45 is a drawing showing an exemplary CTM boom 4500 using curved diagonal truss members 4200. It is unimportant whether the flat portions 4201a, 4201b (FIG. 42) are about perpendicular at the ends to the longitudinal axis of the diagonal truss member, or if the flat portions 4201a, 4201b are angled according to the angle of the diagonal to match the longitudinal axis of the vertex, a flat back C curve in FIG. 45, and/or joined portions of the CTM boom 4500. FIG. 46 is a drawing showing a cross section view of the CTM boom 4500 of FIG. 45. This end view drawing of the boom is analogous to FIG. 29D.

Strut Lacing

In the exemplary CTM hereinabove, the walls typically include a combination of battens and diagonal members (both forward diagonal and reverse diagonal). However, there can also be CTM structure with only diagonal members (same direction, or multiple direction), or CTM structures with only battens. Strut lacing of the truss can include any combination of battens or diagonals, or combinations thereof.

Applications of CTM Booms

In one exemplary application of a CTM boom, the CTM boom can be used to deploy a relatively large solar panel in space, such as can be used of space to terrestrial power generation. In terrestrial power generation, sunlight is converted to electrical power by panels deployed in geostationary orbit around the Earth. The electrical power is then beamed to Earth, such as by microwave electromagnetic radiation. One advantage of such power stations is that the solar panels are always irradiated during daytime hours, regardless of cloud conditions over the terrestrial receiving station. The new CTM boom is ideal for deploying and supporting such relatively large solar panels in space. While there are only relatively small gravitational forces on the deployed panels in the "weightlessness" of space, the truss patterns are important both to opening a folded CTM into the cross section of FIG. 29D, as well as to maintain the structural integrity of the CTM boom experiencing mechanical forces while deploying a solar panel mounted to each CTM, mechanical forces associated with acceleration of the satellite or spacecraft.

The exemplary CTM boom 2900 as implemented for space based solar panels or solar arrays is about 40 m long (about 131 feet) and has a mass of about 29.8 kg (about 65 lbs). Once opened from a flattened state, the cross section (FIG. 29D) has an effective diameter of about 0.4 m.

Solar panels can be supported and deployed by any suitable CTM means. For example, there can be a solar panel assembly or solar array at the end of any of the exemplary new CTM structures described hereinabove. Also, the new CTM structures described hereinabove can be used to deploy solar panels or solar array along the length of the CTM. For example, any of the newly described CTM can be used to deploy an accordion or other style folded solar array or solar panels.

Particularly as solar arrays and other planar devices (e.g. planar antennas, phased array antennas, reflectors, and reflector arrays) become larger, another application for the various exemplary CTMs described hereinabove is to deploy four CTM to create a space based frame which can support any relatively large about planar device within the CTM frame.

CTM Frames for Planar Devices (Flat, Convex, or Concave)

Figure 36:
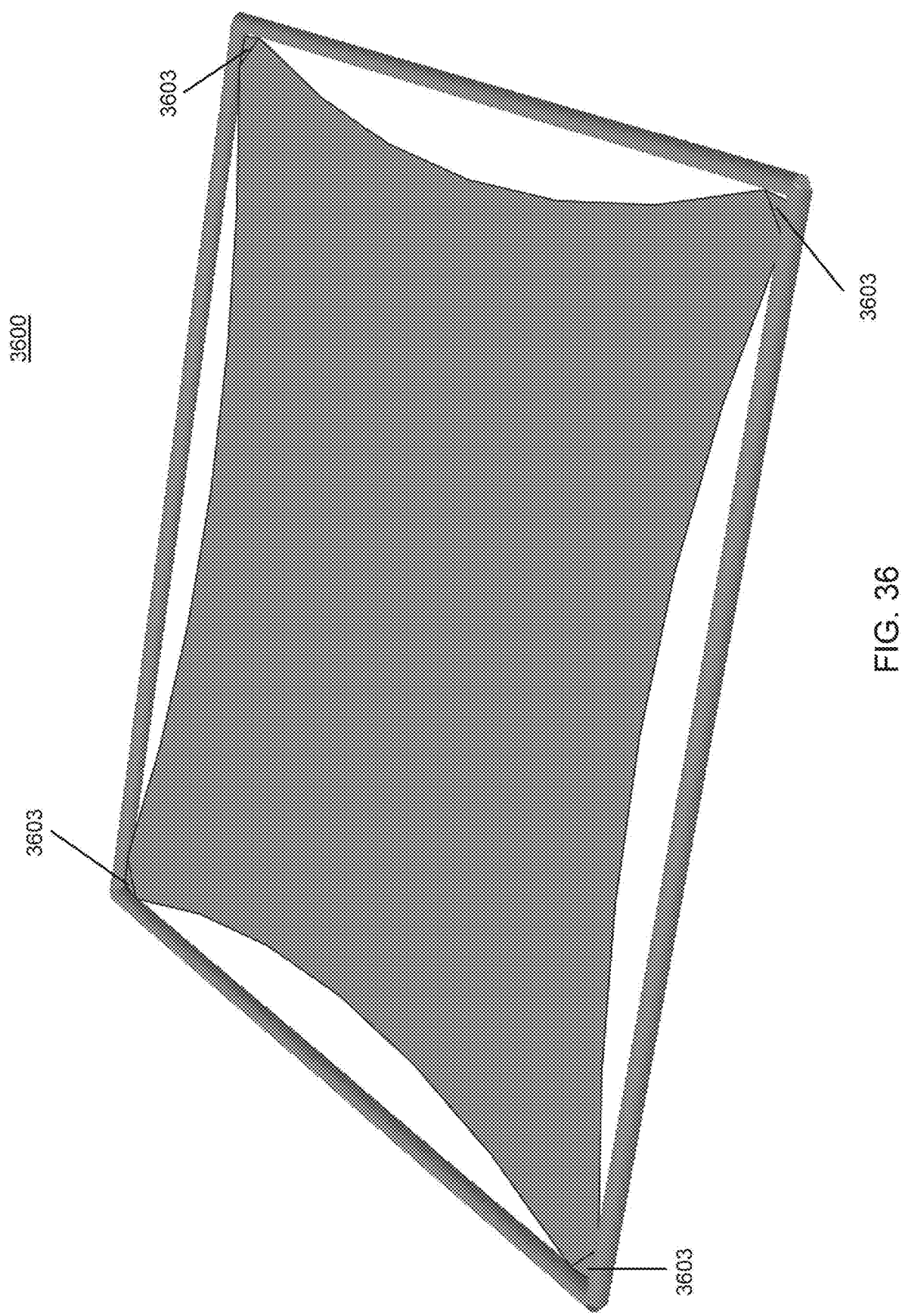
FIG. 36 is a drawing showing an isometric view of exemplary four sided CTM frame.
Figure 37:
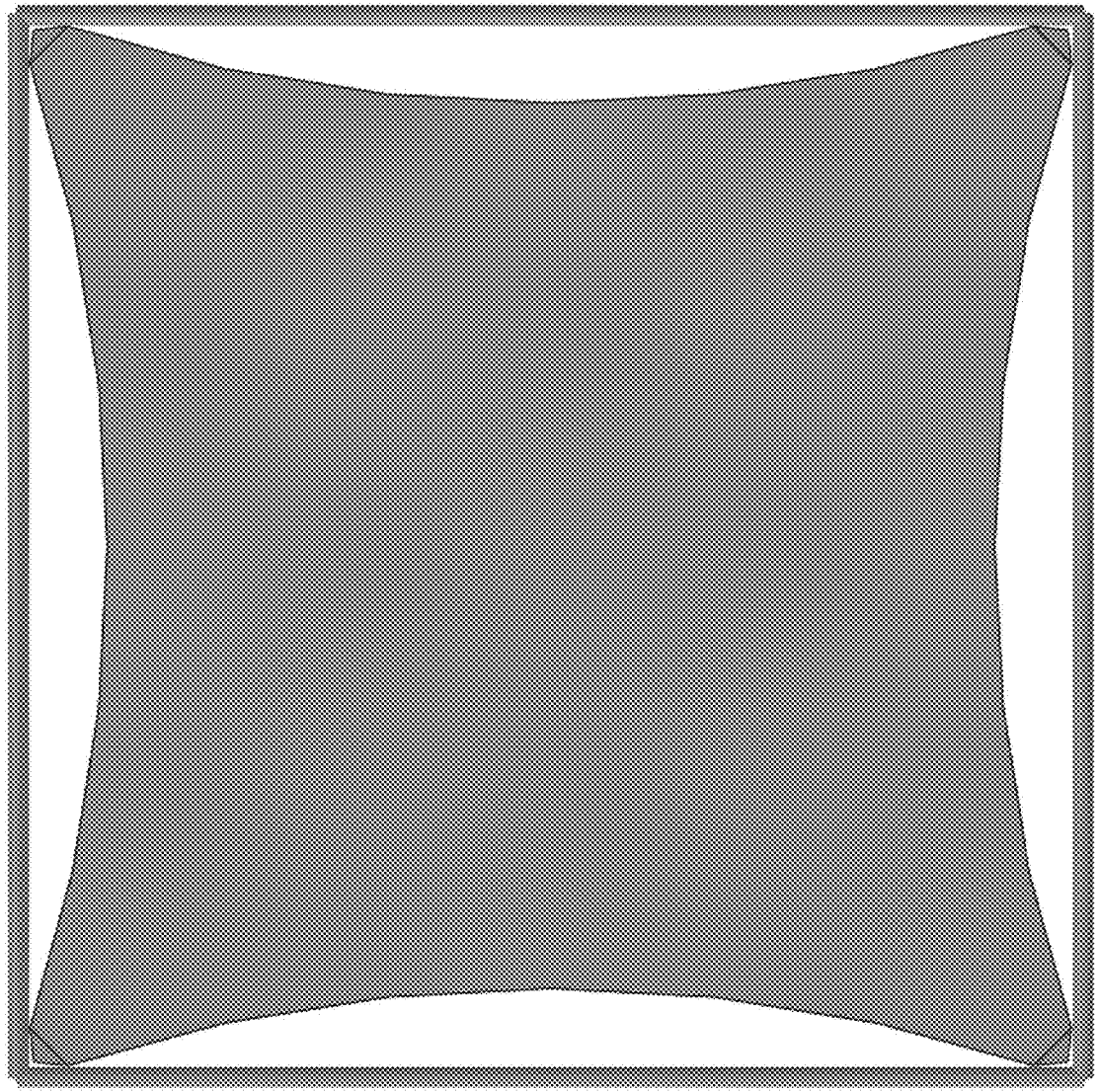
FIG. 37 is a drawing showing a top view of the CTM frame of FIG. 36.
Figure 38:
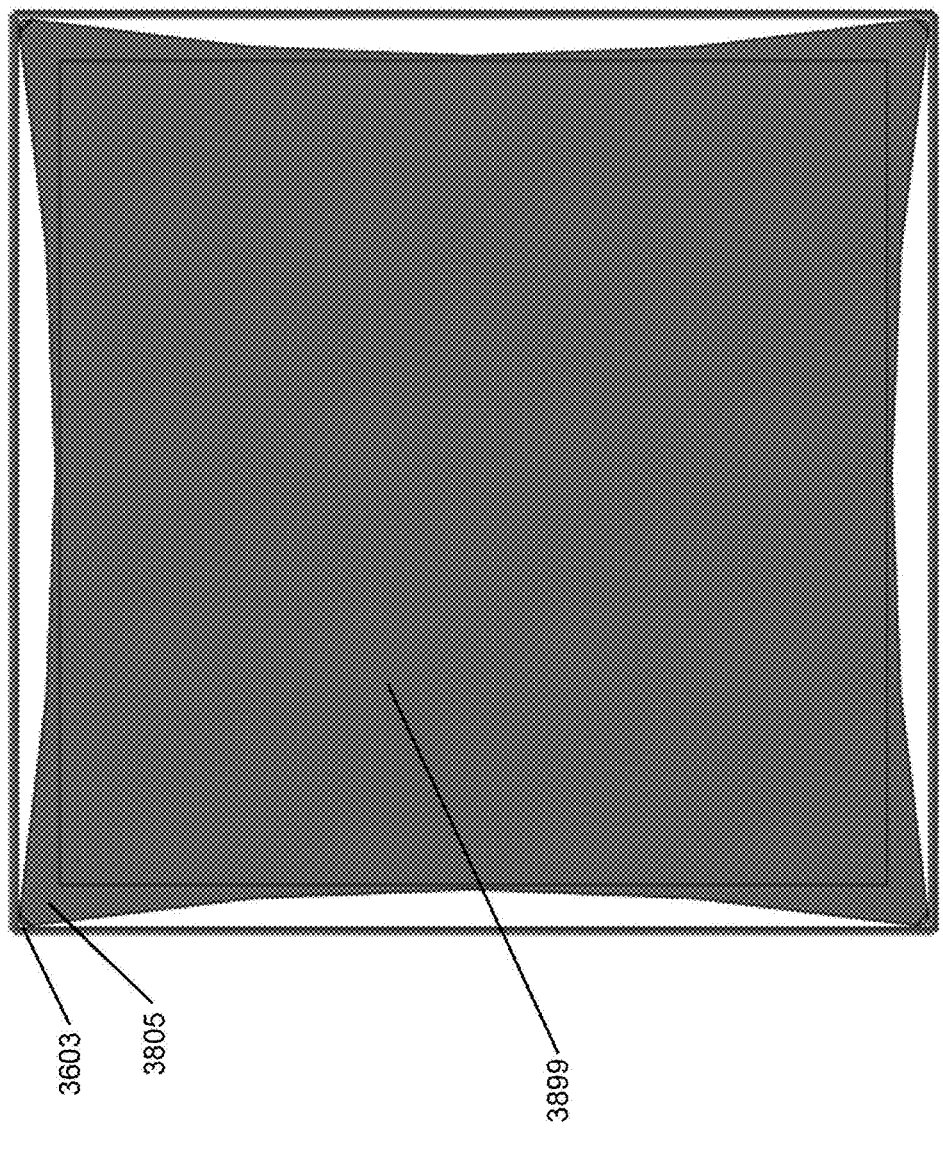
FIG. 38 is another top view of another CTM frame similar to FIG. 36 showing corner sections and a supporting sheet material.

FIG. 36 is a drawing showing an isometric view of exemplary four sided CTM frame 3600 (CTMs shown as solid legs for simplicity, any of the new CTM structures described hereinabove can be used for such frames as shown in FIG. 36 to FIG. 38). There can be corner sections 3603 mechanically mounted to the corners. The frame of FIG. 36 is especially useful for space based applications of solar sails, solar arrays, solar panels, planar antennas, phased array antennas, reflectors, and reflector arrays, combinations thereof, etc.

FIG. 37 is a drawing showing a top view of the CTM frame 3600 of FIG. 36.

FIG. 38 is another top view of a variation of a CTM frame 3800 similar to FIG. 36 showing in addition to corner sections 3603, there can be a supporting sheet material 3805 which ultimately supports either underneath or at the sides a square payload 3899. Square payload 3899 can include, for example, solar sails, solar arrays, solar panels, planar antennas, phased array antennas, reflectors, and reflector arrays, combinations thereof, etc.

Frames similar the exemplary CTM frames of FIG. 36 to FIG. 38 can be made using any suitable deformable boom, such as including other types of booms described hereinabove.

Similar frames based on any suitable booms described hereinabove and combinations thereof, to support a planar (flat, concave, or convex) solar sail, solar array, solar panels, reflectors, antennas, solar sails, etc., can be made as a four sided frame as per the exemplary frames of FIG. 36-FIG. 38. Other frames can be made to support planar devices, planar sheets, either flat, convex, or concave, including 3 booms for a triangular planer device, or more than 4 booms using any suitable number of booms for polygon shape. Similarly, frames need not be square, and suitable frame shapes include, for example, trapezoid, triangle or trigon, quadrilateral or tetragon, parallelogram, square, rectangle, rhombus, pentagon, hexagon, heptagon, octagon, enneagon, decagon, hendecagon, dodecagon, triskaidecagon or tridecagon, tetrakaidecagon or tetradecagon, pendedecagon, hexdecagon, heptdecagon, etc. A relatively large number of booms can also be used to approximate a circle or ellipse.

Alternative frame types can also be used, such as, for example, including an H configuration, a radial 3 configuration, and a radial 4 configuration.

Figure 39:
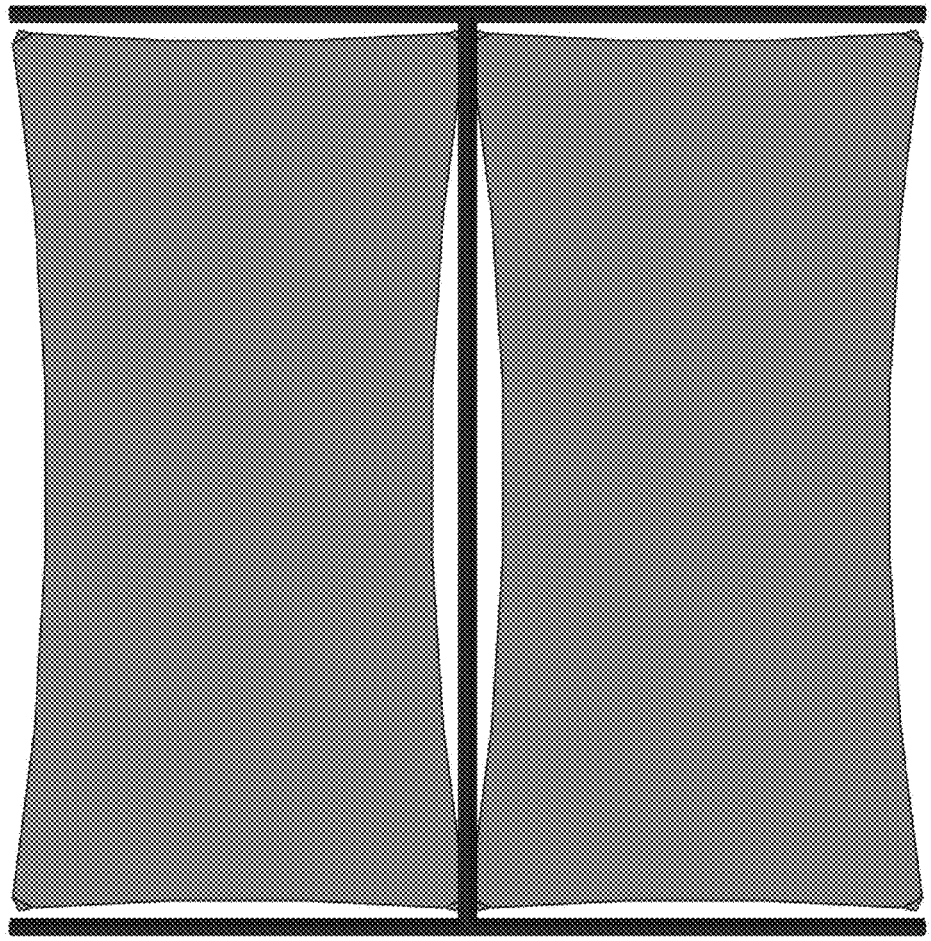
FIG. 39 is a drawing showing an exemplary frame based on a H configuration architecture.

FIG. 39 is a drawing showing an exemplary frame based on a H configuration architecture.

Figure 40:
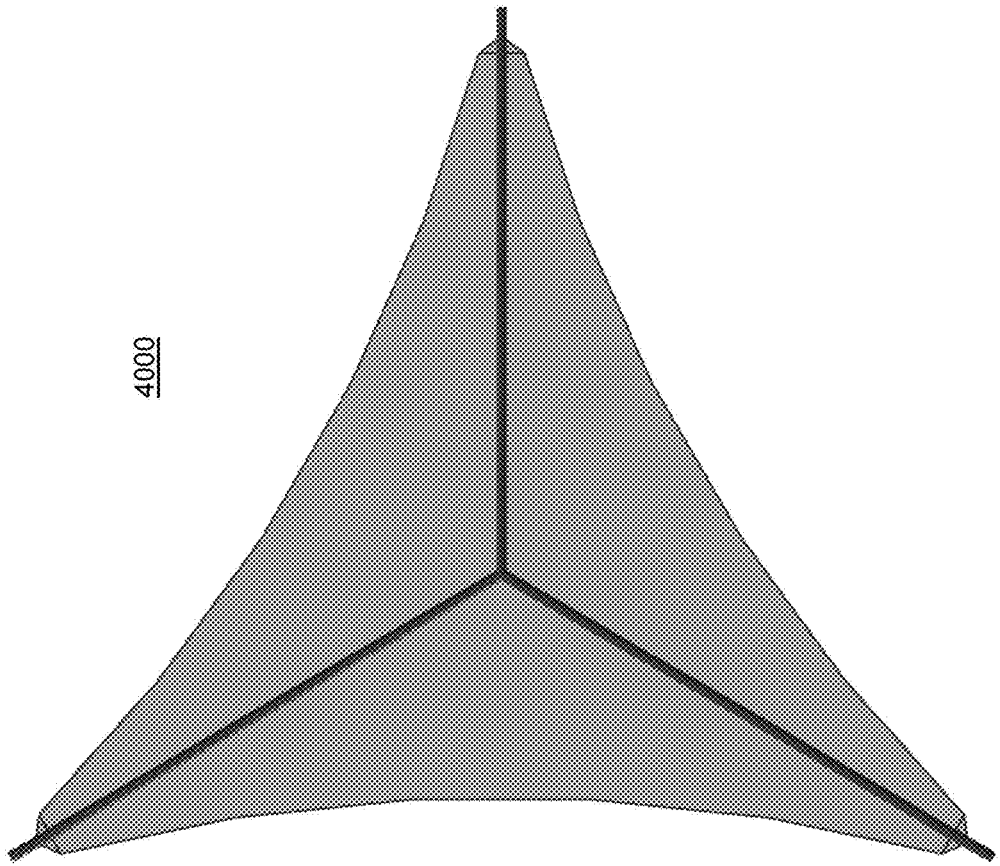
FIG. 40 is a drawing showing an exemplary frame based on a radial 3 configuration architecture.

FIG. 40 is a drawing showing an exemplary frame based on a radial 3 configuration architecture.

Figure 41:
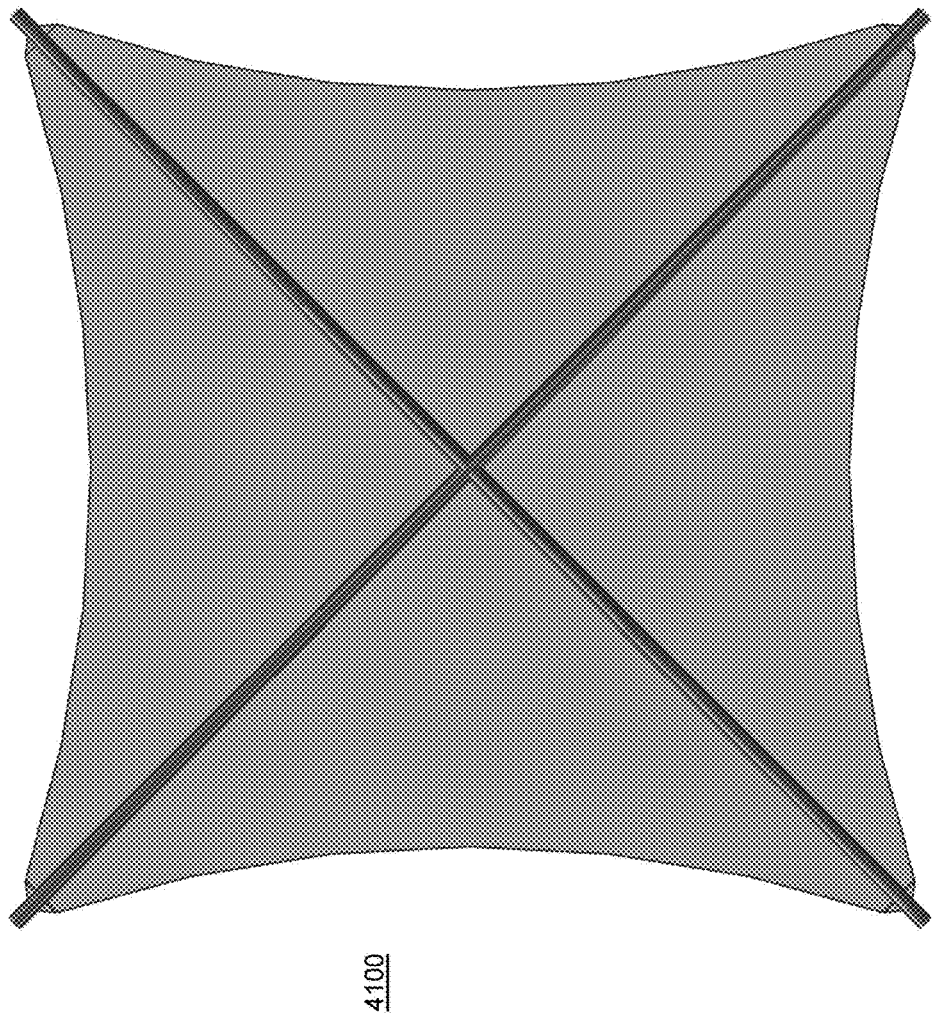
FIG. 41 is a drawing showing an exemplary frame based on a radial 4 configuration architecture.

FIG. 41 is a drawing showing an exemplary frame based on a radial 4 configuration architecture.

Corner supports as described hereinabove can be used with any type of frames. Supports, supporting layers, or underlying planar layers can be used to deploy planar devices of different shapes on or within such supports, supporting layers, or underlying planar layers. Any of the planar layers described hereinabove can be about flat, substantially flat, concave or convex. There can also be any combinations thereof (of about flat, substantially flat, concave or convex) within one planer device or an array of planar devices. Such planar device can also include ridges, troughs, wrinkles, and combinations thereof.

Any intersections of such frames can be hinged, such as by use of any of the hinges described hereinabove, such as, typically for pre-deployment storage and shipping, including shipping by rocket or spacecraft. Any sections of such frames can also be hinged to fold for compact storage and/or shipping.

Frames with Hinges

Any of the frames described hereinabove can also use hinged joints including any suitable hinge, such as, for example, any suitable hinge described hereinabove.

CTM booms can be used to deploy any suitable relatively high mass payload and are not limited to deploying solar panels or solar arrays in space based applications.

Materials and fibers—Any the suitable boom materials, including fiber patterns, described hereinabove, can be used to make CTM booms. For example, the seam areas can be reinforced or strengthened by a different fiber pattern as shown by the thicker regions of FIG. 22B (2231), or by FIG. 24B, where seams are shown to include thicker regions.

Any of the deformable structures can be made to have less mass ("light weighted") by cutting out or otherwise removing sections along the length of one or more of the members of a beam (including booms) or hinge. Any suitable number of any suitable sized cutouts can be used. Any suitable cutout shape can be used, such as, for example, circular shape, elliptical shape, square shape, rectangular shape, triangular shape, trapezoid shape, polygon shape, etc.

FIG. 47A to FIG. 48G are drawings showing another deformable boom or mast structure as a collapsible tubular mast. One difference is that instead of an open space between battens (voids), there is now a material, such as, for example, a composite material with fibers, spanning what was previously a void. Another difference is that several structural dimensions and configurations provide a smaller lower profile cross section in the flattened state. Top, bottom, and side are used for convenience in describing exemplary deformable structures of the drawings, such as the exemplary CTM 4700 of FIG. 47A to FIG. 48G. The actual orientation of a deformable structure according to the Application can be any suitable orientation, where, for example, in operation, a "top surface" of the description can be at any suitable angle or any suitable longitudinal axis.

Figure 47A:
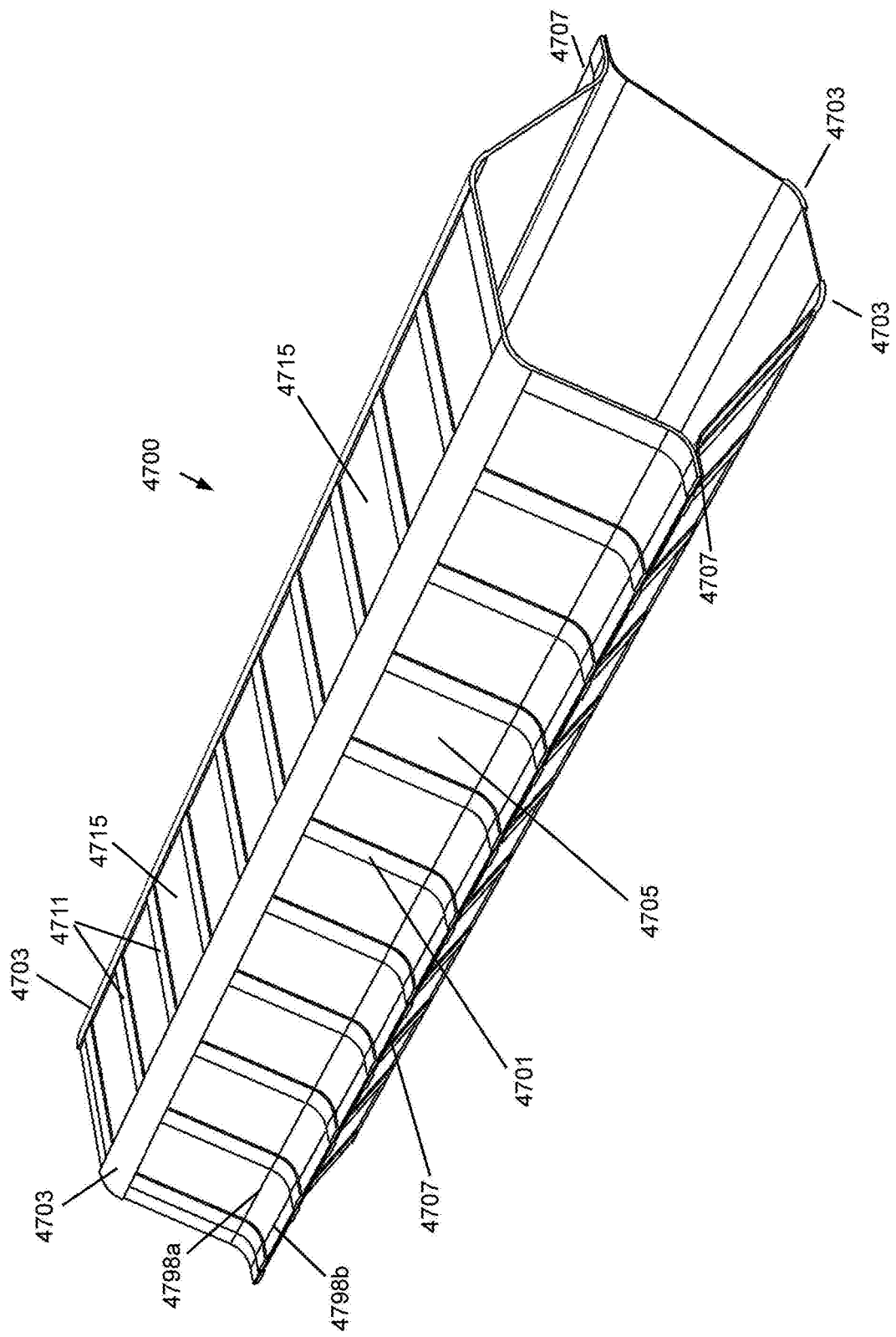
FIG. 47A is a drawing showing an isometric view of an exemplary CTM according to the new structure.

FIG. 47A is a drawing showing an isometric view of an exemplary CTM 4700 according to the new structure. CTM 4700 has an extended state as shown in FIG. 47A, and a flattened rolled state as shown in FIG. 48G. Longerons 4703 provide an axial stiffness. The longerons are typically the thickest elements, for example, having a thickness from about 0.003' to 0.050". Side battens 4701 and top and bottom battens 4711 define in part the cross section of FIG. 47D. Disposed between the side battens 4701 are material surfaces 4705, and between the top and bottom battens 4711 are material surfaces 4715. The side battens 4701 and side material surfaces 4705 include curvature which joins at a CTM seam 4707. The curvature is schematically represented in FIG. 47A by curvature lines 4798a and 4798b. The battens provide an increased hoop stiffness to maintain the desired CTM cross section. The battens thickness also typically ranges from about 0.003' to 0.050". Curvature lines 4798a and 4798b depict the curvature analogous to shade lines.

Figure 47B:
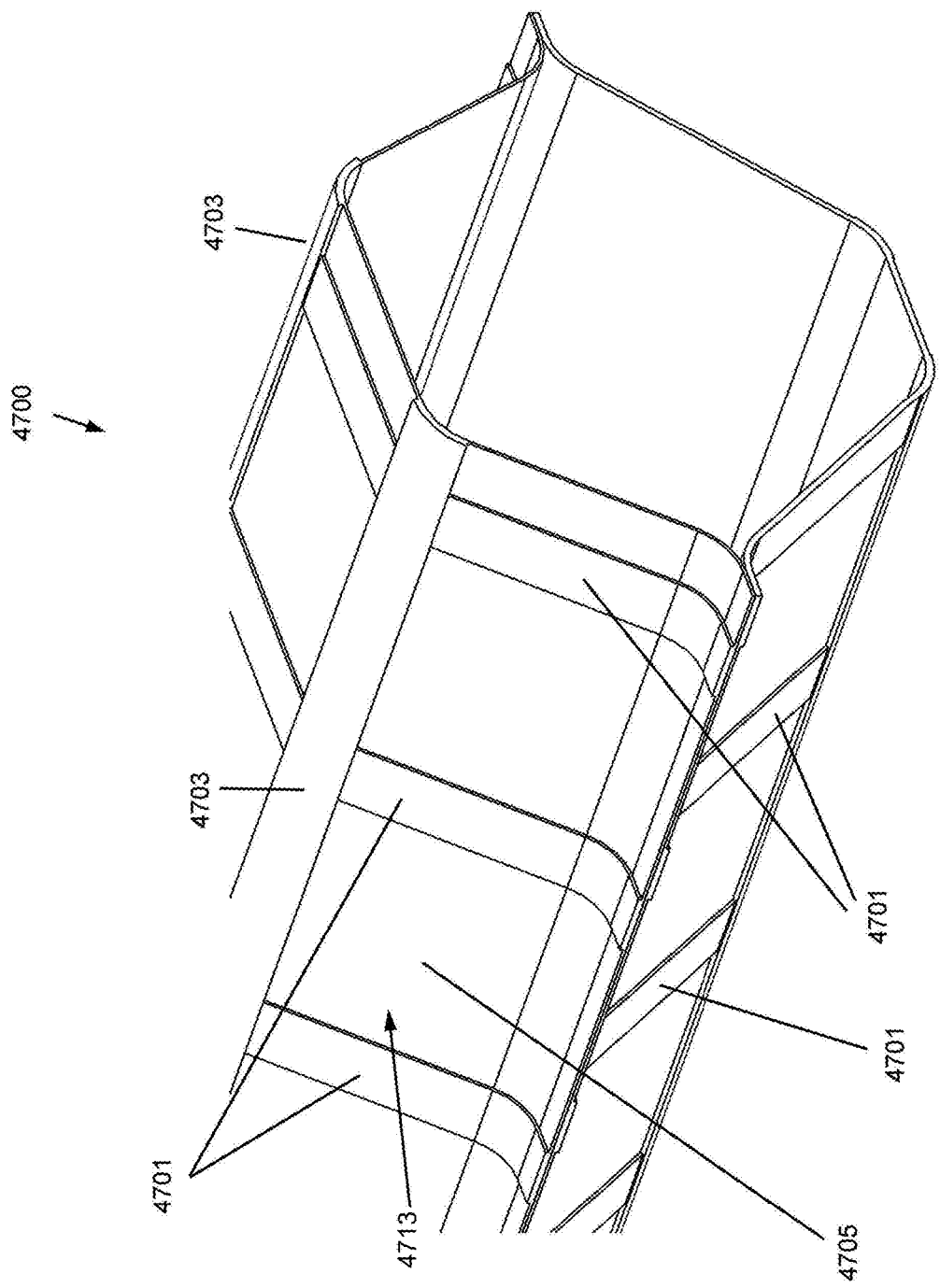
FIG. 47B is a drawing showing CTM in more detail.

FIG. 47B is a drawing showing CTM 4700 in more detail. In the exemplary CTM 4700, side battens 4701 can be seen as material above material surfaces 4705. Note that battens can be on the inside, outside, and/or integral with the surface material. The battens can also be not on top of each other, so when the CTM 4700 is flattened it is not as thick as it would be otherwise. The side battens 4701 can also be offset from each other in the longitudinal direction of CTM 4700 on the upper sides compared to the lower sides of CTM 4700. This longitudinal offset allows for a lower profile in the flattened state.

Figure 47C:
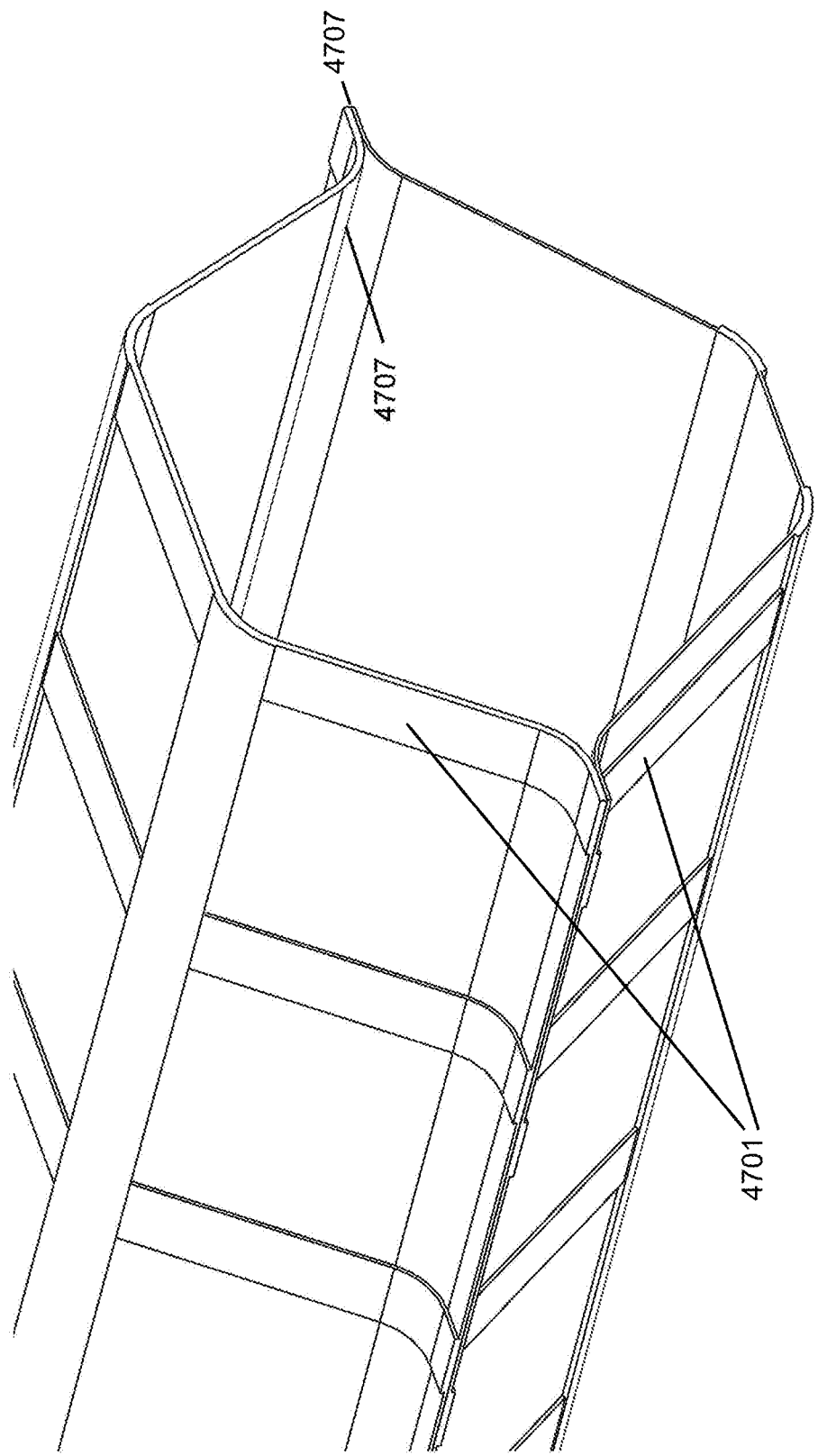
FIG. 47C is a drawing showing another more detailed view of the exemplary CTM of FIG. 47A.

FIG. 47C is a drawing showing another more detailed view of the exemplary CTM 4700 of FIG. 47A. Here, the seam 4707 at the end of CTM 4700 can be seen to show the joining of a thicker top curved part which includes a batten 4701 and a thinner lower part which at the visible end includes only a surface material 4705.

Figure 47D:
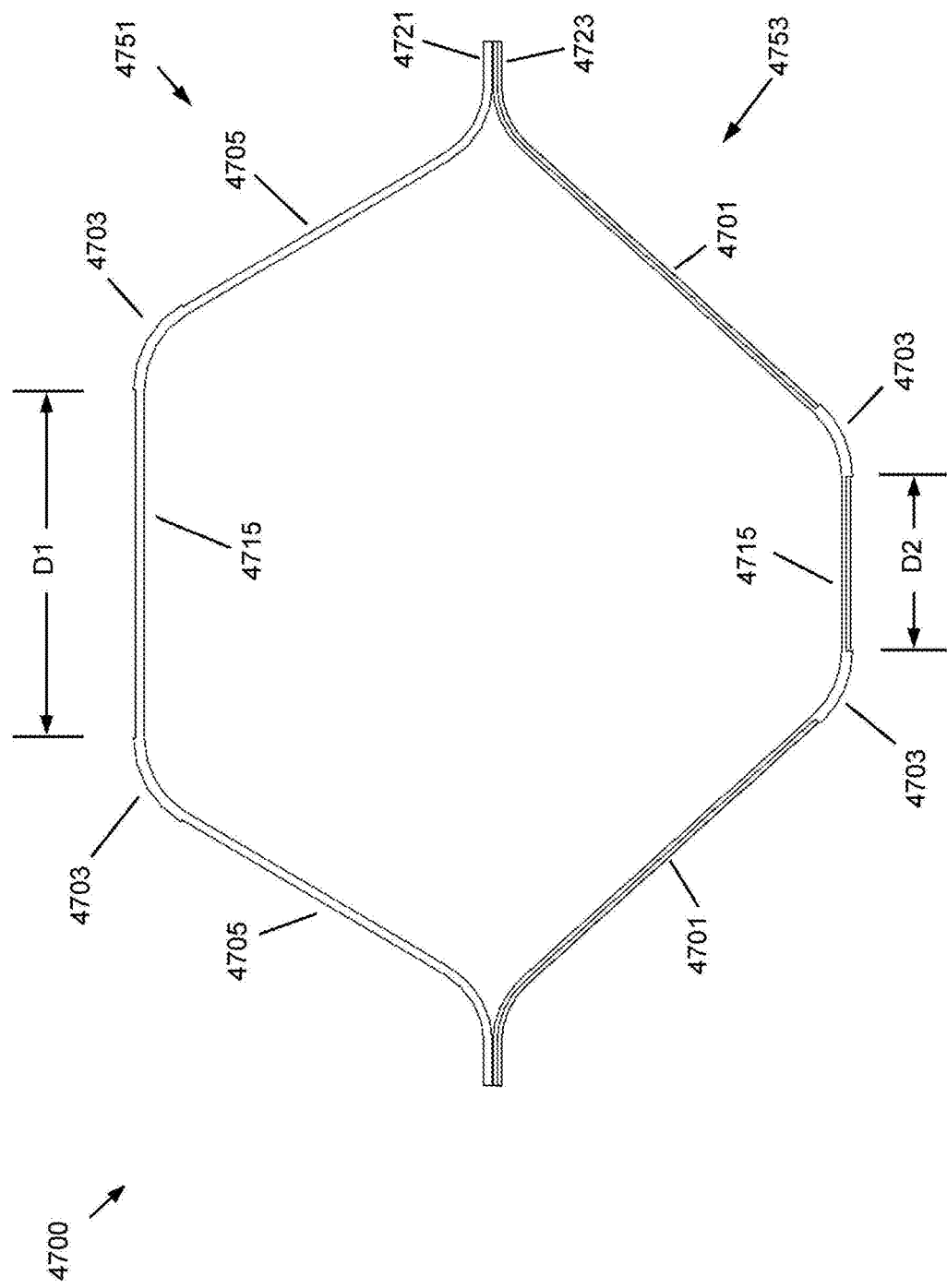
FIG. 47D is a drawing showing a cross section of CTM of FIG. 47A.

FIG. 47D is a drawing showing a cross section of CTM 4700 of FIG. 47A. The longerons on the top are spaced out further than the longerons on the bottom. The width D1 of the top portion of the top surface material 4715 between the top longerons 4703 is longer than the width D2 of the lower portion of the bottom surface material 4715 between the lower longerons 4703. The difference between width D1 and width D2 is another feature which allows CTM 4700 to fold into a lower profile in the flattened state. The lower profile flattened state (thinner) allows a CTM 4700 to roll tighter.

Figure 48A:
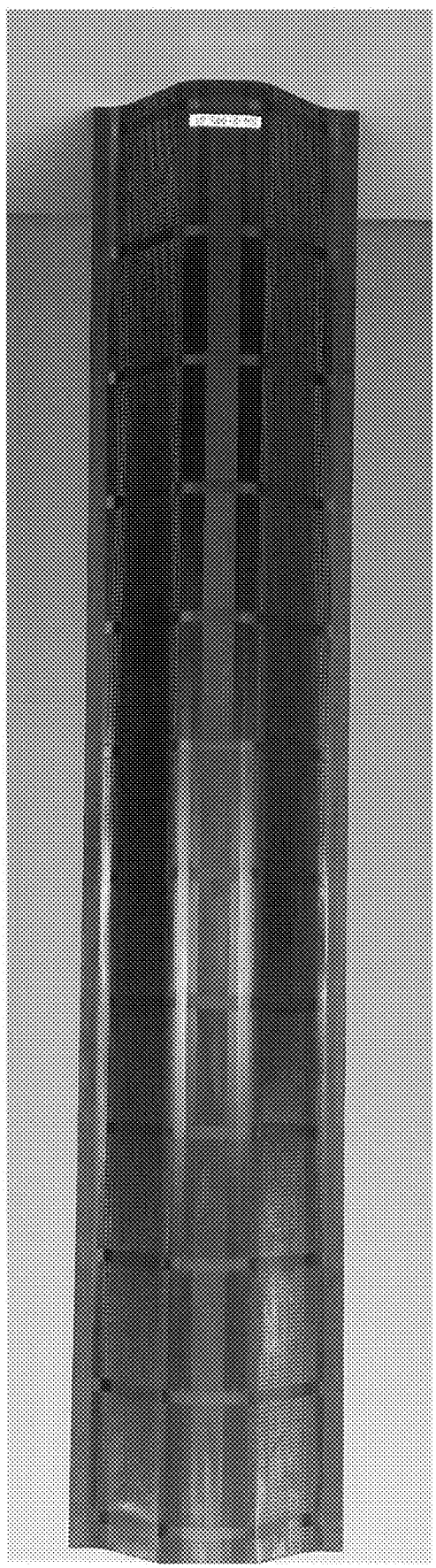
FIG. 48A is a drawing showing a top view of the exemplary CTM.
Figure 48B:
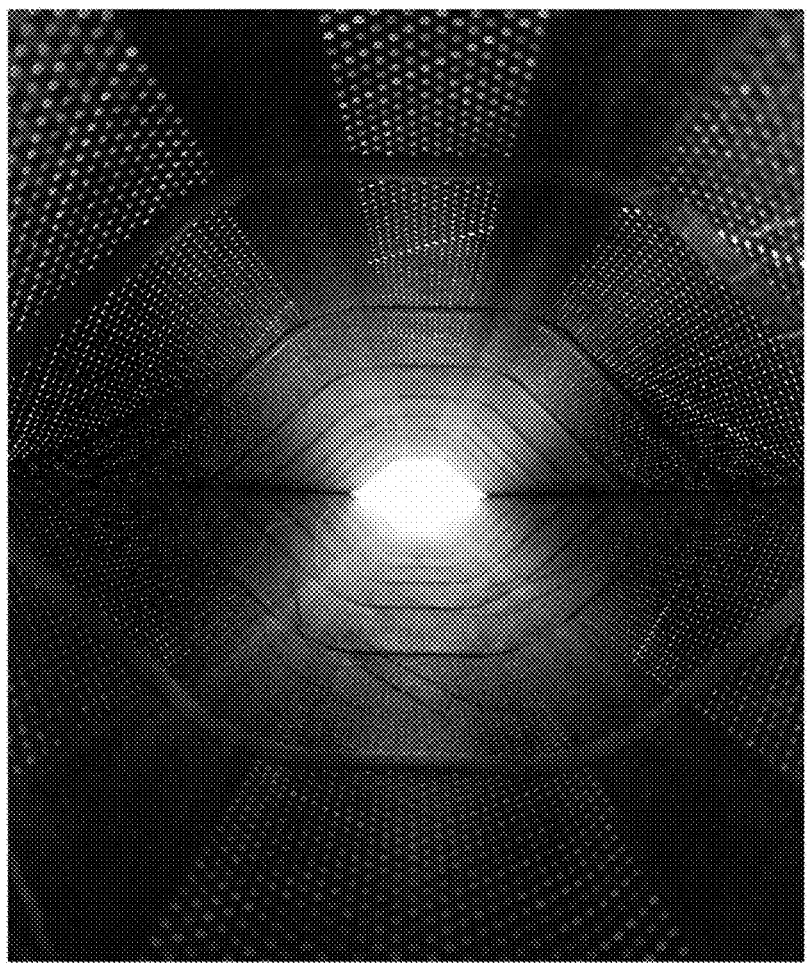
FIG. 48B is a drawing showing a view of the interior of the CTM of FIG. 48A.
Figure 48C:
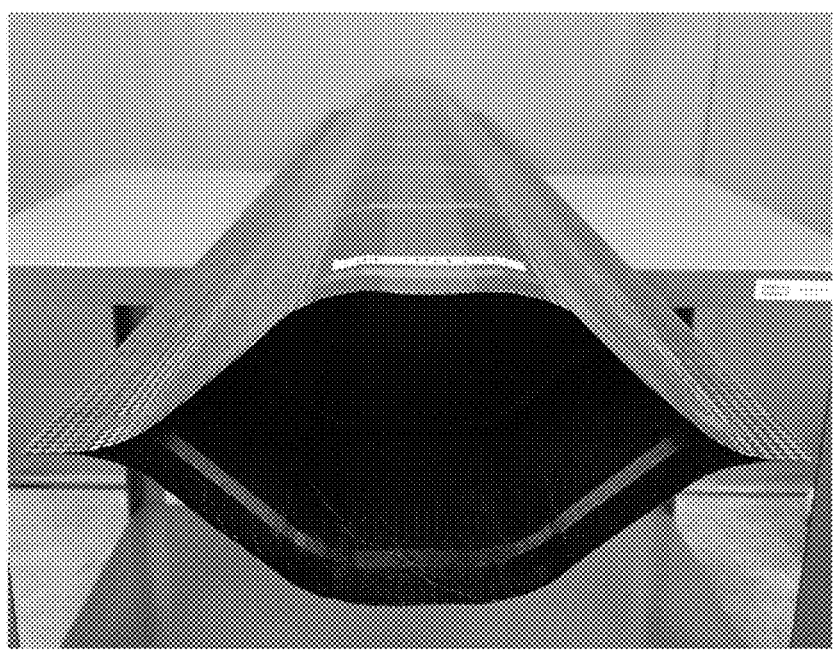
FIG. 48C is a drawing showing an elevated end view of the CTM of FIG. 48A.
Figure 48D:
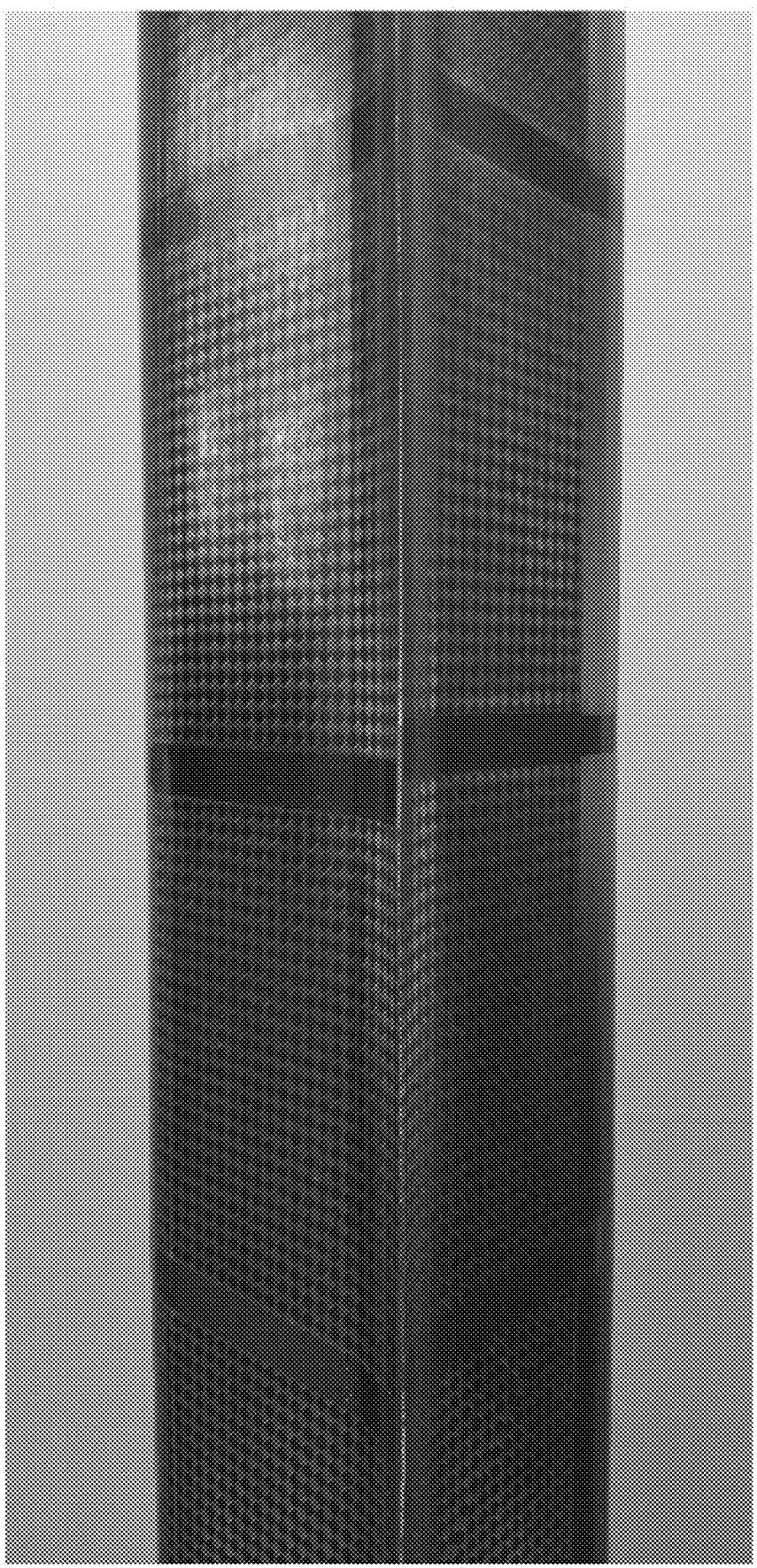
FIG. 48D is a drawing showing a side view of the CTM of FIG. 48A.
Figure 48F:
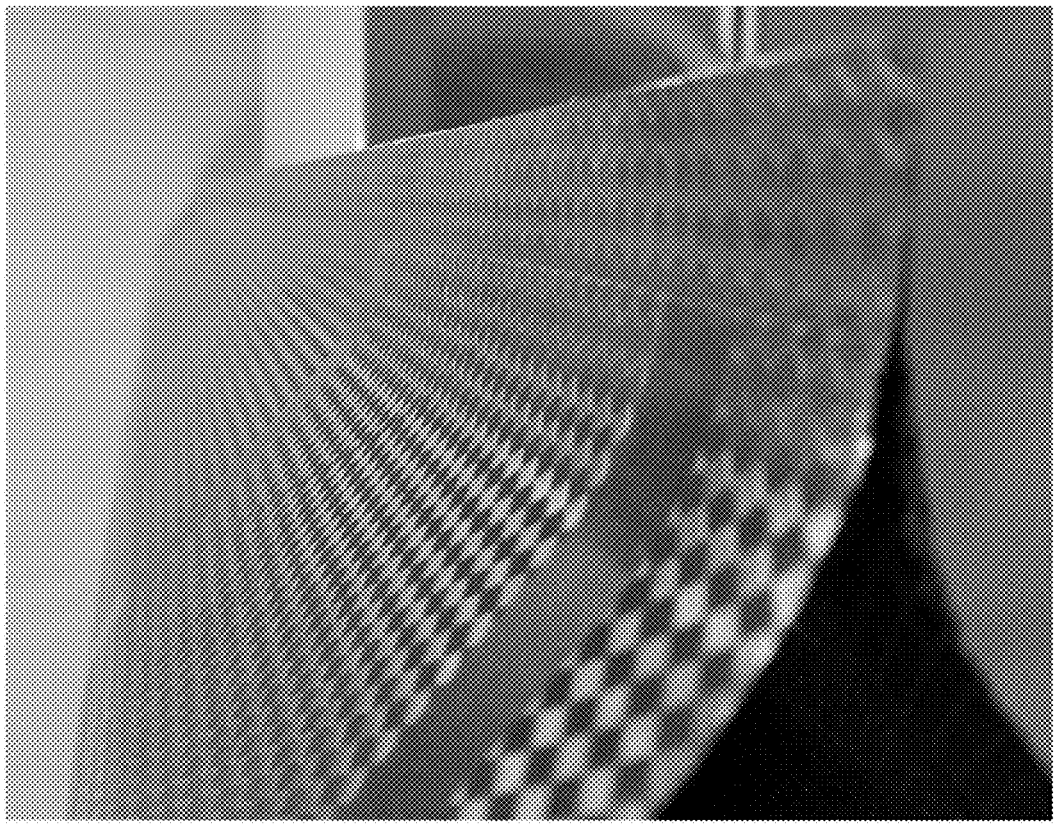
FIG. 48F is a drawing showing an elevated top view of the side seam of the CTM of FIG. 48A.
Figure 48E:
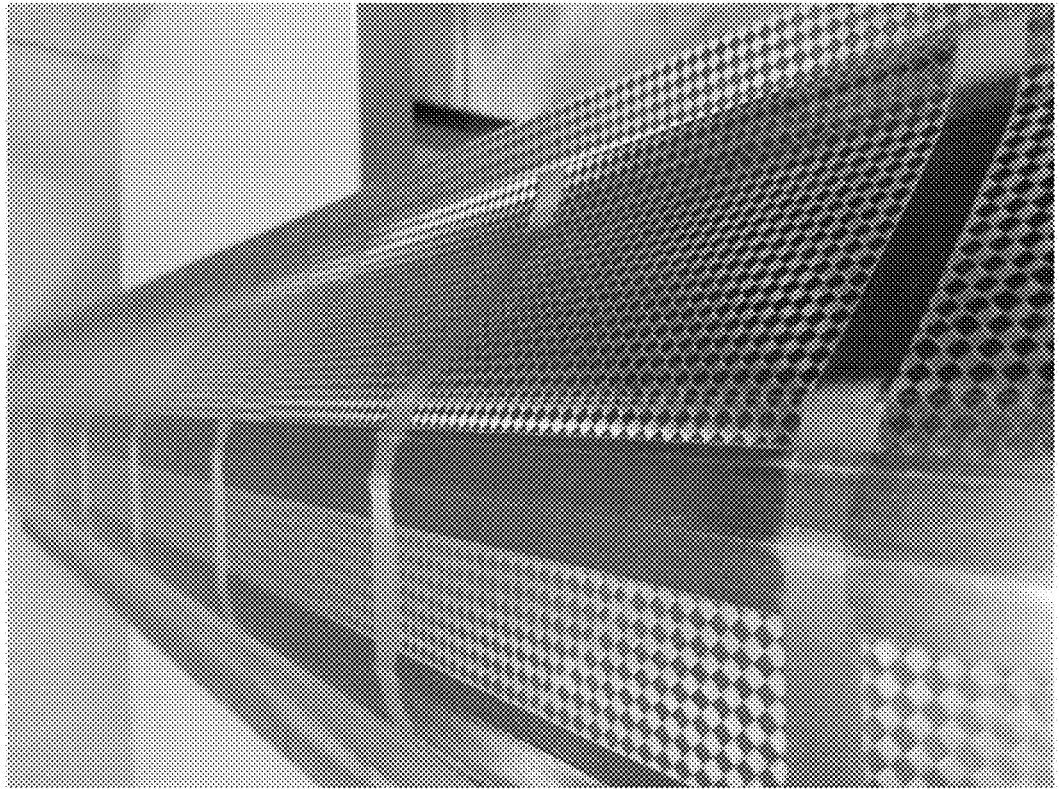
FIG. 48E is a drawing showing an elevated top view of the CTM of FIG. 48A.
Figure 48G:
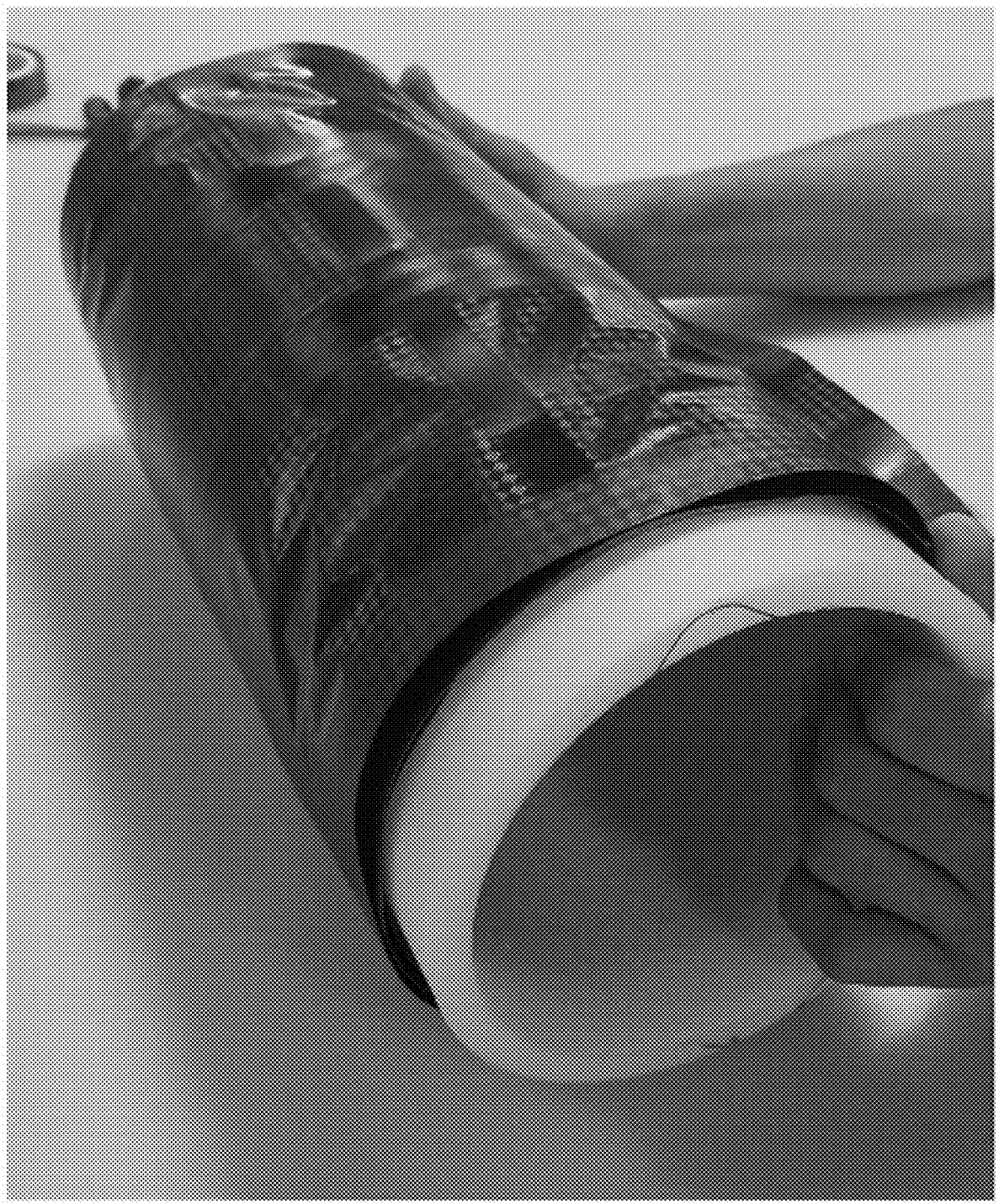
FIG. 48G is a drawing showing the CTM of FIG. 48A rolled on a cylindrical tube section into a flattened rolled state.

FIG. 48A to FIG. 48G are drawings showing an exemplary implementation of a CTM 4800 similar, but not identical to CTM 4700 of FIG. 47A to FIG. 47D. FIG. 48A is a drawing showing a top view of the exemplary CTM 4800. Here, the battens can be seen formed in about the midplane of the surface sheet, and then built up in layers both above and below the surface sheet. Adding ply layers both above and below the surface sheet assists in reducing thermal deformation of a CTM 4800 for better bending performance over temperature. The battens can be tapered, feathered, or scarfed, where the regions can be overlapped and still thinner than if not feathered. The surface material of the exemplary CTM 4800 is relatively thin as indicated by being able to see light through the surfaces as shown in FIG. 48B.

FIG. 48B is a drawing showing a view of the interior of the CTM 4800 of FIG. 48A. In FIG. 48B and other drawings it can be seen that the exemplary implementation was made using overlapping alternating 45 degree fiber patterns, such as, for example, a 0-90 fiber weave oriented at 45 degrees. The overlapping alternating 45 degree fiber patterns can be seen mostly clearly (the checker pattern) through the surface material panels 4705, 4715 between the battens. In some versions of a CTM according to the Application, the surface material can be relatively thin, such as one or two ply, about paper thin. The surfaces, which were previously voids, can be, for example, of a thickness from about 0.001" to 0.010".

FIG. 48C is a drawing showing an elevated end view of the CTM 4800 of FIG. 48A.

FIG. 48D is a drawing showing a side view of the CTM 4800 of FIG. 48A.

Note that in the exemplary CTM 4800, the side battens are slightly overlapping. Battens can be tapered or feathered on either or both long sides of each batten. As such, where the sides of battens are thinner than the central batten portion, a CTM 4800 can deform into a relatively thin low profile flattened state even where there is some overlap of the battens.

FIG. 48E is a drawing showing an elevated top view of the CTM 4800 of FIG. 48A.

FIG. 48F is a drawing showing an elevated top view of the side seam of the CTM 4800 of FIG. 48A. Side seams can be made using any suitable joining technique including, for example, any suitable epoxy, adhesive, or glue.

FIG. 48G is a drawing showing the CTM 4800 of FIG. 48A rolled on a cylindrical tube section into a flattened rolled state.

CTM surfaces—The surfaces can be provided by using one or more ply sheets which cover the entire CTM top and/or bottom section. The sheet can be below the battens, where the battens are formed or laid on top of the sheet, or the battens can be formed or laid inside the CTM, below the sheet where the sheet is over or above the battens. Or, the battens can extend both above and below a sheet, where the battens are centered about in the midplane of the sheet. The sheet itself, can be an integral ply which becomes part of the longerons and/or part of each batten. Sheets can be formed on or in a concave or a convex mold.

Battens above the sheet, battens below the sheet, and battens about in the midplane of the sheet can be all of one type, or in include any combination of types thereof.

In summary, and with reference to the exemplary CTM 4700 of FIG. 47A to FIG. 47D, a trussed collapsible tubular mast 4700 includes a deformable beam having an extended state (FIG. 47A to FIG. 47D), a flattened state, and a rolled state (FIG. 48G), where a stiffness and strength of the deformable beam in the extended state is greater than a different stiffness and a different strength of the deformable beam in the flattened state. At least one collapsible tubular mast surface material 4705, 4715 has a plurality of truss members 4701, 4711 of a first material having a first material thickness. At least one truss member 4701, 4711 is disposed substantially perpendicular to a longitudinal axis of the trussed collapsible tubular mast 4700. Disposed between the truss members 4701, 4711 is a surface material panel 4705, 4715 of a second material thickness less thick than the first material thickness. The trussed collapsible tubular mast 4700 can include a first section FIG. 47D, 4751 and a second section FIG. 47D, 4753, each of the first section 4751 and the second section 4753 including in cross section: a substantially flat surface 4715 disposed between two longerons 4703 and another flat surface material 4705 extending outward at an angle from each outer side of the longerons, which the another flat surface curves into a seam surface 4721, 4723 about parallel to the substantially flat surface 4715 disposed between longerons 4703. The seamed surface 4721 of the first section 4751, and the seamed surface 4723 of the second section 4723, are joined respectively to form a collapsible tubular mast cross section as shown, for example, in FIG. 47D.

FIG. 49 is a drawing showing a cross section view of a parallelogram CTM PCTM 4900 (right) next to a CTM 4700 (left). PCTM 4900 is similar to the CTM 4700 of FIG. 47A to FIG. 47D. What is different is that now the two sections are anti-symmetric, where the rounded shapes of the longerons 4903a and 4903b are slightly different from each other. Instead of the different lengths in cross section where the width D1 of the top portion of the top surface material 4715 between the top longerons 4703 is longer than the width D2 of the lower portion of the bottom surface material 4715 between the lower longerons 4703 (FIG. 47 D), here the lengths top and bottom can now be the same.

One advantage of a PCTM 4900 is that the effective diameter of the boom has been increased by moving the longerons further from the center. This increase in effective diameter can be seen in the exemplary CTM 4700 compared to the exemplary PCTM 4900 in FIG. 49. The centerline 4987 through the seams can be seen as similar. However, the circle 29 representing the effective diameter of the boom 4999b for PCTM 4900 (right side of FIG. 49) is larger than the circle representing the effective diameter of the boom 4999a for CTM 4700 (left side of FIG. 49). Note that the equivalent of DI and D2 for PCTM 4900 can now be substantially the same length, because when flattened, the longerons 4903b fold flat to the right of the longerons 4903a, compared to CTM 4700, where the longerons at the top folded between the longerons at the bottom.

Another advantage of a structure according to the exemplary PCTM 4900 is that the new parallelogram structure also solves the problem of placing longerons fully on radii (4999a) without the need for two different unique molds for each shell (top and bottom CTM 4700). The anti-symmetric structure according to PCTM 4900 can be manufactured using one mold, for a more efficient and lower cost production. Otherwise, any suitable materials and manufacturing techniques described hereinabove can be used to manufacture a PCTM 4900 according to FIG. 49.

All of the optional properties, such as, material composition, fiber orientation, and member thickness apply in any combination thereof to all of the described deformable structures described by the Application.

Deformable structures can be fabricated from any process that can achieve the desired cross section. Example continuous processes include extrusion, pultrusion, pulwinding, pulbraiding, etc. These processes can involve fibrous materials, bulk materials, and any combination thereof. Example fixed length processes include milling, molding, and thermoforming. Deformable structures can be injection molded, bladder molded, roll wrapped, open molded, closed molded, resin transfer molded, vacuum assisted resin transfer molded, formed using sheet molding compounds. Cross section pieces can be made independently by any of the above processes and later joined by any of several joining processes including bonding, welding, fastening, and interlocking.

According to one aspect, an apparatus includes at least one or more deformable structure of the type DubC Boom, DubC Hinge, MidC, TriC Boom, TriC Hinge, Z Boom, Z Hinge, and any cross section combinations thereof. The at least one or more deformable structure optionally includes one or more end modifications. The at least one or more deformable structure optionally includes a composite laminate. The at least one or more deformable structure can be used in one or more of the following: Suspension flexures (wheels, mountain bikes, road bikes, ATVs, etc.), Tape measures, Hinges, booms, beams, masts, Hinges/structures for unfolding consumer products: display assemblies, shades, Photography screens and shades, Umbrella and parasols, Tents, Cots, beds, stretchers, Ladders (hunting, photography, wildlife observation, fishing), Folding Beams/poles to push/pull with, anchor with, support cameras and sensors, above and under water, Antennas (Wi-Fi, Radio, cell phone, RF, TV, satellite phone/tv), Backpacks, Springs (leaf, tension, compression, torsion, etc.), Wagons, strollers, chairs, Sun shades, awnings, retractable roofs, Replace mechanical (pin-clevis) hinges, Replace telescoping tubes, Unfolding containers (boxes and bags), Flexure hinges for precision positioning systems, Sealed hinges, Orthotics and prosthetics, Control surface actuator hinges, Compliant mechanisms (morphing structures), Deployable space and terrestrial antennas, Deployable space booms, Deployable space structures (tape-spring structures and solar arrays, solar sails), Deployable wings and airfoils, Parafoils, parafoils stiffeners, parachute deployment device, Deployable atmospheric decelerators, shallow water anchors, and, Medical braces and splints.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A deformable support apparatus, which comprises:
a deformable body configured to transition between at least an extended state and a contracted state, a stiffness of the deformable body in the extended state being greater than a corresponding stiffness of the deformable body in the contracted state, the deformable body including a first member and a second member coupled to and in opposition to the first member, the first member and the second member arranged about a longitudinal axis;
wherein in the extended state, the first member having at least a first curved portion and the second member having at least a second curved portion; and
wherein the at least a first curved portion is a positive curved portion with respect to the longitudinal axis and the at least a second curved portion is a negative curved portion with respect to the longitudinal axis.

2. The deformable support apparatus according to claim 1 wherein the deformable body is further configured to transition to a rolled state.

3. The deformable support apparatus according to claim 2 wherein the stiffness of the deformable body in the extended state is greater than a corresponding stiffness of the deformable body in the rolled state.

4. The deformable support apparatus according to claim 2 wherein the at least a first curved portion includes a first circular portion and the at least a second curved portion includes a second circular portion, the first and second circular portions joined to each other.

5. The deformable support apparatus according to claim 4 wherein the first and second circular portions are substantially identical.

6. The deformable support apparatus according to claim 5 wherein the first and second circular portions are joined at respective center portions of the first and second circular portions.

7. The deformable support apparatus according to claim 6 wherein the first and second circular portions each define an approximate semicircle.

8. The deformable support apparatus according to claim 6 wherein the first and second circular portions define substantially the same arc length.

9. The deformable support apparatus according to claim 1 wherein the first member and the second member each define respective center portions and respective curved end portions in the extended state.

10. The deformable support apparatus according to claim 9 wherein the center portion of at least one of the first and second members defines a cross-sectional thickness greater than a cross-sectional thickness of the end portions of the at least one of the first and second members.

11. The deformable support apparatus according to claim 9 wherein the end portions of at least one of the first and second members each define a cross-sectional thickness greater than a cross-sectional thickness of the center portion of the at least one of the first and second members.

12. The deformable support apparatus according to claim 1 wherein the first and second members comprise fibrous laminate.

13. The deformable support apparatus according to claim 12, wherein the first and second members each comprise a fiber structure selected from the group consisting of B, B/UD/B, UD/B/UD in any combination thereof, where B is a balanced type direction and UD is a unidirectional type direction.

14. The deformable support apparatus according to claim 12, wherein the first and second members each comprise a B/UD@0/B fiber structure or a B/UD@O or a B fiber structure, where B is a balanced type direction and UD@0 is a uni directional ply with fibers parallel to a long axis.

15. A deformable support apparatus, which comprises:
a deformable body configured to transition between at least an extended state and a contracted state, the deformable body including a first member and a second member coupled to and inverted relative to the first member;
wherein a stiffness of the deformable body in the extended state is greater than a corresponding stiffness of the deformable body in the contracted state; and
wherein in the extended state, the first member having at least a first partial circular portion and the second member having at least a second partial circular portion.

16. The deformable support apparatus according to claim 15 wherein the first member and the second member are coupled to each other at respective centers of the at least a first partial circular portion and the at least a second partial circular portion.

17. The deformable support apparatus according to claim 16 wherein the deformable body is further configured to transition to a rolled state and wherein the stiffness of the deformable body in the extended state is greater than a corresponding stiffness of the deformable body in the rolled state.

18. A deformable support apparatus, which comprises:
a deformable body configured to transition between at least an extended state and a contracted state, a stiffness of the deformable body in the extended state being greater than a corresponding stiffness of the deformable body in the contracted state, the deformable body including a first member and a second member coupled in opposition to the first member;
wherein in the extended state, the first member having first curved end portions separated by a first central portion and the second member having second curved portions separated by a second central portion.

19. The deformable support apparatus according to claim 18 wherein the deformable body is further configured to transition to a rolled state and wherein the stiffness of the deformable body in the extended state is greater than a corresponding stiffness of the deformable body in the rolled state.

* * * * *